US008636920B2

(12) United States Patent
Kijima et al.

(10) Patent No.: US 8,636,920 B2
(45) Date of Patent: Jan. 28, 2014

(54) NITROGEN-CONTAINING ALLOY AND METHOD FOR PRODUCING PHOSPHOR USING SAME

(75) Inventors: Naoto Kijima, Kanagawa (JP); Hiromu Watanabe, Kanagawa (JP); Keiichi Seki, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 5 days.

(21) Appl. No.: 13/343,888

(22) Filed: Jan. 5, 2012

(65) Prior Publication Data

US 2012/0171360 A1 Jul. 5, 2012

Related U.S. Application Data

(62) Division of application No. 12/301,470, filed as application No. PCT/JP2007/060203 on May 18, 2007, now Pat. No. 8,123,980.

(30) Foreign Application Priority Data

| May 19, 2006 | (JP) | 2006-140557 |
|---|---|---|
| Jun. 1, 2006 | (JP) | 2006-153632 |
| Jul. 4, 2006 | (JP) | 2006-184667 |
| Sep. 29, 2006 | (JP) | 2006-267714 |

(51) Int. Cl.
*C09K 11/77* (2006.01)
*C22C 1/00* (2006.01)
*C22C 21/04* (2006.01)

(52) U.S. Cl.
USPC .............................. 252/301.4 F; 252/301.4 R

(58) Field of Classification Search
USPC .................... 252/301.4 R, 301.4 F
See application file for complete search history.

(56) References Cited

U.S. PATENT DOCUMENTS

| 6,080,954 A | 6/2000 | Inoue et al. |
|---|---|---|
| 6,156,993 A | 12/2000 | Inoue et al. |
| 7,824,573 B2 | 11/2010 | Watanabe et al. |
| 7,833,436 B2 | 11/2010 | Shimooka et al. |
| 2004/0135504 A1* | 7/2004 | Tamaki et al. ............ 313/512 |
| 2005/0189863 A1 | 9/2005 | Nagatomi et al. |
| 2005/0253500 A1 | 11/2005 | Gotoh et al. |
| 2006/0038477 A1 | 2/2006 | Tamaki et al. |
| 2007/0007494 A1 | 1/2007 | Hirosaki et al. |
| 2007/0259206 A1 | 11/2007 | Oshio |
| 2008/0025902 A1 | 1/2008 | Ponce |
| 2008/0089825 A1 | 4/2008 | Tamaki et al. |
| 2008/0128654 A1 | 6/2008 | Oshio |
| 2008/0149957 A1 | 6/2008 | Kameshima et al. |
| 2008/0182127 A1 | 7/2008 | Oshio |
| 2008/0191610 A1 | 8/2008 | Oshio |
| 2008/0211389 A1 | 9/2008 | Oshio |
| 2008/0258110 A1 | 10/2008 | Oshio |

FOREIGN PATENT DOCUMENTS

| EP | 1 391 423 A1 | 2/2004 |
|---|---|---|
| EP | 1 867 695 A1 | 12/2007 |
| EP | 1 990 396 A1 | 11/2008 |
| JP | 10-95604 | 4/1998 |
| JP | 11-166179 | 6/1999 |
| JP | 2003 515665 | 5/2003 |
| JP | 2003 206481 | 7/2003 |
| JP | 2005 54182 | 3/2004 |
| JP | 2005-298721 | 10/2005 |
| JP | 2006-199876 | 8/2006 |
| JP | 2006 307182 | 11/2006 |
| WO | WO 2006/001194 A1 | 1/2006 |

OTHER PUBLICATIONS

Motoharu Imai, et al., "Superconductivity of Ca(Al$_{0.5}$, Si$_{0.5}$)$_2$, a ternary silicide with the AlB$_2$-type structure", Applied Physics Letters, vol. 80, No. 6, Feb. 11, 2002, 1 front page, pp. 1019-1021.

Motoharu Imai, et al., "Superconducting Properties of Single-crystalline Ca(Al$_{0.5}$, Si$_{0.5}$)$_2$ : A ternary silicide with the AlB$_2$-type structure", Physical Review B 68, 2003, 1 front page, pp. 064512-1-064512-7.

Takashi Horikawa, "Fukugo Kinzoku Chikkabutsu Sr$_2$Si$_5$ N$_8$: Eu$^{2+}$ no Gosei to Keiko Tokusei", The Japan Institute of Metals Koen Gaiyo, (ISSN 1342-5730, pp. 441 and 550; (802), (803), 2006.

Supplementary European Search Report issued Oct. 12, 2011 in European Patent Application No. 07743638 filed May 18, 2007.

Chinese Office Action issued Feb. 29, 2012 in patent application No. 200780018264.8 with English translation.

Office Action issued Nov. 12, 2012, in European Patent Application No. 07 743 638.4.

* cited by examiner

*Primary Examiner* — Carol M Koslow
(74) *Attorney, Agent, or Firm* — Oblon, Spivak, McClelland, Maier & Neustadt, L.L.P.

(57) ABSTRACT

A method for industrially producing a phosphor with high performance, in particular, high brightness. Also disclosed is a nitrogen-containing alloy and an alloy powder useful for producing the high performance phosphor. The method for producing the phosphor includes heating a raw material for a phosphor in whole or in part comprising an alloy containing two or more different metal elements under a nitrogen-containing atmosphere and heating the raw material for a phosphor under conditions such that the temperature change per minute is 50° C. or lower. Using an alloy as all or part of the raw material constituting the phosphor precursor, it is possible to suppress the rapid progression of nitridation during heat treatment and industrially produce a phosphor with high performance, in particular, high brightness.

13 Claims, 15 Drawing Sheets

US 8,636,920 B2

NITROGEN-CONTAINING ALLOY AND METHOD FOR PRODUCING PHOSPHOR USING SAME

CROSS REFERENCE TO RELATED APPLICATION

This application is a divisional of U.S. application Ser. No. 12/301,470, filed Feb. 4, 2009, now U.S. Pat. No. 8,123,980, issued Feb. 28, 2012, which is a 371 of PCT/JP07/60203, filed on May 18, 2007, and claims priority to Japanese Patent Application No. 2006-140557, filed on May 19, 2006; Japanese Patent Application No. 2006-153632, filed on Jun. 1, 2006; Japanese Patent Application No. 2006-184667, filed on Jul. 4, 2006; and Japanese Patent Application No. 2006-267714, filed on Sep. 29, 2006.

FIELD OF THE INVENTION

The present invention relates to a nitrogen-containing alloy as a starting material for producing a phosphor composed of a nitride matrix or an oxynitride matrix and also relates to a method for producing a phosphor composed of a nitride matrix or an oxynitride matrix using the nitrogen-containing alloy as a starting material.

BACKGROUND OF THE INVENTION

Phosphors are used in such apparatuses as fluorescent lights, vacuum fluorescent displays (VFD), field emission displays (FED), plasma display panels (PDP), cathode-ray tubes (CRT), and white light-emitting diodes (LED). In any of these applications, a phosphor requires the supply of excitation energy for emitting light. After being excited by a high-energy source that emits vacuum ultraviolet light, ultraviolet light, visible light, electron beams or the like, such a phosphor emits ultraviolet light, visible light, or infrared light. However, there has been a problem that the long-term exposure of a phosphor to such an energy source may result in the deterioration of brightness.

In response to this, many novel ternary or more complex nitrides have recently been developed as alternatives to known phosphors, such as silicate, phosphate, aluminate, borate, sulfide, and oxysulfide phosphors. In particular, recently developed silicon nitride-based multicomponent nitrides and oxynitrides exhibit excellent characteristics as phosphors.

Patent Document 1 discloses phosphors represented by the general formula $M_xSi_yN_z$:Eu (M is one or more alkaline earth metal elements selected from the group consisting of Ca, Sr, and Ba, whereas x, y, and z are numbers that satisfy the relationship expressed as z=2/3x+4/3y). Such phosphors are synthesized by nitridation of alkaline earth metal elements and then mixing the obtained alkaline earth metal element nitrides with silicon nitride or by heating alkali earth metal imides and silicon imides as raw materials under nitrogen or argon flow. Both synthetic methods require alkaline earth metal element nitrides susceptible to air and moisture as raw materials, and thus are unsuitable for industrial manufacturing.

Patent Document 2 discloses oxynitride phosphors having an oxynitride represented by the formula $M_{16}Si_{15}O_6N_{32}$:Eu and oxynitride phosphors having SiAlON structures each represented by the formula $MSiAl_2O_3N_2$:Eu, $M_{13}Si_{18}Al_{12}O_{18}N_{36}$:Eu, $MSi_5Al_2ON_9$:Eu, or $M_3Si_5AlON_{10}$:Eu. It states that, particularly in the case where M was Sr, heating the mixture of $SrCO_3$, AlN, and $Si_3N_4$ at a ratio of 1:2:1 in a reducing atmosphere (hydrogen-containing nitrogen atmosphere) resulted in the formation of $SrSiAl_2O_3N_2$:$Eu^{2+}$.

This approach provides oxynitride phosphors only and thus does not provide phosphors based on nitrides free from oxygen.

Furthermore, raw materials of the nitride or oxynitride phosphors described above have low reactivity in a powder form. Thus, to promote the solid state reaction between the particles of the raw materials during firing, the raw materials should be heated with the maximum contact area between particles thereof. As a result, the synthesized phosphor is in the state of being compacted at high temperatures, in other words, in the state of a very hard sintered body. Such a sintered body should be pulverized into fine particles, which is a form suitable for its intended purposes as a phosphor. However, milling such a hard sintered body of a phosphor for a long period of time with tremendous energy in an ordinary mechanical method, for example, with the use of a jaw crusher or a ball mill, would result in the generation of many defects in the matrix crystal of the phosphor and thereby lead to the significant deterioration of the light emission intensity.

Meanwhile, the patent documents state that, in the production of such nitride or oxynitride phosphors, alkaline earth metal element nitrides such as calcium nitride ($Ca_3N_2$) and strontium nitride ($Sr_3N_2$) are preferably used. However, in general, divalent metal nitrides are likely to react with water to produce hydroxides and thus unstable under a water-containing atmosphere. This tendency is marked especially in the particles of $Sr_3N_2$ and metallic Sr, so these kinds of nitrides are very difficult to handle.

For the reasons described above, novel raw materials of phosphors and methods for producing them are demanded.

A method for producing a nitride phosphor using a metal as a starting material has recently been reported in Patent Document 3. Patent Document 3 discloses an example of a method for producing an aluminum nitride-based phosphor and describes that a transition elements, a rare earth element, aluminum, and an alloy thereof can be used as the starting materials. However, this patent document describes no example in which such an alloy is actually used as a starting material but describes that metallic Al is used as an Al source. This method uses a combustion synthesis technique in which a starting material is rapidly heated to a high temperature (3,000 K) by igniting the starting material and therefore is significantly different from a method according to the present invention. It is probably difficult to produce a high-performance phosphor by this method. More specifically, the method in which the starting materials are instantly heated to a temperature as high as 3,000 K has difficulties in distributing activator elements evenly and thus cannot easily provide a high-performance phosphor. This document describes no nitride phosphor containing an alkaline-earth element obtained from the alloy or no nitride phosphor containing silicon.

Patent Document 1: PCT Japanese Translation Patent Publication No. 2003-515665
Patent Document 2: Japanese Unexamined Patent Application Publication No. 2003-206481
Patent Document 3: Japanese Unexamined Patent Application Publication No. 2005-54182

The inventors have conducted studies and found that in the case of the production of a phosphor composed of a nitride matrix or an oxynitride matrix from an alloy as a raw material, a nitridation reaction proceeds rapidly during heating, so that the generated heat may cause melting and phase separation of the raw material and decomposition of the resulting nitride, thereby degrading the properties of a phosphor produced. The inventors also found that in particular, in the case where a large amount of the raw material is heat-treated at one time or the packing density of the raw material is increased in order to increase the productivity, a phosphor is not produced in some cases.

SUMMARY OF INVENTION

In consideration of the foregoing problems, the present invention has been accomplished. It is an object of the present invention to provide a method for industrially producing a phosphor with high performance, in particular, high brightness. It is another object of the present invention to provide a phosphor prepared by the method for producing a phosphor, a phosphor-containing composition containing the phosphor, a light-emitting device containing the phosphor, an image display including the light-emitting device, and a lighting system including the light-emitting device.

It is another object of the present invention to provide a nitrogen-containing alloy, and an alloy powder, which can be used for the method for producing a phosphor.

In consideration of the foregoing problems, the inventors have conducted intensive studies on a method for producing a phosphor and found that in the case where a phosphor is produced with an alloy containing two or more metal elements that will constitute the phosphor (hereinafter, also referred to as an "alloy for a phosphor precursor"), the alloy serving as the whole or part of a raw material, the control of a change in temperature during the heat treatment within a predetermined range in a step of heating the raw material for the phosphor results in an increase the amount of the raw material capable of being heated at one time.

The gist of the present invention will be described in items (1) to (33) below.

(1) A method for producing a phosphor includes a step of heating a raw material for the phosphor under a nitrogen-containing atmosphere, in which an alloy containing two or more different metal elements constituting the phosphor (hereinafter, referred to as an "alloy for a phosphor precursor") is used as the whole or part of the raw material for the phosphor, and in the heating step, the heating is performed under conditions such that the temperature change per minute in the temperature range from a temperature 100° C. lower than the melting point of the alloy for a phosphor precursor to a temperature 30° C. lower than the melting point of the alloy for a phosphor precursor is 50° C. or lower.

(2) The method for producing a phosphor described in item (1) satisfies at least one of requirements 1) to 4):

1) the whole or part of the alloy for a phosphor precursor is a nitrogen-containing alloy having a total content of metal elements of 97% by weight or less;

2) the heating rate is set at 9° C./min or less in the temperature range from a temperature 100° C. lower than the melting point of the alloy for a phosphor precursor to a temperature 30° C. lower than the melting point of the alloy for a phosphor precursor;

3) a nitride or an oxynitride containing one or two or more metal elements constituting the phosphor is used as the raw material for the phosphor together with the alloy for a phosphor precursor; and 4) a powder of the alloy for a phosphor precursor is used as the alloy for a phosphor precursor, the powder having an angle of repose of 45° or less.

(3) The method for producing a phosphor described in (2) satisfies at least requirements 1) and 2).

(4) The method for producing a phosphor described in (2) satisfies at least requirements 2) and 3).

(5) In the method for producing a phosphor described in any one of items (1) to (4), in the heating step, the raw material for the phosphor is heated in a firing vessel, and the mass ratio of the raw material for the phosphor to the firing vessel is 0.1 or more, the mass ratio being represented by the following formula [A]:

(mass of raw material for phosphor)/{(mass of firing vessel)+(mass of raw material for phosphor)}    [A].

(6) A method for producing a phosphor includes a step of heating a raw material for the phosphor under a nitrogen-containing atmosphere, in which an alloy for a phosphor precursor is used as the whole or part of the raw material for the phosphor, and in which the method satisfies at least one of requirements 1) to 4):

1) the whole or part of the alloy for a phosphor precursor is a nitrogen-containing alloy having a total content of metal elements of 97% by weight or less;

2) the heating rate is set at 9° C./min or less in the temperature range from a temperature 100° C. lower than the melting point of the alloy for a phosphor precursor to a temperature 30° C. lower than the melting point of the alloy for a phosphor precursor;

3) a nitride or an oxynitride containing one or two or more metal elements constituting the phosphor is used as the raw material for the phosphor together with the alloy for a phosphor precursor; and 4) a powder of the alloy for a phosphor precursor is used as the alloy for a phosphor precursor, the powder having an angle of repose of 45° or less.

(7) In the method for producing a phosphor described in item (6), the nitrogen-containing alloy has a nitrogen content of 0.8% by weight to 27% by weight.

(8) The method for producing a phosphor described in item (6) or (7) further includes a step (hereinafter, referred to as a "primary nitridation step") of heating the alloy for a phosphor precursor under a nitrogen-containing atmosphere to prepare the nitrogen-containing alloy.

(9) In the method for producing a phosphor described in any one of items (6) to (8), the nitrogen-containing alloy satisfies the formula [7]:

$$0.03 \leq NI/NP \leq 0.9 \quad\quad [7]$$

wherein in the formula [7],

NI represents the nitrogen content (% by weight) of the nitrogen-containing alloy, and NP represents the nitrogen content (% by weight) of the phosphor produced.

(10) In the method for producing a phosphor described in any one of items (6) to (9), the step (hereinafter, referred to as a "secondary nitridation step") of heating the raw material for the phosphor, the whole or part of the raw material being consisted of the nitrogen-containing alloy under the nitrogen-containing atmosphere is performed at a temperature equal to or higher than a temperature 300° C. higher than the melting point of the nitrogen-containing alloy.

(11) The method for producing a phosphor described in any one of items (6) to (10) further includes a step of cooling the nitrogen-containing alloy to a temperature equal to or lower than a temperature 100° C. lower than the melting point of the nitrogen-containing alloy before the secondary nitridation step.

(12) The method for producing a phosphor described in any one of items (6) to (11) further includes a step of milling the nitrogen-containing alloy before the secondary nitridation step.

(13) In the method for producing a phosphor described in any one of items (6) to (12), the alloy for a phosphor precursor has a weight-average median diameter $D_{50}$ of 100 µm or less.

(14) In the method for producing a phosphor described in any one of items (6) to (13), the raw material for the phosphor contains 1% by weight or more of a nitride or an oxynitride containing one or two or more metal elements constituting the phosphor together with the alloy for a phosphor precursor.

(15) In the method for producing a phosphor described in any one of items (6) to (14), the alloy for a phosphor precursor has a tap density of 1.9 g/mL or more.

(16) A method for producing a phosphor includes a step of heating a raw material for the phosphor under a nitrogen-containing atmosphere, in which an alloy for a phosphor precursor is used as the whole or part of the raw material for the phosphor, and in which the whole or part of the alloy for a phosphor precursor is a nitrogen-containing alloy having a nitrogen content of 10% by weight or more.

(17) A method for producing a phosphor using an alloy for a phosphor precursor includes:

(a) a melting step of melting at least one metal element and at least one activating element $M^1$ constituting the phosphor to form a molten alloy containing these elements;

(b) a size-reduction step of reducing the size of the molten alloy in an inert gas;

(c) a solidifying step of solidifying the molten alloy, the molten alloy having been reduced in size; and (d) a firing step of firing the solidified alloy powder under a nitrogen atmosphere.

(18) In the method for producing a phosphor described in any one of items (1) to (17), the phosphor contains a tetravalent metal element $M^4$ containing at least Si and contains one or more metal elements other than Si.

(19) In the method for producing a phosphor described in item (18), the phosphor contains an activating element $M^1$, a divalent metal element $M^2$, and the tetravalent metal element $M^4$ containing at least Si.

(20) In the method for producing a phosphor described in item (19), the phosphor contains an alkaline-earth metal element serving as the divalent metal element $M^2$.

(21) In the method for producing a phosphor described in item (19) or (20), the phosphor further contains a trivalent metal element $M^3$.

(22) A nitrogen-containing alloy for producing a phosphor composed of a nitride matrix or an oxynitride matrix as a host material includes at least one metal element and at least one activating element $M^1$, in which the total content of metal elements is 97% by weight or less.

(23) In the nitrogen-containing alloy described in item (22), the nitrogen content is in the range of 0.8% by weight to 27% by weight.

(24) The nitrogen-containing alloy described in item (22) or (23) satisfies the formula [7]:

$$0.03 \leq N_1/NP \leq 0.9 \quad [7]$$

wherein in the formula [7], $N_1$ represents the nitrogen content (% by weight) of the nitrogen-containing alloy, and NP represents the nitrogen content (% by weight) of the phosphor produced.

(25) The nitrogen-containing alloy described in any one of items (22) to (24) contains a tetravalent metal element $M^4$ containing at least Si and comprising one or more metal elements other than Si.

(26) The nitrogen-containing alloy described in item (25) contains an activating element $M^1$, a divalent metal element $M^2$, and the tetravalent metal element $M^4$ containing at least Si.

(27) The nitrogen-containing alloy described in item (26) contains an alkaline-earth metal element serving as the divalent metal element $M^2$.

(28) The nitrogen-containing alloy described in item (26) or (27) further contains a trivalent metal element $M^3$.

(29) In the nitrogen-containing alloy described in any one of items (22) to (28), the activating element $M^1$ is at least one element selected from the group consisting of Cr, Mn, Fe, Ce, Pr, Nd, Sm, Eu, Tb, Dy, Ho, Er, Tm, and Yb.

(30) In the nitrogen-containing alloy described in item (28) or (29), the divalent metal element $M^2$ is at least one element selected from the group consisting of Mg, Ca, Sr, Ba, and Zn, the trivalent metal element $M^3$ is at least one element selected from the group consisting of Al, Ga, In, and Sc, and the tetravalent metal element $M^4$ containing at least Si is at least one element selected from the group consisting of Si, Ge, Sn, Ti, Zr, and Hf.

(31) In the nitrogen-containing alloy described in item (30), 50% by molar content or more of the divalent metal element $M^2$ is Ca and/or Sr, 50% by molar content or more of the trivalent metal element $M^3$ is Al, and 50% by molar content or more of the tetravalent metal element $M^4$ containing at least Si is Si.

(32) In the nitrogen-containing alloy described in item (30) or (31), the activating element $M^1$ contains Eu, the divalent metal element $M^2$ contains Ca and/or Sr, the trivalent metal element $M^3$ contains Al, and the tetravalent metal element $M^4$ containing at least Si contains Si.

(33) A powder of an alloy serving as a raw material for a phosphor contains at least one metal element, and at least one activating element $M^1$, in which the alloy powder has an angle of repose of 45° or less.

The present invention makes it possible to suppress the rapid progress of a nitridation reaction in the heating step in producing the phosphor using the alloy for a phosphor precursor as the whole or part of the raw material, thereby industrially producing the phosphor with high performance, in particular, high brightness.

The present invention also makes it possible to provide the nitrogen-containing alloy as an excellent raw material for the phosphor and the alloy powder with a low angle of repose.

DETAILED DESCRIPTION OF THE INVENTION

Figure 1:
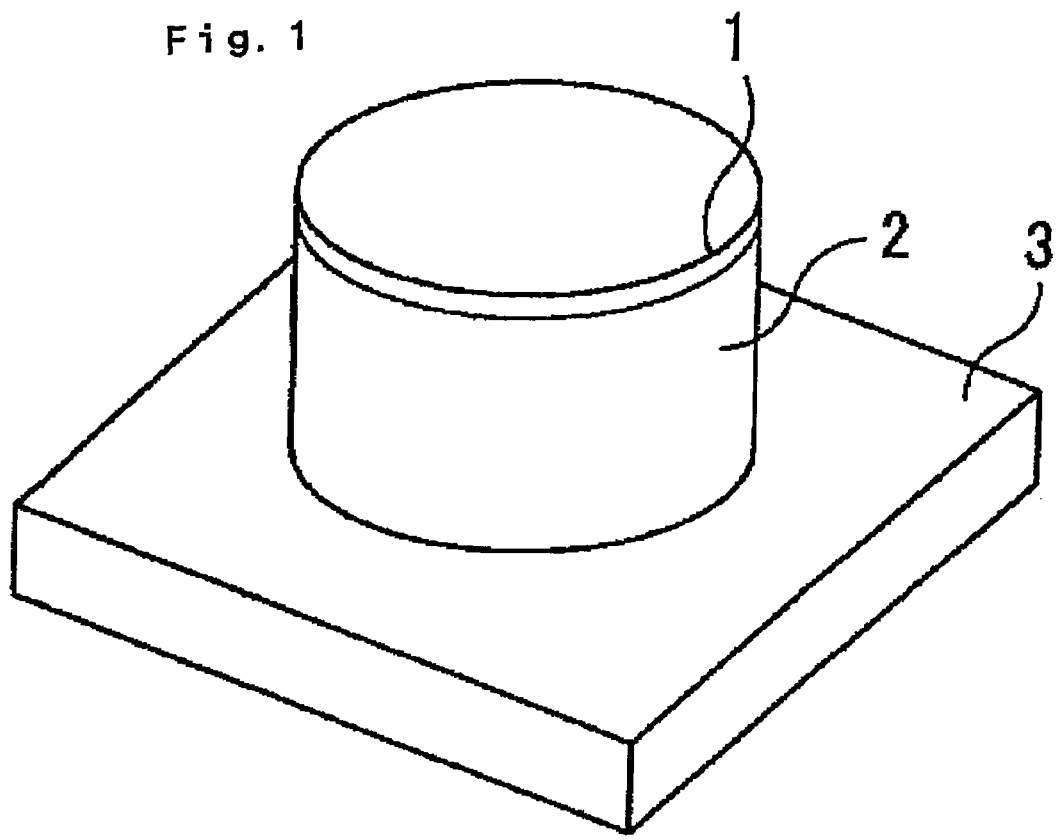
FIG. 1 is a schematic perspective view of a light-emitting device according to an embodiment of the present invention.

The embodiments of the present invention will be described in detail below. However, the present invention is not limited thereto, and various modifications may be made without departing from the scope of the invention.

In this specification, a numerical range expressed with the symbol "-" includes values which are each placed on the left or right of the symbol "-" and which each corresponds to a lower limit or an upper limit.

An alloy defined in this specification includes a solid solution, a eutectic, and an intermetallic compound, each being composed of two or more metals, and a material containing a combination thereof. The alloy may contain a nonmetallic element.

[Method for Producing Phosphor]

A method for producing a phosphor according to the present invention (hereinafter, also referred to simply as a "production method of the present invention") includes a step of heating a raw material for a phosphor under a nitrogen-containing atmosphere, in which an alloy containing two or more metal elements constituting the phosphor (hereinafter, referred to as an "alloy for a phosphor precursor") is used as the whole or part of the raw material for the phosphor.

A nitridation reaction is an exothermic reaction. Thus, in the case where a large amount of the raw material for a phosphor is subjected to nitridation by heating in the heating step at one time, a runaway reaction with a sharp exotherm occurs. The exotherm often causes the evaporation of part of constituent elements of the raw material for the phosphor and the fusion of particles of the alloy for a phosphor precursor. The resulting phosphor has poor light emission properties or no phosphor is obtained, in some cases. Accordingly, in the production method of the present invention, the control of the range of a temperature change during the heating step inhibits the rapid progress of the nitridation reaction even when the amount of the raw material for the phosphor treated at one time is increased, thereby making it possible to industrially produce high-performance phosphor.

It is important for the production method of the present invention that in the heating step, a change in the temperature of the external wall of a firing vessel into which the raw material for the phosphor is placed is small in a specific temperature range (i.e., it represents that a rapid exothermal reaction does not occur). The specific temperature range above usually represents a temperature range from a temperature 100° C. lower than the melting point of the alloy for a phosphor precursor to a temperature 30° C. lower than the melting point. Preferably, the lower limit of the range is a temperature 150° C. lower than the melting point and more preferably a temperature 200° C. lower than the melting point. Preferably, the upper limit of the range is the melting point or lower and more preferably a temperature 100° C. higher than the melting point.

The temperature change per minute in the heating step in the production method of the present invention is usually 50° C. or lower, preferably 30° C. or lower, more preferably 20° C. or lower, still more preferably 10° C. or lower. An excessively large temperature change in the heating step is liable to cause a reduction in light emission properties of the phosphor. In some cases, a phosphor is not obtained. The lower limit of the range of the temperature change per minute is not particularly limited but is usually 0.1° C. or higher from the viewpoint of achieving good productivity. Furthermore, the temperature in the heating step may decrease. The value of the "temperature change per minute in the heating step" represents the absolute value.

The "temperature change per minute in the heating step" is determined by measuring a temperature of the external wall of the firing vessel (a thermometer is arranged at a height position approximately equal to half the height of the raw material for the phosphor placed therein. Hereinafter, this temperature is also referred to as a "side-wall temperature of the firing vessel") at fixed time intervals with a tungsten-rhenium alloy thermocouple, a platinum thermocouple, rhodium-platinum thermocouple, a radiation thermometer, or the like and calculating the temperature change per minute from the formula [B] using the measurements:

Temperature change (° C./min)=temperature at time $T$ min−temperature at time $(T-1)$ min     [B].

In order to ensure that the temperature change represented by the formula [B] is not attributable to noise, the temperature is preferably monitored at certain intervals or less. Specifically, the temperature measurement interval is usually set at 30 seconds or less, preferably 20 seconds or less, and more preferably 10 seconds or less. The lower limit of the temperature measurement interval is usually set at one second or more.

In the formula [B], the temperature change per minute is specified. However, the temperature measurement interval is not particularly limited. For example, a temperature change per 10 minutes is usually 100° C. or lower, preferably 80° C. or lower, and more preferably 50° C. or lower. The lower limit of the range of the temperature change per 10 minutes is not particularly limited but is usually 0.5° C. or higher.

The side-wall temperature of the firing vessel is approximately equal to a temperature in a furnace when a sharp exotherm does not occur in the heating step. Thus, in the case where the value of the formula [B] is larger than the value of a change in temperature in the furnace, this usually means the occurrence of a rapid exothermic reaction.

The production method of the present invention is not particularly limited as long as it satisfies the foregoing requirement. A method for controlling the temperature change in the heating step will be described below.

A reduction in the amount of heat generated by a nitridation reaction per certain period of time (i.e., inhibition of the progress of a rapid nitridation reaction) can control the temperature change in the heating step within the range above. Specifically, ways satisfying requirements 1) to 4) are exemplified below. The production method of the present invention preferably satisfies at least one of requirements 1) to 4) described below. From the viewpoint of achieving good productivity, the production method of the present invention particularly preferably satisfies at least requirement 1).

Details of requirements 1) to 4) will be described below.

1) The whole or part of the alloy for a phosphor precursor is a nitrogen-containing alloy having a total content of metal elements of 97% by weight or less.

2) The heating rate is set at 9° C./min or less in the temperature range from a temperature 100° C. lower than the melting point of the alloy for a phosphor precursor to a temperature 30° C. lower than the melting point of the alloy for a phosphor precursor.

3) A nitride or an oxynitride containing one or two or more metal elements constituting the phosphor is used as the raw material for the phosphor together with the alloy for a phosphor precursor.

4) A powder of the alloy for a phosphor precursor is used as the alloy for a phosphor precursor, the powder having an angle of repose of 45° or less.

The production method of the present invention may satisfy any two or more of requirements 1) to 4) as needed. In this case, the amount of heat generated per certain period of time can be further reduced. When requirement 1) is satisfied, any one of requirements 2) to 4) may be satisfied in addition to requirement 1). Particularly preferably, both requirements 1) and 2) or both requirements 1) and 3) are satisfied. Alternatively, both requirements 2) and 3) are preferably satisfied. Preferably, requirements 1) to 4) are appropriately selected because the degree of effectiveness obtained by requirements 1) to 4) may be different in response to other conditions such as the composition and shape of the alloy for a phosphor precursor, a firing apparatus, a firing atmosphere, and a firing temperature.

To increase the amount of the raw material for the phosphor treated at one time and improve light emission properties of a phosphor to be obtained, requirements 1) to 4) are preferably satisfied. Alternatively, the mass ratio of the mass of the raw material for the phosphor to the mass of the firing vessel used in firing the raw material for the phosphor, the mass ratio being represented by the formula [A], may be controlled to a proper value such that the temperature change per minute in the heating step is 50° C. or lower even if requirements 1) to 4) are not satisfied. The control of the value of the formula [A] described below in addition to the satisfaction of any one of requirements 1) to 4) may result in the control the temperature change per minute in the heating step:

(Mass of raw material for phosphor)/{(mass of firing vessel)+(mass of raw material for phosphor)}    [A].

The firing vessel has a function to absorb heat liberated by the raw material for the phosphor. Thus, a low ratio of the mass of the raw material for the phosphor to the total of the mass of the firing vessel and the mass of the raw material for the phosphor tends to inhibit the progress of a rapid exothermic reaction in the heating step.

A preferred value of the formula [A] when the production method of the present invention does not satisfy requirements 1) to 4) varies depending on the composition and shape of the alloy for a phosphor precursor (in particular, particle diameters of an alloy powder), the total content of metal elements in the nitrogen-containing alloy, other production conditions, and the like. In this case, the value of the formula [A] is usually 0.01 or more and preferably 0.05 or more and usually 0.5 or less and preferably 0.2 or less.

In the case where the production method of the present invention satisfies at least any one of requirements 1) to 4), a high-performance phosphor can be obtained even when the value of the formula [A] is large compared with the case where the production method of the present invention does not satisfy requirements 1) to 4). A specific range of values are described below.

In the case where the production method of the present invention satisfies requirement 1), the value of the formula [A] is usually 0.3 or more and preferably 0.4 or more, and usually 0.95 or less and preferably 0.8 or less from the viewpoint of achieving good properties and productivity of a phosphor to be obtained.

In the case where the production method of the present invention satisfies requirements 1) and 2), the value of the formula [A] is usually 0.35 or more and preferably 0.45 or more, and usually 0.95 or less and preferably 0.8 or less from the viewpoint of achieving good properties and productivity of a phosphor to be obtained.

In the case where the production method of the present invention satisfies requirements 1) and 3), the value of the formula [A] is usually 0.35 or more and preferably 0.45 or more, and usually 0.6 or less and preferably 0.4 or less from the viewpoint of achieving good properties and productivity of a phosphor to be obtained.

In the case where the production method of the present invention satisfies requirements 1) and 4), the value of the formula [A] is usually 0.1 or more and preferably 0.2 or more, and usually 0.8 or less and preferably 0.6 or less from the viewpoint of achieving good properties and productivity of a phosphor to be obtained.

To reduce the production cost, the amount of the raw material for the phosphor treated at one time is preferably increased. Thus, in the case where the production method of the present invention is industrially performed, preferably, the value of the formula [A] is set at 0.24 or more and preferably 0.4 or more, and the production conditions are adjusted so as to provide a high-performance phosphor.

In the formula [A], the quantity ratio of the raw material for the phosphor to the firing vessel is expressed by mass for convenience. More exactly, the value specified by the formula [A] is expressed as the product of mass and specific heat (i.e., heat capacity) represented by the formula [A']:

Mass of raw material for the phosphor (g)×specific heat of raw material for the phosphor/{(mass of firing vessel (g)×specific heat of firing vessel)+ (mass of raw material for the phosphor (g)×specific heat of raw material for the phosphor)}    [A'].

For example, the alloy ($Eu_{0.008}Sr_{0.792}Ca_{0.2}AlSi$) for the phosphor precursor used in Example 1 has a specific heat of 0.71 J/K/g. Boron nitride (constituting the firing vessel) has a specific heat of 2.9 J/K/g. Molybdenum has a specific heat of 0.26 J/K/g. Alumina has a specific heat of 0.6 J/K/g. Aluminum nitride has a specific heat of 1.2 J/K/g.

The specific heat of the raw material for the phosphor varies depending on the composition of the raw material for the phosphor and the incorporation of the nitrogen-containing alloy and a nitride and/or oxynitride described below; hence, a preferred value of the formula [A'] is changed. The value of the formula [A'] is usually 0.05 or more and preferably 0.1 or more, and usually 0.9 or less and preferably 0.75 or less.

To increase the amount of heat absorbed by the firing vessel, it is thus preferred to use a firing vessel having a high thermal conductivity or a high specific heat. Specifically, a firing vessel composed of boron nitride, molybdenum, alumina, or the like is preferably used. Among these, a firing vessel composed of boron nitride is particularly preferably used.

To further increase the amount of the raw material for the phosphor treated at one time, the amount of heat accumulated in the firing apparatus and the firing vessel should be minimized. The amount of heat accumulated may be adjusted by, for example, adjusting the distance between the firing vessels to improve heat dissipation performance, arranging a cooling unit near the firing vessel, using a firing vessel having a large surface area, or adjusting the number of firing vessels placed in the furnace.

In the case where the production method of the present invention is industrially performed, the ratio of the volume of the raw material for the phosphor to the volume of a treatment chamber of the firing apparatus (hereinafter, referred to as a "filling rate of the raw material for the phosphor in the firing vessel") is important from the viewpoint of achieving good productivity. A specific range of the ratio of the volume of the raw material for the phosphor to the volume of the treatment chamber of the firing apparatus is usually 8% or more, preferably 20% or more, and more preferably 25% or more, and usually 80% or less, preferably 60% or less, and more preferably 40% or less. In the case where the filling rate of the raw material for the phosphor in the firing vessel is lower than the range above, although a phosphor can be easily produced according to the present invention even when at least any one of requirements 1) to 4) is not satisfied, the productivity tends to be low. In contrast, in the case where the filling rate of the raw material for the phosphor in the firing vessel is higher than the range above, the degradation of the firing apparatus may be accelerated.

Steps in the production method of the present invention will be described in detail below.

Requirements 1) to 4) will be also described in detail below.

In the production method of the present invention, the phosphor of the present invention is produced through steps described below.

That is, raw material metals or alloys thereof are weighed (step of weighing raw materials). These raw materials are melted (melting step) into an alloy to form the alloy for a phosphor precursor. Then the alloy for a phosphor precursor is subjected to nitridation by heating under a nitrogen-containing atmosphere (heating step; hereinafter, also referred to appropriately as a "secondary nitridation step"). In addition to these steps, a casting step, a milling step, a classification step, a primary nitridation step, a cooling step, and the like may be performed as needed.

Any alloy for a phosphor precursor may be used as long as a phosphor having a target composition is obtained. One or two or more alloys for the phosphor precursor may be used.

To satisfy requirement 1), the primary nitridation step should be performed. Alternatively, the nitrogen-containing alloy described below should be incorporated in the secondary nitridation step.

To satisfy requirement 2), the heating rate in the secondary nitridation step should be controlled.

To satisfy requirement 3), the oxide or oxynitride should be mixed in the secondary nitridation step.

To satisfy requirement 4), a method including steps (a) to (c) described below (for example, a gas atomization method) is employed in the milling step, thereby producing a powder of the alloy for a phosphor precursor, the powder having an angle of repose of 45° or less. Alternatively, the secondary nitridation step should be performed using a powder of the alloy for a phosphor precursor, the powder having an angle of repose of 45° or less.

[1] Production of Alloy for a Phosphor Precursor

{Weighing of Raw Material}

In the case where, for example, a phosphor having a composition represented by the general formula [1] described below is produced by the production method of the present invention, preferably, raw material metals or alloys thereof (hereinafter, also referred to simply as "raw material metals") are weighed in such a manner that a composition of the general formula [3] is achieved, and then the production of the alloy for a phosphor precursor is performed:

$$M^1_a M^2_b M^3_c M^4_d \qquad [3]$$

(wherein $M^1$, $M^2$, $M^3$, $M^4$, a, b, c, and d are defined the same as in the general formula [1] described below).

Examples of the raw material that can be used include metals and alloys thereof. A raw material corresponding to an element contained in the phosphor of the present invention may be used alone. Alternatively, any two or more of such raw materials may be combined in any proportion. Among such raw materials, a Eu raw material or a Ce raw material used as a raw material for the activating element $M^1$ is preferably metallic Eu or metallic Ce because of easy availability thereof.

The purity of metals used to produce the alloy is preferably high. Specifically, from the viewpoint of achieving good light emission properties of the phosphor synthesized from the alloy, a raw material metal for the activating element $M^1$ is preferably purified so as to have an impurity content of 0.1% by mole or less and more preferably 0.01% by mole or less. Raw materials containing elements other than the activating element $M^1$ are various metals such as divalent metals, trivalent metals, and tetravalent metals. From the same reason as the activating element $M^1$, each of the raw materials preferably has an impurity content of 0.1% by mole or less and more preferably 0.01% by mole or less. For example, in the case where at least one element selected from the group consisting of Fe, $N_1$, and Co is contained as an impurity element, the content of each element is usually 500 ppm or less and preferably 100 ppm or less.

The shape of raw material metals is not limited. The raw material metals are usually in the form of particles or blocks each having a diameter of several millimeters to several tens of millimeters. The raw material metals each having a diameter of 10 mm or more is referred to as the "blocks" defined here. The raw material metals each having a diameter of less than 10 mm is referred to as the "particles" defined here.

In the case where an alkaline-earth metal is used as the divalent metal element $M^2$, examples of the shape of the raw material thereof include, but are not limited to, particles and blocks. It is preferable to choose an appropriate shape considering the chemical characteristics of the raw materials. For example, Ca may be used in both forms of particles and blocks because of its proven stability in air, whereas Sr is preferably used in the form of blocks since it has higher chemical activity than Ca.

With respect to metal elements in which the amounts of the metal elements are reduced by, for example, evaporation or reactions with a material constituting a crucible while the metal elements are being melted, excessive amounts of the metal elements may be weighed in advance as needed.

{Melting of Raw Material}

After the raw materials are weighed, the raw materials are melted into an alloy to form an alloy for a phosphor precursor (melting step). The resulting alloy for a phosphor precursor contains two or more metal elements constituting a phosphor prepared in the present invention (hereinafter, also referred to as a "phosphor of the present invention"). A single alloy for a phosphor precursor need not contain all metal elements constituting the phosphor of the present invention. Two or more alloys and/or metals may be further incorporated in the primary nitridation step or secondary nitridation step to produce the phosphor of the present invention.

A method for melting the raw material metals is not particularly limited. Any method may be employed. Examples of such a method that can be employed include resistance heating, electron beam melting, arc melting, and high-frequency induction heating (hereinafter, also referred to as "high-frequency melting"). Furthermore, any two or more of these methods may be combined for melting.

Examples of a material for a crucible that can be used during the melting include alumina, calcia, graphite, and molybdenum.

However, in particular, when an alloy, containing Si and an alkaline-earth metal element serving as the divalent metal element $M^2$, for the phosphor precursor is produced, the following points should be preferably noted.

That is, the melting point of Si is 1,410° C. and comparable to the boiling points of alkaline earth metals (e.g., Ca has a boiling point of 1,494° C., Sr has a boiling point of 1,350° C., and Ba has a boiling point of 1,537° C.). In particular, the boiling point of Sr is lower than the melting point of Si, and this makes it extremely difficult to melt Sr and Si simultaneously.

Accordingly, in the present invention, preferably, a raw material containing Si (i.e., Si and/or an alloy containing Si) is first melted, and then a raw material for an alkaline-earth metal (i.e., an alkaline-earth metal and/or an alloy containing an alkaline-earth metal) is melted. In this way, it is possible to melt the raw material for an alkaline-earth metal together with the raw material for Si. Furthermore, by melting the raw material for Si and then melting the raw material for an alkaline-earth metal, the resulting alloy for a phosphor precursor has a higher purity, so that the resulting phosphor prepared from the alloy has significantly improved properties.

Production of such an alloy, containing Si and an alkaline-earth metal element, for the phosphor precursor will be described in detail below.

In the case of the production of the alloy, containing Si and an alkaline-earth metal element, for the phosphor precursor, a melting method is not limited. Any of these melting methods described above may be employed. Among these methods, arc melting and high-frequency melting are preferred, and high-frequency melting is particularly preferred. Hereinafter, (1) arc melting or electron beam melting and (2) high-frequency melting will be taken as examples for detailed explanation.

(1) Arc Melting or Electron Beam Melting

In arc melting or electron beam melting, raw material metals are melted in the following steps.

i) Metal Si or an alloy containing Si is melted with electron beams or arc discharge.

ii) Then, an alkaline-earth metal is melted by indirect heating to form an alloy containing both Si and the alkaline earth metal.

This method may be performed by first adding the molten alkaline-earth metal to the molten metal containing Si and then heating and/or stirring the mixture with electron beams or arc discharge to promote the mixing thereof.

(2) High-Frequency Melting

An alloy containing an alkaline-earth metal element is highly reactive with oxygen and thus should be melted not in air but in vacuum or an inert gas. Under such conditions, high-frequency melting is generally preferable. However, Si is a semiconductor and difficult to melt by induction heating with a high frequency. For example, at 20° C., the specific resistance of aluminum is $2.8 \times 10^{-8}$ Ω·m, while that of polycrystalline Si for semiconductors is $10^5$ Ω·m or higher. Substances with a high specific resistance, such as Si, cannot be easily melted directly by high-frequency dielectric heating, and thus they are usually melted with the help of an electrically conductive susceptor, which transfers heat to Si via thermal conduction or thermal radiation.

The shape of the susceptor is not limited. Although a disk-shaped susceptor or a cylindrical susceptor may be used, a crucible is preferably used as such a susceptor.

A material for the susceptor is not limited as long as the raw material can be melted. Typical examples of the material for the susceptor include graphite, molybdenum, and silicon carbide. Disadvantageously, these materials are very expensive and highly reactive with alkaline-earth metals. However, a crucible in which alkaline-earth metals can be melted (e.g., alumina or calcia) is composed of an insulating material and thus difficult to use as a susceptor. It is therefore difficult to simultaneously melt an alkaline-earth metal and metal Si placed in a known electrically conductive crucible (composed of, for example, graphite), serving as a susceptor, by indirect heating based on high-frequency melting. This problem can be solved by the following steps.

i) Metal Si is melted in an electrically conductive crucible by indirect heating.

ii) Then, an alkaline-earth metal is melted in an insulating crucible to form an alloy containing both Si and the alkaline-earth metal.

The metal Si may be cooled between the steps i) and ii) or directly forwarded to the step of melting the alkaline-earth metal without being cooled. If the steps i) and ii) are consecutively performed, a crucible produced by coating an electrically conductive vessel with, for example, calcia or alumina that is suitable for melting of alkaline-earth metals may be used.

These steps can be described in more detail as follows.

i) Metal Si and another metal M (e.g., Al or Ga) are melted in an electrically conductive crucible by indirect heating to form an electrically conductive alloy (a mother alloy).

ii) Then, another crucible that is resistant to alkaline earth metals is used to melt the mother alloy prepared in the step i), and subsequently an alkaline-earth metal is melted with a high frequency to form an alloy containing Si and the alkaline-earth metal element.

An example of a specific method in which metal Si or a mother alloy containing Si is first melted and then an alkaline-earth metal is melted is a method in which metal Si or a mother alloy containing Si is first melted and then an alkaline-earth metal is added thereto.

In addition, Si may be alloyed with a metal M other than the divalent metal element $M^2$ so as to have electrical conductivity. In this case, the melting point of the resulting alloy is preferably lower than that of Si. The alloy of Si and Al is particularly preferable because the melting point thereof is approximately 1,010° C. and thus is lower than the boiling points of alkaline earth metal elements.

In the case where a mother alloy of Si and a metal M other than the divalent metal element $M^2$ is used, the composition thereof is not particularly limited, but the mother alloy preferably has electric conductivity. In this case, preferably, the mixing ratio (molar ratio) of the metal M is usually in the range of 0.01 to 5 with respect to the number of moles of Si being one, so that the resulting mother alloy has a melting point lower than the boiling points of alkaline-earth metal elements. Moreover, metal Si may be further added to the mother alloy containing Si.

In the present invention, metal Si should be melted before an alkaline-earth metal is melted, but the timing to melt raw material metals other than the metal Si and the alkaline-earth metal is not particularly limited. Usually, the raw material metal that is abundantly used or has a high melting point is preferentially melted.

To uniformly disperse the activating element $M^1$, metal Si is preferably melted before the raw material metal for the activating element $M^1$ is melted because of a small amount of the activating element $M^1$ added.

To produce an alloy for a phosphor precursor that is represented by the general formula [3] and contains Si as the tetravalent metal element $M^4$ and at least Sr as the divalent metal element $M^2$, the following melting steps are preferably used.

(1) A mother alloy of Si and the trivalent metal element $M^3$ is prepared. In this step, Si and the trivalent metal element $M^3$ are preferably alloyed in accordance with a ratio of Si to $M^3$ in the general formula [3].

(2) The mother alloy prepared in the step (1) is melted and then Sr is melted.

(3) Then a divalent metal element other than Sr and the activating element $M^1$ are melted.

Also in the case where any raw material is melted, specific temperature conditions and a period of time for melting of the raw material may be appropriately set in response to the raw material used.

Any atmosphere under which the raw material is melted may be used as long as an alloy for a phosphor precursor is prepared. The atmosphere is preferably an inert gas, in particular, argon. A single inert gas may be used. Alternatively, any two or more inert gases may be combined in any proportion.

Any pressure at which the raw material is melted is used as long as an alloy for a phosphor precursor is prepared. The pressure is preferably in the range of $1\times10^3$ Pa to $1\times10^5$ Pa. In view of safety, the raw material is desirably melted at atmospheric pressure or less.

{Casting of Molten Metal}

The raw material is melted to prepare an alloy for a phosphor precursor. Although the alloy for a phosphor precursor is usually obtained as a molten alloy, there are many technical difficulties in directly producing a phosphor from the molten alloy. Thus, the molten alloy is preferably subjected to a casting step of pouring the molten alloy into a mold, thereby preparing a solidified alloy (hereinafter, also referred to as an "alloy ingot").

In this casting step, however, segregation may occur depending on the rate of cooling the molten alloy. In other words, the molten alloy having a uniform composition is cooled into the solid alloy having a nonuniform composition distribution, in some cases. Thus, the cooling rate is preferably maximized. Preferably, the mold is composed of a material such as copper having a high thermal conductivity and has a shape that promotes heat dissipation. Furthermore, the mold is preferably cooled by a technique such as water cooling, as needed.

Preferably, the molten alloy is poured into, for example, a mold having a large bottom area relative to its thickness in order to solidify the molten alloy as rapidly as possible.

Additionally, the degree of segregation varies depending on the composition of the alloy. It is thus preferable to analyze the samples obtained from several points of the alloy ingot with regard to their composition by a necessary analytical technique such as ICP emission spectrometry in order to determine the cooling rate required for the prevention of the segregation.

An inert gas atmosphere is preferred during the casting. An argon atmosphere is particularly preferred. The inert gas may be used alone. A single inert gas may be used. Alternatively, any two or more inert gases may be combined in any proportion.

{Milling of Alloy Ingot}

Before the heating step, the alloy for a phosphor precursor is preferably formed into a powder having desired particle diameters. The alloy ingot prepared in the casting step is preferably milled (milling step) into the alloy powder, having desired particle diameters and particle size distribution, for the phosphor precursor (hereinafter, also referred to simply as an "alloy powder").

Examples of a milling method that can be employed include, but are not particularly limited to, dry milling and wet milling which uses an organic solvent such as ethylene glycol, hexane, or acetone.

This milling step will be described in detail below taking dry milling as an example. This milling step may be divided into several substeps including coarse milling, medium milling, and fine milling substeps, as needed. In this case, the same apparatus may be used in all the substeps. Alternatively, different apparatuses may be used in the substeps.

The coarse milling substep herein means a substep of milling the alloy powder in such a manner that about 90% by weight of the alloy particles have diameters of 1 cm or less. Examples of a mill that can be used in this substep include a jaw crusher, a gyratory crusher, a crushing roll, and an impact crusher. The medium milling substep means a substep of milling the alloy powder in such a manner that about 90% by weight of the alloy particles have diameters of 1 mm or less. Examples of a mill that can be used in this substep include a cone crusher, a crushing roll, a hammer mill, and a disk mill. The fine milling substep means a substep of milling the alloy powder in such a manner that the alloy particles have a weight-average median diameter described below. Examples of a mill that can be used in this substep include a ball mill, a tube mill, a rod mill, a roller mill, a stamp mill, an edge-runner, a vibrating mill, and a jet mill.

Particularly in the final milling substep, a jet mill is preferably used with the intention of preventing the incorporation of impurities. The alloy ingot is preferably ground in advance into particles with diameters of about 2 mm or less for the use of a jet mill. Such a jet mill injects a fluid from its nozzle into the atmospheric pressure so as to grind particles with the expansion energy generated in association with the injection, thereby enabling the control of the particle diameter by changing the milling pressure and the prevention of impurity incorporation. The gauge pressure of milling varies depending on the type of apparatus used but is usually in the range of 0.01 MPa to 2 MPa, preferably from 0.05 MPa and less than 0.4 MPa, and more preferably in the range of 0.1 MPa to 0.3 MPa. An excessively low gauge pressure is likely to lead to excessively large particle diameters of the resulting particles. An excessively high gauge pressure is likely to lead to excessively small particle diameters of the resulting particles.

To prevent the contamination of the alloy with impurities such as iron in any milling substep, the compatibility between a material constituting a mill and the alloy to be ground always has to be good. For example, surfaces to be in contact with particles are preferably lined with ceramic, in particular, alumina, silicon nitride, tungsten carbide, zirconia, or the like.

Furthermore, to prevent the oxidation of the alloy powder, the milling step is preferably performed under an inert gas atmosphere. The type of inert gas is not particularly limited. Usually, gases, such as nitrogen, argon, and helium, may be used alone or in combination of two or more thereof. Considering the cost, nitrogen is particularly preferable.

The oxygen concentration in the atmosphere is not limited as long as the oxidation of the alloy powder is prevented. The oxygen concentration is usually 10% by volume or less and particularly preferably 5% by volume or less. The lower limit of the oxygen concentration is usually about 10 ppm. The oxygen concentration controlled to fall within such a specific range probably contributes to the formation of oxide layers on the alloy powder during the milling step and thereby stabilizes the particles. Performing the milling step in an atmosphere containing more than 5% by volume of oxygen would involve the risk of dust explosion and thus preferably require equipment for suppressing the generation of dust.

The alloy powder may be cooled in the milling step in such a manner that the temperature of the alloy powder is prevented from being increased.

{Classification of Alloy Powder}

Preferably, the resulting alloy powder is screened (classification step) with a screening apparatus based on meshes, such as a vibrating screen and a sifter, an inertial classification apparatus such as an air separator, or a centrifuge such as a cyclone separator so as to have a desired value of the weight-average median diameter $D_{50}$ and desired particle size distribution, and then the resulting alloy powder is subjected to the subsequent steps.

In controlling the particle size distribution, it is preferable to classify coarse particles and return the classified particles to a mill, and it is more preferably to repeat this cycle of classification and/or return seamlessly.

Preferably, the classification step is also performed under an inert gas atmosphere. The type of inert gas is not particularly limited. Usually, inert gases, such as nitrogen, argon, and helium, may be used alone or in combination of two or more thereof. From the viewpoint of achieving good economy, nitrogen is particularly preferable. The oxygen concentration in the inert gas atmosphere is preferably 10% by volume or less and particularly preferably 5% by volume or less.

The diameters of the alloy powder used in the primary nitridation step and the secondary nitridation step described below should be controlled in response to the activities of metal elements constituting the alloy powder. The weight-average median diameter $D_{50}$ is usually 100 μm or less, preferably 80 μm or less, and particularly preferably 60 μm or less, and 0.1 μm or more, preferably 0.5 μm or more, and particularly preferably 1 μm or more. In the case where the alloy contains Sr, the alloy is highly reactive with a surrounding gas. Thus, the weight-average median diameter $D_{50}$ of the alloy powder is usually 5 μm or more, preferably 8 μm or more, more preferably 10 μm or more, and particularly preferably 13 μm or more. When the alloy powder has particle diameters smaller than the range of the weight-average median diameter $D_{50}$ described above, heating rates in nitridation and other reactions tend to increase. This makes it difficult to control such reactions, in some cases. In addition, the alloy powder is easily oxidized in air; hence, for example, oxygen is easily incorporated into a phosphor to be obtained. Thus, such alloy powder is difficult to handle, in some cases. On the other hand, when the alloy powder has particle diameters larger than the range of the weight-average median diameter $D_{50}$ described above, reactions such as nitridation proceed insufficiently inside each alloy particle, in some cases.

The proportion of alloy particles having a size of 10 μm or less in the alloy powder is preferably 80% by weight or less. The proportion of alloy particles having a size of 45 μm or more is preferably 40% by weight or less.

The value of QD is not particularly limited but is usually 0.59 or less. QD is defined by the expression: $QD=(D_{75}-D_{25})/(D_{75}+D_{25})$ where $D_{25}$ represents a particle size corresponding to an integrated value of 25%, and $D_{75}$ represents a particle size corresponding to an integrated value of 75%. A low value of QD means a narrow particle size distribution.

[II] Heating Step

In the present invention, the resulting alloy for a phosphor precursor (the alloy for a phosphor precursor may be in the form of a powder or blocks but is preferably the alloy powder for the phosphor precursor described above) and/or the nitrogen-containing alloy described below are subjected to nitridation by heating in a nitrogen-containing atmosphere. In the heating step, the secondary nitridation step described below is absolutely necessary. The primary nitridation step described below is performed as needed.

{Primary Nitridation Step}

In the case where the phosphor of the present invention is produced by the production method satisfying requirement 1) in order to industrially efficiently produce the phosphor of the present invention, the primary nitridation step is performed before the secondary nitridation step, as needed. The primary nitridation step is a step of subjecting the alloy powder (may also be in the form of particles or blocks) to nitridation to produce the nitrogen-containing alloy described below. Specifically, the primary nitridation step is a preliminary nitridation step of heating the alloy powder under a nitrogen-containing atmosphere in a predetermined temperature range for a predetermined period of time. Employment of the primary nitridation step results in control of the reactivity between the alloy and nitrogen in the secondary nitridation step, thereby making it possible to industrially produce a phosphor from the alloy.

The alloy powder is subjected to nitridation in this step. As a result, the material constituting the alloy powder is converted from the alloy for a phosphor precursor into a nitrogen-containing alloy, thereby increasing the weight thereof. In this specification, the increase in the weight of the alloy powder is expressed as the rate of weight increase represented by the formula [4]:

(Weight of nitrogen-containing alloy after primary nitridation step−weight of alloy powder before primary nitridation step)/weight of alloy powder before primary nitridation step×100     [4].

In this step, the degree of nitridation can be controlled by reaction conditions such as the nitrogen partial pressure, the temperature, and the heating time.

While the rate of weight increase also depends on the reaction conditions in the secondary nitridation step, the composition of the alloy powder, and the like, the reaction conditions are preferably adjusted in such a manner that the rate of weight increase determined by the formula [4] is usually 0.5% by weight or more, preferably 1% by weight or more, particularly preferably 5% by weight or more. The upper limit of the rate of weight increase is not particularly limited but is, in theory, usually 40% by weight or less and preferably 31% by weight or less. To adjust the rate of weight increase of the alloy powder within the range above, the primary nitridation step may be repeated twice or more. In the case of repeating the primary nitridation step, the number of repetitions is not particularly limited but is usually three times or less and preferably twice or less, in view of the production cost.

The primary nitridation step may be performed by a continuous process or batch process. Preferred reaction conditions differ between the continuous process and the batch process. Thus, with regard to the reaction conditions in the primary nitridation step, the continuous process and the batch process will be separately described below.

From the viewpoint of achieving good productivity, the continuous process is more preferable than the batch process. That is, in the case where the primary nitridation step is performed by the continuous process, heating is preferably performed at a higher concentration of nitrogen and a higher temperature for a shorter period of time compared with those in the batch process.

<Continuous Process>

Type of Apparatus

In the case where the primary nitridation step is performed by the continuous process, an apparatus, e.g., a rotary kiln, a tunnel furnace, a belt furnace, or a fluidized-bed furnace, may be used. In particular, a rotary kiln is preferably used.

In the case of using the rotary kiln, an alloy powder is heated under a stream of a nitrogen-containing gas while a refractory cylindrical furnace tube is being rotated. Continuous feeding of the alloy powder into the inclined furnace tube makes it possible to perform continuous treatment. The use of the rotary kiln makes it possible to stir the alloy powder during the heating, thereby inhibiting the fusion of particles of the alloy powder and thus improving the gas-solid contact efficiency. This results in uniform nitridation treatment and a reduction in heating time. The rotary kiln preferably has a structure through which an atmospheric gas can pass. Furthermore, the rotary kiln is preferably capable of controlling the residence time and the feed rate of an alloy powder.

Alternatively, an alloy powder may be subjected to nitridation with a vertical furnace while the alloy powder is being dropped therein.

Any rotation speed of the furnace tube may be used as long as a nitrogen-containing alloy is obtained. The rotation speed is usually 1 rpm or more, preferably 2 rpm or more, and particularly preferably 3 rpm or more, and usually 100 rpm or less, preferably 20 rpm or less, and particularly preferably 8 rpm or less. A rotation speed outside this range may make it difficult to control the motion of the alloy powder. That is, an excessively slow rotation speed is liable to cause adhesion and residence of the alloy powder to the inner wall of the furnace tube. On the other hand, an excessively high rotation speed is liable to cause a reduction in mixing efficiency because the alloy powder is forced against the inner wall of the furnace tube by centrifugal force and is not dropped.

Any angle of inclination of the furnace tube with respect to the horizontal direction is used as long as a nitrogen-containing alloy is obtained. The angle of inclination is usually 0.6° or more, preferably 1° or more, particularly preferably 1.7° or more, and usually 6° or less, preferably 5° or less, and particularly preferably 3.4° or less. An angle of inclination outside the range above tends to make it difficult to control the feed rate of the alloy powder.

In the case where the primary nitridation step is performed with the rotary kiln, it is preferable to prevent adhesion of the alloy powder to the furnace tube. Adhesion of the alloy powder may preclude the discharge of the treated powder and make it difficult to stably perform the treatment. Furthermore, in the case where the furnace tube is heated from the outside with, for example, a heater, adhesion of the alloy powder may substantially reduce the heating temperature due to the effect of the adherend serving as a heat insulator. After the completion of the primary nitridation step, the adherend is detached and removed on account of, for example, the difference in thermal expansion coefficient between the furnace tube and the alloy powder in cooling the furnace tube, in some case. To maintain a constant level of the discharge rate of the nitrogen-containing alloy and a constant degree of nitridation in the primary nitridation step, however, it is more preferable to continue to remove the adherend by, for example, applying vibration and the like to the furnace tube to detach the adherend or physically scraping the adherend away.

Material of Apparatus

In an apparatus used in the continuous process, any material constituting components, such as a firing vessel and a furnace tube, to be in contact with an alloy powder may be used as long as a nitrogen-containing alloy is obtained. Examples of the material that can be used include aluminum oxide, boron nitride, graphite, calcium oxide, magnesium oxide, molybdenum, and tungsten. In the case where the apparatus is used at about 1,100° C. or lower, quartz may also be used. Among these, aluminum oxide and boron nitride are particularly preferably used for the furnace tube. These materials may be used alone or in any combination of two or more in any proportion.

Atmosphere During Heating

An atmosphere during heating essentially contains a nitrogen element. A mixed gas of nitrogen gas and an inert gas other than nitrogen gas flows preferably. In particular, a mixed gas of nitrogen and a rare gas element such as argon flows preferably. This is because the incorporation of such an inert gas into nitrogen gas makes it possible to control the rate of reaction. The inert gases described above may be used alone or in any combination of two or more in any proportion.

The nitrogen concentration in the atmosphere is not limited as long as a nitrogen-containing alloy is obtained. The nitrogen concentration is usually 0.1% by volume or more, preferably 1% by volume or more, and more preferably 3% by volume or more. The upper limit is not particularly limited but is preferably 80% by volume or less. An excessively low nitrogen concentration may lead to the insufficient progress of nitridation. On the other hand, an excessively high nitrogen concentration may make it difficult to control the heating temperature and may increase the amount of the alloy adhering to the furnace tube and the like.

Any oxygen concentration in the atmosphere may be used as long as a nitrogen-containing alloy is obtained. The oxygen concentration is usually 300 ppm or less and preferably 100 ppm or less, and preferably almost zero, usually 0.1 ppm or more, and preferably 1 ppm or more. An excessively high oxygen concentration in the atmosphere may cause the incorporation of oxygen into a nitrogen-containing alloy and a final phosphor, thereby reducing the peak emission wavelength and brightness.

To prevent the incorporation of oxygen, a reducing gas (e.g., hydrogen, carbon monoxide, hydrocarbon, or ammonia) is preferably incorporated into the atmosphere in an amount such that the concentration of the reducing gas is below the explosive limit. The reducing gas may be used alone. Alternatively, two or more reducing gases may be combined in any proportion.

Any pressure may be used during heating as long as a nitrogen-containing alloy is obtained. To prevent the contamination of the system with oxygen in air, the pressure is preferably equal to or higher than the atmospheric pressure. If a furnace used is less airtight, an excessively low pressure may cause the contamination of the system with a large amount of oxygen and a deterioration in the performance of a phosphor produced.

Any nitrogen partial pressure in the atmosphere may be used during heating as long as a nitrogen-containing alloy is obtained. The nitrogen partial pressure is usually equal to or lower than the atmospheric pressure, preferably 0.09 MPa or less, and more preferably 0.08 MPa or less, and usually 0.0005 MPa or more and preferably 0.001 MPa or more. A higher nitrogen partial pressure results in a higher rate of nitridation. An excessively high nitrogen partial pressure results in an excessively high heat generation rate, so that the temperature of the alloy powder may exceed the melting point of the alloy constituting the alloy powder to fuse the alloy particles. This may cause nonuniform nitridation. On the other hand, an excessively low nitrogen partial pressure may cause industrial problems of, for example, a prolonged period of time required for the primary nitridation step and an increase in the amount of the atmospheric gas consumed (e.g., argon gas). Furthermore, Sr or the like may be evaporated from the alloy to cause the deviation of the composition.

Amount of Nitrogen Fed and Feed Rate

In the case of the continuous process, preferably, a predetermined amount of the alloy powder per unit time is fed into the apparatus. To subject the fed alloy powder to nitridation to a desired extent, at least the amount of nitrogen theoretically required per unit time is fed into the apparatus. Specifically, a nitrogen-containing atmospheric gas is preferably fed into the apparatus, the nitrogen content being usually 5% by weight or more and preferably 10% by weight or more, and (the upper limit is not particularly limited) usually 200% by weight or less with respect to the weight of the alloy powder fed per unit time.

The nitrogen-containing atmospheric gas may flow in the countercurrent direction or parallel-flow direction with respect to the feed direction of the alloy powder. Usually, the nitrogen-containing atmospheric gas flows in the countercurrent direction.

Heating Conditions

Any heating temperature may be used as long as a nitrogen-containing alloy is obtained. The heating temperature is usually equal to or higher than a temperature 150° C. lower than the melting point of the alloy for a phosphor precursor and preferably equal to or higher than a temperature 100° C. lower than the melting point of the alloy for the phosphor precursor, and usually equal to or lower than a temperature 10° C. lower than the melting point of the alloy for the phosphor precursor. More specifically, while the heating temperature varies depending on the composition of the alloy, the heating temperature is, for example, usually 800° C. or higher and preferably 900° C. or higher, and usually 2,500° C. or lower and preferably 1,500° C. or lower. An excessively low heating temperature is liable to lead to the insufficient progress of a nitridation reaction. On the other hand, an excessively high heating temperature is liable to cause an increase in the amount of the alloy powder adhering to the furnace tube.

The heating temperature defined here represents the temperature of the furnace tube during heating.

The temperature 100° C. lower than the melting point of the alloy for the phosphor precursor means an approximate temperature of initiation of the nitridation of the alloy for the phosphor precursor.

In this specification, the melting points of the alloys such as the alloy for a phosphor precursor and the nitrogen-containing alloy can be determined from endothermic peaks measured by thermogravimetry-differential thermal analysis (hereinafter, appropriately referred to as "TG-DTA") as described in examples below. The melting points vary depending on the compositions of the alloys. The melting points are about 900° C. to about 1,300° C. In the case of an alloy exhibiting no clear melting point, the decomposition onset temperature is regarded as the melting point of the alloy. In the case of using a plurality of alloys, the melting point of an alloy having the lowest melting point among the alloys is defined as the melting point of the alloys.

Any heating time (holding time at the maximum temperature) within the temperature range above may be used as long as a nitrogen-containing alloy is obtained. The heating time is usually 0.1 minutes or more and preferably 1 minute or more, and usually 1 hour or less, preferably 30 minutes or less, and more preferably 8 minutes or less. An excessively long heating time may cause the deviation of the composition due to the evaporation of an alkaline-earth metal. An excessively short heating time may lead to the insufficient progress of nitridation.

<Batch Process>

Type of Apparatus

In the case where the primary nitridation step is performed by the batch process, for example, a tubular furnace, a general atmosphere furnace, and a rotary kiln may be used. As specific operations, usually, an alloy powder is placed into a refractory firing vessel (e.g., tray or crucible) and heated in such an apparatus.

Firing Vessel

Any shape of the firing vessel into which the alloy powder is placed may be used as long as a nitrogen-containing alloy is obtained. To increase the contact efficiency between an atmosphere and the alloy powder during firing, preferably, the firing vessel does not have an enclosed structure, and a packed bed is not excessively high. The height of the packed bed is usually 30 mm or less, preferably 20 mm or less, and more preferably 15 mm or less, and usually 3 mm or more and preferably 5 mm or more. An excessively high packed bed may cause a nonuniform nitridation reaction. On the other hand, an excessively low packed bed may cause a reduction in productivity.

Any material constituting components, such as the firing vessel, to be in contact with an alloy powder may be used as long as a nitrogen-containing alloy is obtained. Examples of the material that can be used include aluminum oxide, boron nitride, graphite, calcium oxide, magnesium oxide, molybdenum, and tungsten. In the case where the apparatus is used at about 1,100° C. or lower, quartz may also be used. Among these, graphite, aluminum oxide, boron nitride, and quartz are preferably used. More preferably, boron nitride is used. These materials may be used alone or in any combination of two or more in any proportion.

Atmosphere During Heating

An atmosphere during heating is preferably a mixed atmosphere of a nitrogen atmosphere and an inert gas atmosphere. In particular, a mixed atmosphere of nitrogen and a rare gas element such as argon is preferred. This is because the incorporation of the inert gas atmosphere into the nitrogen gas atmosphere makes it possible to control the rate of reaction. The inert gases described above may be used alone or in any combination of two or more in any proportion.

The nitrogen concentration in the atmosphere is not limited as long as a nitrogen-containing alloy is obtained. The nitrogen concentration is usually 0.1% by volume or more, preferably 1% by volume or more, and more preferably 3% by volume or more, and usually 99% by volume or less, preferably 20% by volume or less, and more preferably 10% by volume or less. An excessively low nitrogen concentration may lead to the evaporation of an alkali-earth metal or the like. On the other hand, an excessively high nitrogen concentration may cause the nonuniform progress of nitridation.

Any oxygen concentration in the atmosphere may be used as long as a nitrogen-containing alloy is obtained. The oxygen concentration is usually the same as in the continuous process.

Furthermore, a reducing gas (e.g., hydrogen, carbon monoxide, hydrocarbon, or ammonia) is preferably incorporated into the atmosphere in an amount such that the concentration of the reducing gas is below the explosive limit, in the same way as in the continuous process.

Any pressure may be used during heating as long as a nitrogen-containing alloy is obtained. To prevent the contamination of the system with oxygen contained in air, the pressure is preferably equal to or higher than the atmospheric pressure in the same way as in the continuous process.

Any nitrogen partial pressure in the atmosphere may be used during heating as long as a nitrogen-containing alloy is obtained. The nitrogen partial pressure is usually the same as in the continuous process.

Heating Conditions

Any heating temperature may be used as long as a nitrogen-containing alloy is obtained. The heating temperature is usually equal to or higher than a temperature 150° C. lower than the melting point of the alloy for a phosphor precursor and preferably equal to or higher than a temperature 100° C. lower than the melting point of the alloy for the phosphor precursor, and usually equal to or lower than the melting point of the alloy for the phosphor precursor, preferably equal to or lower than a temperature 10° C. lower than the melting point of the alloy for the phosphor precursor, and more preferably equal to or lower than a temperature 50° C. lower than the melting point of the alloy for the phosphor precursor. More specifically, while the heating temperature varies depending on the composition of the alloy, the heating temperature is, for example, usually 800° C. or higher and preferably 900° C. or higher, and usually 2,500° C. or lower and preferably 1,500° C. or lower. An excessively low heating temperature tends to require a prolonged period of time needed for the completion of the primary nitridation step and in some cases, causes the incomplete progress of nitridation. On the other hand, an excessively high heating temperature may make it difficult to control a nitridation reaction in the primary nitridation step to cause the nonuniform progress of nitridation. Furthermore, heating at a temperature close to the melting point of the alloy for the phosphor precursor is liable to cause a reduction in alloy-nitrogen contact efficiency due to the adhesion of the alloy powder to the vessel and the fusion of particles of the alloy. The heating temperature defined here represents a temperature in the furnace during the heating.

The melting point of the alloy is the same as that in the description for the continuous process.

The heating time varies depending on other conditions such as the type of apparatus and the heating temperature.

The heating time tends to require a prolonged period of time compared with that in the continuous process. The heating time is usually 10 minutes or more, preferably 20 minutes or more, and usually 48 hours or less. An excessively long heating time may cause the deviation of the composition due to the evaporation of an alkaline-earth metal. An excessively short heating time may lead to the insufficient progress of nitridation. The heating time defined here represents the holding time at the maximum temperature.

In the temperature range from a temperature 150° C. lower than the melting point of the alloy for the phosphor precursor to a temperature 10° C. lower than the melting point of the alloy for the phosphor precursor, the temperature is preferably increased at a low heating rate. The heating rate in this temperature range is usually 9° C./min or less and preferably 7° C./min or less. The lower limit of the heating rate is not particularly limited. From the viewpoint of achieving good productivity, the lower limit is usually 0.1° C./min or more and preferably 0.5° C./min or more.

The heating conditions are not particularly limited in the temperature range from a temperature at the initiation of heating to a temperature 150° C. lower than the melting point of the alloy for the phosphor precursor. The temperature may be increased rapidly or slowly. In some cases, in view of the responsiveness of the temperature control of the firing apparatus, the heating rate may be reduced to 9° C./min or less from a temperature below a temperature 150° C. lower than the melting point of the alloy for the phosphor precursor.

Nitrogen-Containing Alloy

In this specification, the nitrogen-containing alloy represents the foregoing alloy after the completion of the primary nitridation step.

The nitrogen-containing alloy contains two or more metal elements constituting a phosphor of the present invention. Furthermore, the nitrogen-containing alloy mainly contains nitrogen as a component other than the metal elements. As one of the indices of the degree of nitridation, the total content of metal elements (percent by weight) determined by the formula [5] can be used. A lower total content of metal elements represents a higher degree of nitridation.

$$\text{The total content of metal elements (wt \%)} = 100 - \{(\text{weight of nitrogen-containing alloy after primary nitridation step} - \text{weight of alloy before primary nitridation step})/\text{weight of nitrogen-containing alloy after primary nitridation step}\} \times 100 \quad [5]$$

The total content (percent by weight) of metal elements in the nitrogen-containing alloy means the content of all metal elements in the nitrogen-containing alloy. A specific range thereof is not limited as long as a phosphor of the present invention is obtained. The total content of metal elements is usually 60% by weight or more, preferably 70% by weight or more, and more preferably 76% by weight or more, and usually 97% by weight or less, preferably 95% by weight or less, and more preferably 93% by weight or less. At a total content of metal elements exceeding the range above, the effect of the primary nitridation step is not provided, in some cases. In theory, it is unlikely that the total content of metal elements is lower than the range above.

The degree of nitridation of the nitrogen-containing alloy may also be specified by the nitrogen content (percent by weight). The nitrogen content can be determined by measuring the amount of nitrogen with, for example, an oxygen-nitrogen analyzer (manufactured by Leco Corporation) and calculating the nitrogen content from the formula [6]:

$$\text{Nitrogen content of nitrogen-containing alloy (wt \%)} = (\text{amount of nitrogen/weight of nitrogen-containing alloy}) \times 100 \quad [6].$$

A specific range of the nitrogen content determined using the formula [6] is not limited as long as a phosphor of the present invention is obtained. The nitrogen content is usually 1% by weight or more, preferably 2% by weight or more, and more preferably 5% by weight or more, and usually 31% by weight or less and preferably 25% by weight or less. An excessively low nitrogen content may cause the insufficient inhibition of heat generation in the secondary nitridation step described below. An excessively high nitrogen content may be uneconomical in time and energy.

The use of a nitrogen-containing alloy having a nitrogen content, which is determined by the formula [6], of 10% by weight or more and preferably 12% by weight or more as a raw material for a phosphor results in a high effect of inhibiting heat generation in the secondary nitridation step. In this case, regardless of the value of the formula [A], a high-performance phosphor tends to be produced, which is particularly preferred.

Preferably, the nitrogen-containing alloy satisfies the formula [7]:

$$0.03 \leq N_1/NP \leq 0.9 \quad [7]$$

wherein in the formula [7], $N_1$ represents the nitrogen content (% by weight) of the nitrogen-containing alloy; and NP represents the nitrogen content (% by weight) of a phosphor to be produced.

The formula [7] indicates the degree of nitridation of the nitrogen-containing alloy with respect to the nitrogen content of a phosphor to be produced by the secondary nitridation step. The nitrogen content of the nitrogen-containing alloy after the completion of the primary nitridation step is naturally smaller than the nitrogen content of a phosphor. The value of the formula [7] is not limited as long as a phosphor of the present invention is obtained. The value of the formula [7] is usually 0.03 or more, preferably 0.04 or more, more preferably 0.05 or more, still more preferably 0.1 or more, and particularly preferably 0.15 or more, and usually 0.9 or less and preferably 0.85 or less.

When the value of $N_1/NP$ of the formula [7] is lower than the range above, the progress of nitridation in the primary nitridation step may be insufficient. In this case, the heat generation rate in the secondary nitridation step tends to increase, thus resulting in a deterioration in the performance of a phosphor. When the value of $N_1/NP$ of the formula [7] exceeds the range above, the nitrogen-containing alloy is unstable, thus making the handling of the nitrogen-containing alloy difficult.

To smoothly perform the secondary nitridation step, preferably, the degree of progress of the nitridation of the nitrogen-containing alloy, which is indicated by, for example, the formulae [5], [6], and [7], is appropriately adjusted in response to the reactivity of an alloy as a raw material. The reactivity of the alloy as the raw material is determined by, for example, the composition and weight-average median diameter $D_{50}$. For example, in the case where the raw material contains Sr or has a small weight-average median diameter $D_{50}$, the raw material is highly reactive with nitrogen. Thus, in the case of using the highly reactive raw material, the degree of nitridation in the primary nitridation step is preferably high. In contrast, in the case of using a raw material with low reactivity, the degree of nitridation in the primary nitridation step is preferably low.

The reactivity of an alloy powder, composed of an alloy for a phosphor precursor, prepared in the milling step with nitrogen can be estimated by TG-DTA measurement of the alloy powder under a stream of nitrogen. Specifically, the alloy powder is allowed to react with nitrogen under atmospheric pressure in the temperature range from a temperature 100° C. lower than the melting point of the alloy for the phosphor precursor to 1,500° C. while the weight of the alloy powder is being monitored by TG-DTA measurement, and then the rate of weight increase is determined.

In this case, there is no problem for the continuous process. In the case where the batch process is employed, the nitrogen concentration in the atmosphere in the primary nitridation step is preferably selected in such a manner the rate of weight increase of the alloy powder is usually 5% by weight/hr or more and preferably 10% by weight/hr or more, and usually 300% by weight/hr or less, preferably 150% by weight/hr or less, and particularly preferably 100% by weight/hr or less (provided that the heating rate is set at 10° C./min). In the case of employing the batch process, when the nitrogen concentration such that the rate of weight increase exceeds the range above is selected, an excessively large exotherm tends to occur in the primary nitridation step. In some cases, heat generated in producing a large amount of a nitrogen-containing alloy causes the fusion or phase separation of the alloy or the decomposition of a nitride, thereby degrading characteristics of a phosphor. When the nitrogen concentration such that the rate of weight increase is lower than the range above is selected, for example, a nitridation reaction does not proceed adequately. This may cause the reduction in productivity and the brightness of a phosphor.

Meanwhile, the oxygen content of a nitrogen-containing alloy can be determined by measuring the amount of oxygen with, for example, an oxygen-nitrogen analyzer (manufactured by Leco Corporation) and calculating the oxygen content from the formula [8]:

$$\text{Oxygen content of nitrogen-containing alloy (wt \%)} = \\ \text{(amount of oxygen/weight of nitrogen-containing alloy)} \times 100 \quad [8].$$

The oxygen content (percent by weight) of the nitrogen-containing alloy is not limited as long as a phosphor of the present invention is obtained. The oxygen content is usually 7.5% by weight or less and preferably 5% by weight or less, and usually 0.1% by weight or more. An excessively high oxygen content may cause a reduction in the brightness of a phosphor produced.

The nitrogen-containing alloy described above is further subjected to nitridation in the secondary nitridation step to provide a phosphor of the present invention. Alternatively, a mixture of the powder of a nitrogen-containing alloy, an alloy powder (alloy powder before the primary nitridation step) prepared in the milling step, and the like is further subjected to nitridation in the secondary nitridation step to provide a phosphor of the present invention. In this case, the heat generation rate in the secondary nitridation step can be controlled; hence, it is possible to mass-produce a phosphor from such an alloy.

The weight-average median diameter $D_{50}$ of an alloy powder of a nitrogen-containing alloy before the secondary nitridation step is preferably adjusted in response to the activity of metal elements constituting the alloy. A specific range thereof is not limited as long as a phosphor of the present invention is obtained. Usually, the weight-average median diameter $D_{50}$ preferably has the same range as the alloy powder of the alloy for a phosphor precursor (alloy powder before the primary nitridation step).

(Cooling and Milling)

In the case where the primary nitridation step is performed, after the completion of the primary nitridation step, the alloy powder prepared in the primary nitridation step may be cooled (cooling step) before the secondary nitridation step.

In the case where an apparatus used in the primary nitridation step differs from an apparatus used in the secondary nitridation step, usually, an alloy powder is cooled to 200° C. or lower, taken out, and placed into the apparatus used in the secondary nitridation step. Also in the case where a single apparatus is used in both of the primary nitridation step and the secondary nitridation step, an alloy powder is temporarily cooled before the change or replacement of the atmosphere in the apparatus. If the cooling is not performed, a sharp change in nitrogen partial pressure may cause a sudden rise in the temperature of the alloy powder to melt the alloy powder. Furthermore, the alloy powder is likely to be altered by contact with the air at a high temperature. The cooling temperature in this case is usually a temperature equal to or lower than a temperature 100° C. lower than the melting point of the nitrogen-containing alloy and preferably a temperature equal to or lower than a temperature 200° C. lower than the melting point of the nitrogen-containing alloy. The lower limit is not particularly limited but usually room temperature or higher.

After cooling, milling and/or mixing is performed as needed. The weight-average median diameter $D_{50}$ of the alloy powder composed of the nitrogen-containing alloy after milling is usually 100 μm or less and is preferably comparable to that of the alloy powder before the primary nitridation step.

The nitrogen-containing alloy after the primary nitridation step has a high critical oxygen concentration compared with the alloy powder, having the same particle diameter range, before the primary nitridation step. Thus, the dust explosion is less likely to occur. That is, the nitrogen-containing alloy after the primary nitridation step has improved handling and safety. However, the nitrogen-containing alloy after the primary nitridation step can be hydrolyzed in air or contaminated with oxygen by oxidation. Thus, the nitrogen-containing alloy after the primary nitridation step is preferably handled in dry air, a nitrogen atmosphere, or in an inert gas atmosphere such as an argon atmosphere. The handling thereof is particularly preferably performed in a nitrogen atmosphere. The inert gases may be used alone. Any two or more of the inert gases may be combined in any proportion.

The oxygen concentration in the atmosphere is usually 5% by weight or less and preferably 4% by weight or less, and usually 0.1 ppm or more. An excessively high oxygen concentration may cause oxidation thereof.

Employment of the primary nitridation step results in control of the reactivity between the alloy and nitrogen in the secondary nitridation step. The amount of a phosphor produced at one time, which varies depending on other conditions, can be increased to 1.5 or more times and preferably 2 or more times that in the case where the primary nitridation step is not performed.

<Secondary Nitridation Step (Nitridation Treatment Step)>

In the secondary nitridation step, a raw material for a phosphor is subjected to nitridation treatment to provide a phosphor. In this case, as the raw material for the phosphor, an alloy, not having been subjected to the primary nitridation step, for a phosphor precursor (preferably, the alloy powder thereof) may be used. A nitrogen-containing alloy (preferably, the alloy powder thereof) prepared in the primary nitridation step may also be used. Furthermore, both of them may be used. From the viewpoint of achieving good industrial productivity, preferably, only the alloy powder of the nitrogen-containing alloy or a mixture of the alloy powder of the alloy for a phosphor precursor and the alloy powder of the nitrogen-containing alloy is subjected to nitridation treatment. Furthermore, in the case where the mixture is subjected to the nitridation treatment, preferably, the proportion of the nitrogen-containing alloy powder is 20% by weight or more. The nitrogen-containing alloy preferably has a total content of metal elements of 97% by weight or less (corresponding to requirement 1)). The whole or part of the alloy for a phosphor precursor is particularly preferably composed of the nitrogen-containing alloy having a nitrogen content of 10% by weight or more. At an excessively small amount of the nitrogen-containing alloy or an excessively low nitrogen content of the nitrogen-containing alloy, there is a possibility that the advantage of the primary nitridation step is not sufficiently afforded.

The nitridation treatment in the secondary nitridation step is performed by placing a raw material for a phosphor into a firing vessel, such as a crucible or a tray, and heating the raw material under a nitrogen-containing atmosphere. Specifically, the nitridation treatment is performed in accordance with a procedure described below.

The raw material for a phosphor is placed into the firing vessel. The material for the firing vessel used is not limited as long as the advantage of the production method of the present invention is afforded. Examples of the material include boron nitride, silicon nitride, carbon, aluminum nitride, and tungsten. Among these, boron nitride is preferred because of excellent corrosion resistance. These materials may be used alone or in any combination of two or more thereof in any proportion.

Any shape of the firing vessel used here may be used as long as the advantage of the production method of the present invention is afforded. Examples of the shape of the bottom of the firing vessel that can be used include shapes having no vertex, such as circles and ellipses, and polygons, such as triangles and rectangles. The height of the firing vessel is not limited as long as the firing vessel can be placed into a furnace. The height of the firing vessel may be low or high. In particular, a shape having good heat dissipation performance is preferably selected.

The firing vessel into which the raw material for a phosphor is charged is placed into a firing apparatus (also referred to as a "furnace"). The firing apparatus used herein is not limited as long as the advantage of the production method of the present invention is afforded. A firing apparatus having the function of controlling the atmosphere in the apparatus is preferred. A firing apparatus also having the function of controlling the pressure is preferred. For example, a hot isostatic press (HIP) and a resistance-heating vacuum/pressure atmosphere heat-treatment furnace are preferred.

Before the initiation of heating, preferably, a nitrogen-containing gas flows into the firing apparatus to sufficiently replace the atmosphere in the system with the nitrogen-containing gas. The system may be evacuated before the nitrogen-containing gas flow, as needed.

Examples of the nitrogen-containing gas used for the nitridation treatment include gases containing a nitrogen element, e.g., nitrogen, ammonia, and a mixed gas of nitrogen and hydrogen. The nitrogen-containing gases may be used alone or in any combination of two or more in any proportion. The oxygen concentration in the system has an effect on the oxygen content of a phosphor to be produced. A phosphor containing too much oxygen would be insufficient in light emission intensity. Thus, a lower oxygen concentration in an atmosphere used in the nitridation treatment is preferred. The oxygen concentration is usually 0.1% by volume or less, preferably 100 ppm or less, and more preferably 10 ppm or less. An oxygen getter such as carbon or molybdenum may be placed at the area of the system to be heated in order to reduce the oxygen concentration, as needed. The oxygen getter may be used alone. Any two or more of oxygen getters may be combined in any proportion.

The nitridation treatment is performed by heating a raw material for a phosphor in the system filled with the nitrogen-containing gas or under a stream of the nitrogen-containing gas. The pressure of the nitrogen-containing gas may be slightly lower than, equal to, or higher than the atmospheric pressure. To prevent the contamination of the system with oxygen in air, the pressure is preferably equal to or higher than the atmospheric pressure. If a furnace used is less airtight, a pressure of less than atmospheric pressure may cause the contamination of the system with a large amount of oxygen and a deterioration in the performance of a phosphor produced. The gauge pressure of the nitrogen-containing gas is preferably 0.2 MPa or more and more preferably 10 MPa or more, and preferably 200 MPa or less.

The heating temperature of the raw material for a phosphor is not limited as long as a phosphor of the present invention is obtained. The heating temperature is usually 800° C. or higher, preferably 1,000° C. or higher, more preferably 1,200° C. or higher, and usually 2,200° C. or lower, preferably 2,100° C. or lower, and more preferably 2,000° C. or lower. A heating temperature of less than 800° C. may cause an extremely prolonged period of time required for the nitridation treatment. A heating temperature exceeding 2,200° C. may cause the evaporation or decomposition of a nitride formed and thus alter the chemical composition of the resulting nitride phosphor. As a result, the phosphor may have deteriorated characteristics, and the reproducibility of the production process may be low.

Furthermore, the heating temperature, which varies depending on the composition and the like of the alloy, is a temperature equal to or higher than a temperature usually 300° C., preferably 400° C., more preferably 500° C. and particularly preferably 700° C. higher than the melting point of the alloy for a phosphor precursor. The melting point of the alloy is the same as that in the description for the primary nitridation step.

The heating time (holding time at the maximum temperature) in the nitridation treatment may be equal to the time required for the reaction between the raw material for a phosphor and nitrogen. The heating time is usually 1 minute or more, preferably 10 minutes or more, more preferably 30 minutes or more, and still more preferably 60 minutes or more. A heating time of less than 1 minute may cause an incomplete nitridation reaction, thereby resulting in a phosphor having deteriorated characteristics. The upper limit of the heating time depends on production efficiency and is usually 24 hours or less.

The nitridation treatment of the raw material for a phosphor results in a phosphor, having a nitride or oxynitride matrix, of the present invention.

In the case where a large amount of the raw material for a phosphor is subjected to the nitridation treatment in the secondary nitridation step at one time, a nitridation reaction may proceed rapidly in response to other conditions, thereby deteriorating characteristics of a phosphor of the present invention. In the case where a large amount of the raw material for a phosphor is subjected to heat treatment at one time, the use of the heating conditions described below further inhibits the progress of the rapid nitridation reaction, which is preferred.

That is, in the secondary nitridation step, the heating rate is 9° C./min or less in the temperature range from a temperature 100° C. lower than the melting point of an alloy for a phosphor precursor to a temperature 30° C. lower than the melting point (hereinafter, also referred to as a "temperature range in which the heating rate is reduced"). The reason the heating rate is reduced in the temperature range from a temperature 100° C. lower than the melting point of the alloy heated to a temperature 30° C. lower than the melting point is described below. Note that also in the case where a nitrogen-containing alloy is used in place of the alloy for a phosphor precursor or where an alloy for a phosphor precursor and a nitrogen-containing alloy are used, the "melting point of an alloy for a phosphor precursor" represents the melting point of the alloy for a phosphor precursor.

A phosphor is typically synthesized by placing a raw material into a firing vessel, such as a crucible or a tray, and heating the raw material in a furnace. A reduction in the residence time of the raw material for a phosphor in the furnace results in an increase in productivity. Thus, the heating rate in a temperature range lower than the temperature range required for the reaction is preferably maximized within the allowable range of the ability of the furnace and the thermal shock properties of the crucible or the like.

However, in the case where a phosphor is industrially produced using an alloy, such as an alloy for a phosphor precursor or a nitrogen-containing alloy, serving as a raw material, a high heating rate may result in the melting of the alloy powder due to heat generated during the nitridation, causing the fusion of particles of the alloy. As a result, a nitridation reaction does not proceed inside the particles of the alloy because nitrogen gas does not permeate into the inside, in some cases. Thus, the resulting phosphor tends to have a reduced brightness. In some cases, the resulting phosphor does not emit light.

Provided that the firing vessel has a constant diameter, when a small amount of the alloy powder is charged, the foregoing phenomenon does not occur because of high heat dissipation and a small amount of heat accumulated during the nitridation reaction. However, when a large amount of the raw material for a phosphor is charged, the heat dissipation performance is reduced. Thus, it is desirable to suppress the exotherm during the nitridation reaction.

Meanwhile, in the case of the synthesis of a phosphor, in particular, a nitride phosphor, an expensive reaction apparatus is usually used because the reaction is performed under high temperature and pressure. For the purpose of cost reduction, it is desirable to increase the amount of the raw material for a phosphor in one operation.

Accordingly, in the production method of the present invention, it is preferred to reduce the heating rate in a specific temperature range described below (corresponding to requirement 2)). This makes it possible to inhibit a deterioration in the performance of a phosphor due to the accumulation of the heat of reaction even when a phosphor is industrially produced using an alloy, such as an alloy for a phosphor precursor or a nitrogen-containing alloy, as a raw material. In particular, in the case where an alloy for a phosphor precursor contains Sr, in some cases, a nitridation reaction proceeds rapidly in the temperature range from a temperature 100° C. lower than the melting point of the alloy for the phosphor precursor to the melting point, thereby sharply increasing the weight of the raw material. The reduction in heating rate in this temperature range results in the effect of eliminating such a sharp increase in weight.

The temperature range in which the heating rate is reduced is usually in the temperature range from a temperature 100° C. lower than the melting point of the alloy for the phosphor precursor to a temperature 30° C. lower than the melting point, preferably from a temperature 150° C. lower than the melting point of the alloy for the phosphor precursor, and more preferably from a temperature 200° C. lower than the melting point, and preferably to the melting point, more preferably to a temperature equal to or higher than a temperature 100° C. higher than the melting point.

The temperature 100° C. lower than the melting point of the alloy for the phosphor precursor indicates an approximate temperature of initiation of the nitridation of the alloy for the phosphor precursor. Furthermore, it is often difficult to control the progress of the nitridation reaction by the heating rate in the temperature range from a temperature 30° C. lower than the melting point to the melting point because the nitridation reaction proceeds rapidly.

The "temperature" used in the temperature range from a temperature 100° C. lower than the melting point to a temperature 30° C. lower than the melting point indicates the temperature in the furnace during the heat treatment, i.e., the pre-set temperature of the firing apparatus.

In the temperature range in which the heating rate is reduced, the heating rate is usually 9° C./min or less and preferably 7° C./min or less. A heating rate exceeding the upper limit is liable to lead to the accumulation of the heat of the rapid reaction, thereby resulting in a phosphor with reduced brightness. The lower limit of the heating rate is not particularly limited. From the viewpoint of achieving good productivity, the lower limit is usually 0.1° C./min or more and preferably 0.5° C./min or more.

In the temperature range below the temperature 100° C. lower than the melting point of the alloy for the phosphor precursor, the heating conditions are not particularly limited, and the temperature may be increased rapidly or slowly. Furthermore, in view of the responsiveness of the temperature control of the furnace, the heating rate may be reduced to 9° C./min or less from a temperature below a temperature 100° C. lower than the melting point of the alloy.

In the case where heating is continued after the temperature reaches the temperature 30° C. lower than the melting point of the alloy for the phosphor precursor, it is preferred to slowly increase the temperature also in the temperature range from the temperature 30° C. lower than the melting point to the melting point. That is, preferably, the heating rate is, but not particularly limited to, usually 9° C./min or less and particularly 7° C./min or less, and usually 0.1° C./min or more and particularly 0.5° C./min or more. In a high temperature range exceeding a temperature 10° C. higher than the melting point, there is no advantage of the reduction in heating rate. It is thus preferred to set the heating rate to 10° C./min or more, e.g., 10° C./min to 100° C./min, in this high temperature range to increase productivity.

The melting point of the alloy for the phosphor precursor is the same as that in the description for the primary nitridation step.

As described above, nitridation of the alloy for the phosphor precursor and/or the nitrogen-containing alloy results in the production of a phosphor of the present invention.

[III] Other Additional Step

{Reheating Step}

A phosphor prepared in the secondary nitridation step may be subjected to a reheating step (reheat treatment) to grow particles, as needed. This may result in particle growth, thereby affording a phosphor having improved characteristics, e.g., high light emission intensity.

In this reheating step, the phosphor may be cooled to room temperature and then heated again. When the reheat treatment is performed, the heating temperature is usually 1,200° C. or higher, preferably 1,300° C. or higher, more preferably 1,400° C. or higher, and particularly preferably 1,500° C. or higher, and usually 2,200° C. or lower, preferably 2,100° C. or lower, more preferably 2,000° C. or lower, particularly preferably 1,900° C. or lower. Heating at a temperature less than 1,200° C. is liable to cause the reduction of the effect of growing the particles of the phosphor. Heating at a temperature exceeding 2,200° C. may result in the decomposition of the phosphor as well as waste of heating energy. To prevent the decomposition of the phosphor, the pressure of nitrogen partially constituting the atmospheric gas needs to be greatly increased, so that the production cost tends to be increased.

Preferably, the phosphor is basically reheated in a nitrogen gas atmosphere, an inert gas atmosphere, or a reducing atmosphere. Any one of inert gases may be used alone. Alternatively, any two or more inert gases may be combined in any proportion. Furthermore, any one of reducing gases may be used alone. Alternatively, any two or more reducing gases may be combined in any proportion. The oxygen concentration in the atmosphere is usually 1,000 ppm or less, preferably 100 ppm or less, and more preferably 10 ppm or less. The reheat treatment of the phosphor in an oxidizing atmosphere, such as an oxygen-containing gas with an oxygen concentration exceeding 1,000 ppm or air, may cause the oxidation of the phosphor; hence, a target phosphor may not be obtained. The atmosphere preferably contains a trace amount of oxygen, for example, 0.1 ppm to 10 ppm of oxygen, because the phosphor can be synthesized at a relatively low temperature.

With respect to the pressure conditions during the reheat treatment, to prevent the contamination of the system with oxygen in air, a pressure equal to or higher than atmospheric pressure is preferred. Like the heating step described above, if a firing apparatus is less airtight, an excessively low pressure may cause the contamination of the system with a large amount of oxygen and a deterioration in the performance of a phosphor produced.

The heating time (holding time at the maximum temperature) in the reheat treatment is usually 1 minute or more, preferably 10 minutes or more, and more preferably 30 minutes or more, and usually 100 hours or less, preferably 24 hours or less, and more preferably 12 hours. An excessively short heating time is liable to cause insufficient particle growth. An excessively long heating time is liable to cause waste of heating energy. In some cases, nitrogen may be removed from the surface of the phosphor to deteriorate the light emission properties.

{Post-Treatment Step}

The resulting phosphor may be subjected to a post-treatment step, such as a dispersion step, classification step, a washing step, and a drying step, as needed, and then used for various applications.

<Dispersion Step>

In the dispersion step, aggregating phosphor particles due to particle growth and sintering in the nitridation step are disintegrated by the application of a mechanical force. Examples of a method of disintegration include disintegration with a jet mill utilizing a stream of a gas; and disintegration with a ball mill and bead mill using media.

<Classification Step>

The phosphor powder dispersed by the method described above may be subjected to the classification step so as to have an intended particle size distribution. The classification is performed with a screening apparatus based on meshes, such as a vibrating screen and a sifter, an inertial classification apparatus such as an air separator, or a centrifuge such as a cyclone separator.

<Washing Step>

In the washing step, after the phosphor is roughly milled with, for example, a jaw crusher, a stamp mill, or a hammer mill, the resulting coarse particles of the phosphor are washed with a neutral solution or an acidic solution (hereinafter, also referred to as a "washing medium").

The neutral solution used here is preferably water. The type of water that can be used is, but not particularly limited to, preferably desalted water or distilled water. The electric conductivity of water used is usually 0.0064 mS/m or more, and usually 1 mS/m or less and preferably 0.5 mS/m or less. The temperature of water used is usually equal to room temperature (about 25° C.). Alternatively, the use of warm or hot water preferably having a temperature of 40° C. or higher and more preferably 50° C. or higher, and preferably 90° C. or lower and more preferably 80° C. or lower may reduce the number of times of washing of the phosphor particles, washing being performed in order to obtain a target phosphor.

The acidic solution is preferably an acidic aqueous solution. The type of the acidic aqueous solution is not particularly limited, and the acidic aqueous solution may contain one or more mineral acids such as hydrochloric acid and sulfuric acid. The acid concentration of the acidic aqueous solution is usually 0.1 mol/L or more and preferably 0.2 mol/L or more, and usually 5 mol/L or less and preferably 2 mol/L or less. The acidic aqueous solution is more preferable than a neutral aqueous solution because the efficiency of removing soluble ions from the phosphor can be high. An acid concentration of the acidic aqueous solution used in the washing step exceeding 5 mol/L may cause the dissolution of surfaces of the phosphor. An acid concentration of the acidic aqueous solution of less than 0.1 mol/L is liable to lead to an insufficient effect of using acid.

In the present invention, as the acidic solution used for washing, a highly corrosive acid such as hydrofluoric acid is not necessary.

The washing media may be used alone or in any combination of two or more in any proportion.

A method for washing the phosphor is not particularly limited. An example of the method is a method including adding the resulting phosphor particles to the neutral or acidic solution (washing medium), stirring the mixture for a predetermined period of time to form a dispersion, and subjecting the phosphor particles to solid-liquid separation.

A stirring technique used to wash the phosphor is not particularly limited as long as the phosphor particles are uniformly dispersed. For example, a stirrer with a chip or an agitator may be used.

The amount of the washing medium used is not particularly limited. An excessively small amount of the washing medium does not result in a sufficient washing effect. An excessively large amount of the washing medium is unreasonable. Thus, the weight of the washing medium used is preferably 2 or more times and more preferably 5 or more times the weight of the phosphor washed, and preferably 1,000 or less times and more preferably 100 or less times the weight of the phosphor washed.

The washing time may be a time such that the phosphor is brought into sufficient contact with the washing medium. The washing time is usually in the range of one minute to one hour.

A technique for solid-liquid separation between the washing medium and the phosphor particles is not particularly limited. Examples thereof include filtration, centrifugation, and decantation.

The method for washing the phosphor particles is not limited to the foregoing method including stirring the phosphor particles in the washing medium to form a dispersion and subjecting the dispersion to solid-liquid separation. For example, a method for exposing the phosphor particles to a flow of the washing medium may be employed.

A plurality of such washing steps may be performed. In the case where the plurality of washing steps are performed, washing with water may be combined with washing with the acidic aqueous solution. In this case, to prevent the acid from remaining on the phosphor, the phosphor is preferably washed with the acidic aqueous solution and then with water. The phosphor may be washed with water, with the acidic aqueous solution, and then with water.

In the case where the plurality of washing steps are performed, the milling step and/or the classification step may be performed between the washing steps.

The phosphor is preferably washed until the electric conductivity of a supernatant liquid is reduced to a predetermined value or less, the supernatant liquid being obtained from the below-described water-dispersing test to which the washed phosphor is subjected to.

Specifically, the washed phosphor is disintegrated or milled with a dry ball mill as needed. The phosphor particles are classified by sieving or levigation so as to have an intended weight-average median diameter. The phosphor particles are stirred in water weighing ten times as much as the phosphor for a predetermined period of time, e.g., 10 minutes so as to be dispersed. The dispersion is allowed to stand for 1 hour, leading to spontaneous sedimentation of the phosphor particles having a specific gravity higher than that of water. The supernatant liquid at this point is measured with regard to its electric conductivity. The washing operation above is repeated as needed until the electric conductivity of the supernatant liquid usually reaches 50 mS/s or less, preferably 10 mS/m or less, and more preferably 5 mS/s or less.

The water used for the water-dispersing test is not particularly limited and is preferably desalted water or distilled water as described for the washing medium. The electric conductivity is usually 0.0064 mS/m or more, and usually 1 mS/m or less and preferably 0.5 mS/m or less. The temperature of water used for the water-dispersing test is usually room temperature (about 25° C.)

The phosphor is washed as described above to further improve the brightness of the phosphor.

The electric conductivity of the supernatant liquid obtained from the water-dispersing test of the phosphor may be measured with, for example, a conductivity meter "EC METER CM-30G", manufactured by DKK-TOA Corporation.

When components constituting the phosphor are partially dissolved in the water to form ions, the electric conductivity of the supernatant liquid obtained from the water-dispersing test of the phosphor is increased. The fact that the electric conductivity of the supernatant liquid is low indicates that the water-soluble component content of the phosphor is low.

Furthermore, the phosphor is subjected to the washing step, thereby reducing the oxygen content of the phosphor, in some cases. This is probably because oxygen-containing impurities, for example, hydroxides formed by the hydrolysis of nitrides with low crystallinity are removed from the phosphor.

For example, in a step of washing the phosphor of the present invention, phenomena described below probably occur.

(1) Nitrides with low crystallinity are hydrolyzed into hydroxides such as $Sr(OH)_2$, and the hydroxides are dissolved in water. Washing with hot water or a dilute acid effectively removes these compounds, thereby reducing the electric conductivity. An excessively high acid concentration in the washing medium or an excessively prolonged period of time for exposing the phosphor to the acidic aqueous solution may cause the decomposition of the phosphor.

(2) Boron from the boron nitride (BN) crucible used in the heating step described above forms water-soluble boron-nitrogen-alkaline earth compounds to contaminate the phosphor. Washing described above results in the decomposition and removal of these compounds.

The reason for improvement in luminous efficiency and brightness by washing is not completely clear but probably is as follows: When the phosphor immediately after firing is exposed to air, the phosphor slightly smells like ammonia. Thus, unreacted or insufficiently reacted portions of the phosphor are decomposed and removed by washing.

<Drying Step>

After the completion of the washing described above, the phosphor is dried in such a manner that no water remains on the phosphor. The resulting phosphor is provided for use. A specific operation will be taken as an example. After the completion of the washing, the resulting phosphor slurry is dehydrated with, for example, a centrifuge. The resulting dehydrated cake is placed on a tray for drying. The cake is dried in the temperature range of 100° C. to 200° C. until the water content of the cake reaches 0.1% by weight or less. The resulting dry cake is slightly disintegrated by, for example, sieving to yield a phosphor.

A phosphor is used in the form of a powder and dispersed in a dispersion medium, in many cases. To facilitate such a dispersing operation, the phosphor may be subjected to various surface treatments. This is a common technique made by those skilled in the art. With respect to the phosphor having been subjected to surface treatment, it is appropriately understood that the phosphor before subjected to the surface treatment is regarded as the phosphor of the present invention.

[IV] Production of Alloy by Atomization

An alloy for a phosphor precursor and a nitrogen-containing alloy may be produced by the method described above. Alternatively, an alloy for a phosphor precursor and a nitrogen-containing alloy may be produced through the steps (a) to (c) below. This provides an alloy powder, having an angle of repose of 45° or less, for a phosphor precursor (corresponding to requirement 4).

(a) Among metals, Ln, Ca, Sr, $M^{II}$, $M^{III}$, and $M^{IV}$, constituting a phosphor, two or more of these metals are melted into a molten alloy containing these elements (melting step).

(b) The molten alloy is reduced in size in an inert gas (size-reduction step).

(c) The molten alloy that has been reduced in size is solidified to provide an alloy powder (solidifying step).

That is, this method includes reducing the molten alloy in size in the gas and solidifying the reduced molten alloy to yield a powder. In the size-reduction step (b) and the solidifying step (c), the molten alloy is preferably formed into a powder by, for example, a process for spraying the molten alloy, a process for rapidly cooling the molten alloy with a roll or a gas flow to yield small-sized alloy ribbons, or an atomization process. Among these, the atomization process is preferably used.

The atomization process represents a process of dropping or discharging a liquid from a nozzle, atomizing the liquid with jet fluid into droplets, and solidifying the droplets to yield a powder. Examples of the atomization process include a water atomization process, a gas atomization process, and a centrifugal atomization process. Among these, a gas atomization process is particularly preferred because of low contamination with impurities such as oxygen and the formation of spherical alloy particles. A "levi-atomization" process may be employed in the present invention. The levi-atomization process means a gas atomization process combined with levitation melting. This process makes it possible to prevent a raw material from coming into contact with a crucible.

For the purpose of producing an alloy for a phosphor precursor, raw material metals or alloys thereof are weighed in the same way as in the description of {Weighing of Raw Material}. The raw materials melted in the same way as in the description of {Melting of Raw Material} to prepare a molten alloy for a phosphor precursor.

The resulting molten alloy is then subjected to the size-reduction step (b). The molten alloy may be subjected to the size-reduction step (b) without other processing. Alternatively, the molten alloy may be processed as follows: The molten alloy cooled and cast into an alloy ingot. The alloy ingot is melted and then subjected to the size-reduction step (b).

Furthermore, the size-reduction step (b) and the solidifying step may be performed in one operation. In particular, in the gas atomization process, the steps can be easily performed in one operation.

The gas atomization process will be taken as an example.

Figure 4:
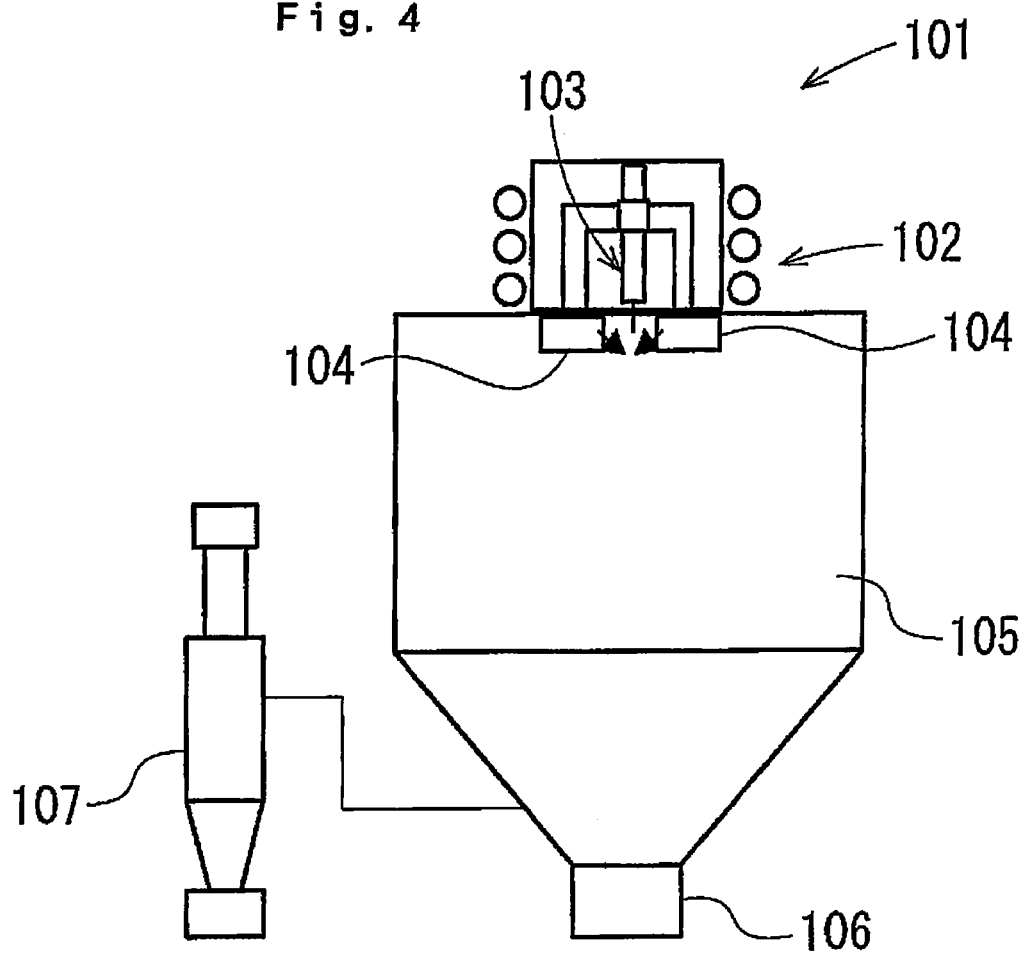
FIG. 4 is a schematic view of a gas atomizer suitable for a reduction in size of a molten alloy and the solidification of the molten alloy.

FIG. 4 schematically illustrates an apparatus for atomizing an alloy by the gas atomization process. In this apparatus shown in FIG. 4, raw material metals and/or alloys thereof are melt in a melting chamber 101 provided with an induction coil 102 (as described above, there are two cases: one case in which the raw material metals are melted to prepare a molten alloy, and then the molten alloy is atomized by the gas atomization process without other processing, and the other case in which the molten alloy is solidified and cast into an ingot, and then the ingot is melted. In the following description of the atomization process, they are simply referred to as a "raw material alloy"). The resulting molten alloy is allowed to fall from a small hole formed in the bottom of a crucible 103 arranged in the melting chamber 101 to form a stream or droplets of the molten alloy. Jet blasts of an atomization gas from injection nozzles 104 are delivered to the falling molten alloy. The falling molten alloy is successively atomized by the energy of the jet blasts of the atomization gas. The resulting minute droplets are solidified in an injection chamber 105 to produce an alloy powder. Usually, coarse particles of the resulting alloy powder are directly collected in a collection chamber 106. Fine particles thereof are collected with a cyclone 107. A molten-alloy receiver for removing unatomized molten alloy may be arranged in the injection chamber 105.

The pressure in the melting chamber 101 is not limited as long as a phosphor of the present invention is produced. The pressure therein is preferably in the range of $1\times10^3$ Pa to $1\times10^5$ Pa. More preferably, the pressure is equal to or less than atmospheric pressure in view of safety. The melting chamber 101 is preferably filled with an inert gas atmosphere in order to prevent the oxidation of the metal. Examples of the inert gas include rare gas elements such as helium, neon, and argon. Among these, argon is preferred. These inert gases may be used alone or in any combination of two or more in any proportion.

The material for the crucible 103 is not limited as long as a phosphor of the present invention is produced. Examples of the material that can be used include aluminum oxide, calcium oxide, magnesium oxide, graphite, and boron nitride. Aluminum oxide or boron nitride is preferred because it can prevent the contamination with impurities. These materials for the crucible 103 may be used alone or in any combination of two or more in any proportion.

A method for melting the raw material alloy is not limited. Preferably, the raw material alloy is melted by high-frequency melting in the same way as in the melting step described in {Melting of Raw Material}. The molten alloy in the crucible 103 is maintained at a temperature equal to or higher than the solidifying point of the raw material alloy or metal, preferably 1,450° C. or higher and more preferably 1,480° C. or higher, and usually 1,800° C. or lower, preferably 1,700° C. or lower, and more preferably 1,600° C. or lower by supplying the high-frequency induction coil 102 with power.

The injection nozzles 104 are usually composed of a high heat resistance ceramic material. In particular, the injection nozzles 104 are preferably composed of aluminum oxide, calcium oxide, or boron nitride. The inner diameter of each of the nozzles is appropriately selected in response to, for example, the viscosity of the molten alloy. The inner diameter thereof is usually 0.5 mm or more and preferably 1 mm or more, and usually 5 mm or less and preferably 3 mm or less.

The atomization gas is preferably an inert gas because the gas collides directly with the molten alloy. Among inert gases, nitrogen or a rare gas such as argon is preferred. These inert gases may be used alone or in any combination or two or more in any proportion.

The temperature of the atomization gas is not limited but is usually equal to room temperature.

The blast pressure of the atomization gas is not limited as long as an alloy powder with a desired particle diameters. The blast pressure thereof is usually 10 kg/cm$^2$ (0.98 MPa) or more and preferably 20 kg/cm$^2$ (1.96 MPa) or more, and usually 100 kg/cm$^2$ (9.8 MPa) or less and preferably 80 kg/cm$^2$ (7.84 MPa) or less. A blast pressure outside the range above is liable to cause a reduction in yield.

The injection chamber 105 and the collection chamber 106 are preferably filled in an inert gas atmosphere or a nitrogen atmosphere. A nitrogen atmosphere or a nitrogen-containing inert gas atmosphere is more preferred for economic reasons.

The nitrogen concentration in each of the injection chamber 105 and the collection chamber 106 is not limited as long as a phosphor of the present invention is produced. The nitrogen concentration thereof is usually 0.1% or more, preferably 10% or more, and more preferably 20% or more, and usually 100% or less. An excessively low nitrogen concentration may cause the evaporation of highly volatile metal components from surfaces of the particles in the course of atomization and collection of the resulting alloy powder, thereby changing the surface composition.

The pressure in each of the injection chamber 105 and the collection chamber 106 is usually equal to or near atmospheric pressure. The temperature in each of the injection chamber 105 and the collection chamber 106 is not particularly limited as long as the temperature is equal to or lower than the melting point of the alloy for a phosphor precursor. The temperature in the injection chamber 105 is usually in the range of 0° C. to 950° C. The temperature in the collection chamber 106 is usually 0° C. or higher and preferably 20° C. or higher, and usually 400° C. or lower and preferably 40° C. or lower.

In the solidifying step (c), preferably, the droplets of the molten alloy formed by the jet fluid are subjected to rapid cooling. The rapid cooling represents an operation of rapidly cooling the molten alloy with a high temperature. The period of time required for solidifying the droplets of the molten alloy is not limited as long as a phosphor of the present invention is produced. The period of time is usually 1 minute or less, preferably 30 seconds or less, more preferably 10 seconds or less, and still more preferably 3 seconds or less. In the gas atomization process described above, the alloy powder is produced by allowing the molten alloy falling through the small hole to collide with the atomization gas to atomize the molten alloy. In this case, from the moment the molten alloy has been atomized into fine particles, each of the particles is in a state in which each particle is rapidly cooled by thermal radiation from the surface thereof and the atomization gas. The particles can be rapidly solidified because of its large surface area for dissipating heat with respect to its volume, which is preferred.

In the gas atomization process, in the size-reduction step (b) and the solidifying step (c), by controlling the atomization gas and/or the nitrogen concentration or the like in the atmosphere in the injection chamber 105 and the collection chamber 106, the primary nitridation step proceeds while the alloy powder is being formed, thereby producing a nitrogen-containing alloy. In this case, for example, condition i) described below is preferably satisfied. More preferably, both conditions i) and ii) are satisfied.

i) At least any one of the atomization gas and the atmospheres in the injection chamber 105 and the collection chamber 106 is a nitrogen-containing atmosphere with a high nitrogen concentration. The nitrogen concentration is preferably close to 100% by volume. The nitrogen concentration is usually 90% by volume or more, preferably 95% by volume or more, and more preferably 98% by volume or more.

ii) The temperature of each of the injection nozzles 104 and the bottom of the crucible 103 is, which varies depending on the melting point of the alloy, usually 900° C. or higher and preferably 1,000° C. or higher, and usually 1,300° C. or lower and preferably 1,200° C. or lower. In this case, for example, heating may be performed by high-frequency melting. Alternatively, the atomizer may be designed so as to the temperature is achieved by heat conduction from the melting chamber 101.

The resulting alloy powder is subjected to classification treatment, as needed, and is then subjected to the primary nitridation step and/or the secondary nitridation step. The resulting alloy powder is screened with a screening apparatus based on meshes, such as a vibrating screen and a sifter, an inertial classification apparatus such as an air separator, or a centrifuge such as a cyclone separator so as to have the foregoing desired value of the weight-average median diameter $D_{50}$ and desired particle size distribution.

Preferably, the classification step is also performed under an inert gas atmosphere. The oxygen concentration in the inert gas atmosphere is preferably 10% by volume or less and particularly preferably 5% by volume or less. The type of inert gas is not particularly limited. Usually, gases, such as nitrogen, argon, and helium, may be used alone or in combination of two or more thereof. From the viewpoint of achieving good economy, nitrogen is particularly preferable.

As described above, the powder of the alloy for a phosphor precursor or the powder of the nitrogen-containing alloy is prepared also by the atomization process and the like. According to this process, in particular, (a) since the molten alloy obtained in the melting step is atomized, every steps of a procedure, from the raw material metals to production of the alloy powder and the nitrogen-containing alloy, can be continuously performed. Furthermore, by arranging a transportation means (e.g., a pipeline or a conveyor belt) configured to transport the resulting alloy powder and/or nitrogen-containing alloy to a firing apparatus used in the secondary nitridation step, every steps of a procedure, from the raw material metals to the production of a phosphor, can be successively performed.

[V] Characteristics of Alloy Powder Prepared by Atomization Process or the Like

The alloy powder (powder of the alloy for a phosphor precursor or the nitrogen-containing alloy) prepared by the atomization process or the like described in item [IV] preferably has characteristics described below.

Flowability

The angle of repose, a collapse angle, and a difference angle are used as indices of flowability. These angles can be measured by a method described in Carr et al, Chemical Engineering, January 18, (1965)166-167. For example, these angles can be measured with, for example, a powder tester (Model PT-N, manufactured by Hosokawa Micron Corporation).

The angle of repose is an angle defined by the horizontal plane and the generatrix of a conical pile formed by gently pouring a granular material onto a horizontal surface from a funnel or the like.

In the case where an alloy powder for a phosphor precursor used in the present invention is prepared by the atomization process or the like described above, the angle of repose thereof is usually 45° or less (corresponding to requirement 4)), preferably 40° or less, and more preferably 35° or less. A lower angle of repose is more preferred because a lower angle of repose results in higher flowability, thus providing better handleability in industrial operations. An excessively high angle of repose is liable to cause low flowability, thus making transportation and transfer difficult.

The collapse angle is the slope angle of a pile left after a predetermined impact is applied to a granular material constituting a conical pile with the angle of repose to collapse the pile.

In the case where an alloy powder for a phosphor precursor used in the present invention is prepared by the atomization process or the like described above, the collapse angle is usually 25° or less, preferably 20° or less, and more preferably 15° or less. A lower collapse angle is more preferred.

The difference angle is an angle obtained by subtracting the collapse angle from the angle of repose.

In the case where an alloy powder for a phosphor precursor used in the present invention is prepared by the atomization process or the like described above, the difference angle is preferably 20° or less. An excessively high difference angle is liable to cause a flushing phenomenon, thus making the control difficult, which is not preferred.

The use of an alloy powder having a low angle of repose, a low collapse angle, a low difference angle, and high flowability as a raw material results in improvement in handling, so that transportation and transfer are improved.

Shape

In the case where an alloy powder for a phosphor precursor used in the present invention is prepared by the atomization process or the like described above, with respect to the shape of the alloy particles, average circularity can be used as a numerical index of sphericity.

The average circularity is determined with the formula described below and indicates the degree of approximation of the shape of each particle in a projection view to the corresponding perfect circle:

Average circularity=perimeter of perfect circle with area equal to projected area of particle/perimeter of particle in projection view.

In the case where an alloy powder for a phosphor precursor used in the present invention is prepared by the atomization process or the like described above, the average circularity is usually 0.7 or more, preferably 0.8 or more, and more preferably 0.9 or more. An average circularity closer to 1 is more preferred.

In the case where an alloy powder for a phosphor precursor used in the present invention is prepared by the atomization process or the like described above, the proportion of the number of spherical alloy particles each having an average circularity of 0.9 or more is usually 20% or more and preferably 40% or more.

Weight-Average Median Diameter $D_{50}$

In the case where an alloy powder for a phosphor precursor used in the present invention is prepared by the atomization process or the like described above, the weight-average median diameter $D_{50}$ needs to be adjusted in response to the activity of metal elements constituting the alloy powder and is usually 0.1 μm or more, preferably 1 μm or more, and more preferably 3 μm or more, and 100 μm or less, preferably 50 μm or less, and more preferably 30 μm or less. Furthermore, when the alloy powder contains Sr, the weight-average median diameter $D_{50}$ is usually 5 μm or more, preferably 8 μm or more, more preferably 10 μm or more, and particularly preferably 13 μm or more because of high reactivity with the atmospheric gas.

A weight-average median diameter $D_{50}$ lower than the range above may cause an increase in heat generation rate during a reaction such as nitridation, thereby making the control of the reaction difficult. A weight-average median diameter $D_{50}$ higher than the range above may lead to an inadequate reaction such as nitridation inside the alloy particles, thereby reducing the brightness.

Tap Density

Tap density is the density of a specimen that has been subjected to specific vibrations (tapping). In this specification, the tap density is measured below.

About 10 g of an alloy powder is placed into a 10-mL glass graduated cylinder. The cylinder is manually tapped on a table from a height of about 1 cm to 5 cm at about 50 times/min to 500 times/min until the volume of the powder is not changed (usually 200 times to 800 times). Then the volume (V) of the alloy powder is measured. The tare weight of the graduated cylinder is subtracted from the total weight to determine the net weight (W) of the alloy powder. The value calculated with the formula [9] described below is referred to as a tap density:

$$\text{Tap density (g/mL)}=W(\text{g})/V(\text{mL}) \quad [9].$$

In the case where an alloy powder for a phosphor precursor used in the present invention is prepared by the atomization process or the like described above, the tap density is usually 1.9 g/mL or more and preferably 2 g/mL or more, and usually 4 g/mL or less and preferably 3 g/mL or less. An excessively low tap density may result in difficulty in charging the alloy powder into a reaction vessel in the production of a phosphor, thereby reducing the productivity. An excessively high tap density may cause a reduction in the contact efficiency between the alloy particles and an atmosphere such as nitrogen in the firing step.

Oxygen Content and Carbon Content

In the case where an alloy powder for a phosphor precursor used in the present invention is prepared by the atomization process or the like described above, the oxygen content is usually 2% by weight or less and preferably 1% by weight or less. The lower limit is usually 0.05% by weight or more and preferably 0.1% by weight or more.

In the case where an alloy powder for a phosphor precursor used in the present invention is prepared by the atomization process or the like described above, the carbon content is 0.2% by weight or less and preferably 0.1% by weight or less.

Oxygen and carbon contents of the alloy powder outside the ranges above are liable to cause a reduction in light emission properties of a phosphor produced, which is not preferred.

The atomization of the alloy by the gas atomization process or the like described above results in a reduction in impurities compared with the case where the alloy is mechanically milled with a jet mill or the like. The use of the alloy powder with a low impurity content as a raw material advantageously results in improvement in the brightness of a phosphor produced.

The atomization of the alloy by the gas atomization process described above results in an alloy powder having a uniform microstructure because the homogeneous molten alloy is instantaneously formed into droplets that are rapidly cooled. Furthermore, since the droplets are continuously formed from the same molten alloy, advantageously, the resulting alloy powder has a negligible difference in composition between particles. Moreover, the alloy powder has high flowability and a low impurity content.

[VI] Mixing of Alloy Powder with Nitride or Oxynitride

In the primary nitridation step and/or the secondary nitridation step, an alloy intended to be subjected to nitridation (i.e., an alloy for a phosphor precursor and/or a nitrogen-containing alloy) may be heated in the presence of a nitride or an oxynitride. Alternatively, preferably, the alloy intended to be subjected to nitridation is mixed with a nitride or an oxynitride, and then the resulting mixture is heated (corresponding to requirement 3)). As the nitride or oxynitride, a nitride or an oxynitride containing one or two or more metal elements constituting a phosphor of the present invention (hereinafter, also referred to as a "raw material nitride") is used.

The composition of the raw material nitride is not particularly limited as long as the raw material nitride and the like are combined with the raw material alloy described above to achieve a target phosphor composition. Thus, the raw material nitride preferably contains a tetravalent metal element $M^4$ containing at least Si in the same way as the composition of the phosphor described above. More preferably, the raw material nitride further contains one or more metal elements other than Si. Still more preferably, the raw material nitride contains an activating element $M_1$, a divalent metal element $M^2$, and the tetravalent metal element $M^4$. The divalent metal element $M^2$ is preferably an alkaline-earth metal element. To obtain a uniform phosphor, the raw material nitride preferably contains constituent elements identical to those of a target phosphor. For example, the raw material nitride preferably has a composition represented by the general formula [1]. More preferably, the raw material nitride has a composition represented by the general formula [2].

Specific examples of the raw material nitride include nitrides of elements constituting phosphors, e.g., AlN, $Si_3N_4$, $Ca_3N_2$, $Sr_3N_2$, and EuN; complex nitrides of elements constituting phosphors, e.g., $CaAlSiN_3$, $(Sr,Ca)AlSiN_3$, $(Sr,Ca)_2Si_5N_8$, and $SrSiN_2$; and complex nitrides containing activating elements, e.g., $(Sr,Ca)AlSiN_3$:Eu, $(Sr,Ca)AlSiN_3$:Ce, $(Sr,Ca)_2Si_5N_8$:Eu, $SrSiN_2$:Eu, and $Sr_{1-x}Ca_xSi_2O_2N_2$:Eu. These raw material nitrides may be used alone or in any combination or two or more in any proportion.

The raw material nitride may contain a trace amount of oxygen. The ratio of oxygen to (oxygen+nitrogen) in the raw material nitride is not limited as long as a phosphor of the present invention is obtained. The ratio thereof is usually 0.5 or less, preferably 0.3 or less, and particularly preferably 0.2 or less. An excessively high proportion of oxygen in the raw material nitride may cause a reduction in brightness.

The weight-average median diameter $D_{50}$ of the raw material nitride is not limited as long as the raw material nitride is mixed with other materials without a hitch. Preferably, the raw material nitride is easily mixed with other materials. For example, the weight-average median diameter $D_{50}$ of the raw material nitride is preferably comparable to that of the alloy powder. The specific value of the weight-average median diameter $D_{50}$ of the raw material nitride is not limited as long as a phosphor is obtained. The weight-average median diameter $D_{50}$ is preferably 200 μm or less, more preferably 100 μm or less, particularly preferably 80 μm or less, and still more preferably 60 μm or less, and preferably 0.1 μm or more and more preferably 0.5 μm or more.

The mixing ratio of the raw material nitride to the total amount of the raw materials for a phosphor, i.e., the mixing ratio of the raw material nitride to the total amount of the alloy (alloy powder of the alloy for a phosphor precursor and/or the nitrogen-containing alloy) and the raw material nitride, is usually 1% by weight or more, preferably 5% by weight or more, more preferably 10% by weight or more, and still more preferably 15% by weight or more. An excessively low mixing ratio of the raw material nitride is liable to lead to an insufficient effect of improving the brightness of a phosphor produced. The upper limit of the mixing ratio of the raw material nitride is not particularly limited. An excessively high mixing ratio of the raw material nitride has a tendency to lead to improvement in the brightness of a phosphor produced but a reduction in productivity. Thus, the upper limit is usually 85% by weight or less.

The incorporation of the raw material nitride in the alloy in the primary nitridation step and/or the secondary nitridation step results in a reduction in heat generation rate per unit volume during the nitridation, thereby inhibiting the occurrence of phenomena in which the generated heat causes melting and phase separation of the raw material and decomposition of the resulting nitride to degrade the properties of a phosphor produced.

For example, in the case where a phosphor of the present invention is produced using an alloy powder serving as a raw material, the melting of the alloy powder due to heat generated during the nitridation in the secondary nitridation step may cause the fusion of particles of the alloy, so that a nitridation reaction does not proceed inside the particles of the alloy because nitrogen gas does not permeate through the inside. Thus, the resulting phosphor tends to have a reduced brightness. In some cases, the resulting phosphor does not emit light. Accordingly, the raw material nitride is incorporated in the alloy powder to overcome the foregoing problems.

Provided that a firing vessel has a constant diameter, when a small amount of the alloy powder is charged, the phenomena in which the generated heat causes melting and phase separation of the raw material and decomposition of the nitride or oxynitride do not occur because of high heat dissipation and a small amount of heat accumulated during the nitridation reaction. However, the phosphor is synthesized by reaction under high temperature, leading to large energy consumption. Thus, an increase in the amount of the alloy powder charged at one time is preferred for the purpose of cost reduction. A large amount of alloy powder charged into the firing vessel causes a reduction in heat dissipation performance, thereby possibly resulting in the melting and phase separation of the alloy due to the generated heat and the decomposition of the nitride or oxynitride.

In contrast, the incorporation of the raw material nitride in the alloy in the primary nitridation step and/or the secondary nitridation step results in an increase in the amount of the alloy charged into a reaction vessel for nitridation while the amount of heat is being suppressed, thereby efficiently performing the nitridation treatment. The reason for this is described below. The melting point of the nitride or oxynitride is usually higher than the alloy. Thus, it is speculated that the incorporation of the raw material nitride in the alloy results in improvement in the heat dissipation performance of the whole of the raw materials for the phosphor. Hence, the melting of the alloy during the nitridation is inhibited to allow the nitridation reaction to proceed smoothly, thereby resulting in a high-performance phosphor with high productivity.

[Phosphor]

A phosphor produced by the production method of the present invention (hereinafter, also referred to as a "phosphor of the present invention") will be described below. As the phosphor of the present invention, a phosphor having a nitride or oxynitride matrix is preferred.

In this specification, the matrix of the phosphor means a crystal or glass (amorphous) with which an activating element can form a solid solution and also includes a crystal or glass (amorphous) capable of emitting light without an activating element.

{Composition of Phosphor}

The composition of the phosphor of the present invention is not particularly limited as long as the phosphor is produced by the production method of the present invention. Preferably, the phosphor of the present invention contains the tetravalent metal element $M^4$ containing at least Si and one or more metal elements other than Si. More preferably, the phosphor of the present invention further contains the activating element $M^1$. The metal elements other than Si are preferably alkali-earth metal elements.

The phosphor of the present invention preferably contains the activating element $M^1$, the divalent metal element $M^2$, and the tetravalent metal element $M^4$ containing at least Si. More preferably, the phosphor of the present invention contains the activating element $M^1$, the divalent metal element $M^2$, the trivalent metal element $M^3$, and the tetravalent metal element $M^4$ containing at least Si.

As the activating element $M^1$, various luminescent ions that can be incorporated in a crystalline matrix constituting the phosphor having the nitride or oxynitride matrix may be used. The use of at least one element selected from the group consisting of Cr, Mn, Fe, Ce, Pr, Nd, Sm, Eu, Tb, Dy, Ho, Er, Tm, and Yb results in the production of a phosphor with high light emission properties and is thus preferred.

Preferably, the activating element $M^1$ contains one or two or more elements selected from Mn, Ce, Pr, and Eu. More preferably, the activating element $M^1$ contains Ce and/or Eu because a phosphor emitting red or yellow light with a high brightness is obtained. To enhance the brightness and provide various functions such as a light-accumulating function, the activating element $M^1$ may further contain one or more co-activating agents in addition to Ce and/or Eu.

In addition to the activating element $M^1$, various divalent, trivalent, and tetravalent metal elements may be used. To obtain a phosphor with excellent light emission properties, it is preferred that the divalent metal element $M^2$ be one or more elements selected from the group consisting of Mg, Ca, Sr, Ba, and Zn, the trivalent metal element $M^3$ be one or more elements selected from the group consisting of Al, Ga, In, and Sc, and the tetravalent metal element $M^4$ be one or more elements selected from the group consisting of Si, Ge, Sn, Ti, Zr, and Hf.

Furthermore, a composition in which Ca and/or Sr accounts for 50% by mole or more of the divalent metal element $M^2$ results in a phosphor with excellent light emission properties and is thus preferred. More preferably Ca and/or Sr accounts for 80% by mole or more of the divalent metal element $M^2$, even more preferably accounts for 90% by mole or more thereof, and the most preferably accounts for 100% by mole thereof.

Moreover, a composition in which Al accounts for 50% by mole or more of the trivalent metal element $M^3$ results in a phosphor with excellent light emission properties and is thus preferable. More preferably Al accounts for 80% by mole or more of the trivalent metal element $M^3$, even more preferably accounts for 90% by mole or more thereof, and the most preferably accounts for 100% by mole thereof.

Additionally, a composition in which Si accounts for 50% by mole or more of the tetravalent metal element $M^4$ containing at least Si results in a phosphor with excellent light emission properties and is thus preferable. More preferably Si accounts for 80% by mole or more of the tetravalent metal element $M^4$ containing at least Si, even more preferably accounts for 90% by mole or more thereof, and the most preferably accounts for 100% by mole thereof.

The composition in which Ca and/or Sr accounts for 50% by mole or more of the divalent metal element $M^2$, Al accounts for 50% by mole or more of the trivalent metal element $M^3$, and Si accounts for 50% by mole or more of the tetravalent metal element $M^4$ containing at least Si results in a phosphor with markedly excellent light emission properties and is thus particularly preferable.

A phosphor of the present invention preferably has a chemical composition of the general formula [1]:

$$M^1_a M^2_b M^3_c M^4_d N_e O_f \quad [1]$$

wherein a, b, c, d, e, and f are values satisfying the following requirements:
$0.00001 \leq a \leq 0.15$,
$a+b=1$,
$0.5 \leq c \leq 1.5$,
$0.5 \leq d \leq 1.5$,
$2.5 \leq e \leq 3.5$, and
$0 \leq f \leq 0.5$, wherein in the general formula [1], $M^1$ represents the activating element $M^1$, $M^2$ represents the divalent metal element $M^2$, $M^3$ represents the trivalent metal element $M^3$, and $M^4$ represents the tetravalent metal element $M^4$ containing at least Si.

The reasons why the values a to f in the general formula [1] are preferably within the ranges above are described below.

A value a of less than 0.00001 is liable to lead to insufficient light emission intensity. A value a exceeding 0.15 is liable to lead to a high concentration quenching effect to reduce the light emission intensity. Thus, raw materials are preferably formulated in such a manner that the value a is usually 0.00001 or more, preferably 0.0001 or more, more preferably 0.001 or more, still more preferably 0.002 or more, and particularly preferably 0.004 or more, and usually 0.15 or less, preferably 0.1 or less, more preferably 0.05 or less, still more preferably 0.04 or less, and particularly preferably 0.02 or less.

The composition of a mixture of raw materials is adjusted in such a manner that the sum of the values a and b is usually 1 because atomic sites of the divalent metal element $M^2$ are replaced with the activating element $M^1$ in the crystalline matrix of the phosphor.

A value c of less than 0.5 or a value c exceeding 1.5 is liable to lead to the formation of a heterogeneous phase in the production and a reduction in the yield of the phosphor. Also from the viewpoint of achieving a good light emission intensity, therefore, the raw materials are preferably formulated in such a manner that the value c is usually 0.5 or more, preferably 0.6 or more, and more preferably 0.8 or more, and usually 1.5 or less, preferably 1.4 or less, and more preferably 1.2 or less.

A value d of less than 0.5 or a value d exceeding 1.5 is liable to lead to the formation of a heterogeneous phase in the production and a reduction in the yield of the phosphor. Also from the viewpoint of achieving a good light emission intensity, therefore, the raw materials are preferably formulated in such a manner that the value d is usually 0.5 or more, preferably 0.6 or more, and more preferably 0.8 or more, and usually 1.5 or less, preferably 1.4 or less, and more preferably 1.2 or less.

The value e is a coefficient that indicates the nitrogen content and expressed as the following equation:

$$e = \frac{2}{3} + c + \frac{4}{3}d \quad \text{[Exp. 1]}$$

Substitution of the requirements $0.5 \leq c \leq 1.5$ and $0.5 \leq d \leq 1.5$ into this expression yields:

$1.84 \leq e \leq 4.17$.

In the composition of the phosphor represented by the general formula [1], however, a value e, which represents the nitrogen content, of less than 2.5 is liable to cause a reduction in the yield of the phosphor. Furthermore, a value e exceeding 3.5 is also liable to cause a reduction in the yield of the phosphor. Hence, the value e is usually 2.5≤e≤3.5.

Oxygen in the phosphor represented by the general formula [1] probably results from oxygen contained as an impurity in raw material metals, oxygen introduced in the production process including, for example, the milling step and the nitridation step, and the like. The value f indicating the oxygen content is preferably in the range of 0 to 0.5 as long as decreases in light emission properties of the resulting phosphor are at acceptable levels.

Among the phosphors represented by the general formula [1], a phosphor may have a composition of the general formula [2]:

$$M^{1'}{}_{a'}Sr_{b'}Ca_{c'}M^{2'}{}_{d'}Al_{e'}Si_{f'}N_{g'} \quad [2]$$

Wherein a', b', c', d', e', f', and g' are values satisfying the following requirements:
0.00001≤a'≤0.15,
0.1≤b'≤0.99999,
0≤c'≤1,
0≤d'≤1,
a'+b'+c'+d'=1,
0.5≤e'≤1.5,
0.5≤f'≤1.5,
0.8×(2/3+e'+4/3×f')≤g'≤1.2×(2/3+e'+4/3×f').

$M^{1'}$ represents an activating element selected from a group consisting of Cr, Mn, Fe, Ce, Pr, Nd, Sm, Eu, Tb, Dy, Ho, Er, Tm, and Yb in the same way as $M^1$ in the general formula [1]. Preferably, the activating element $M^{1'}$ contains one or two or more elements selected from Mn, Ce, Pr, and Eu. Particularly preferably, the activating element $M^{1'}$ contains Ce and/or Eu.

$M^{2'}$ represents Mg and/or Ba, preferably Mg. The incorporation of Mg results in a phosphor with an emission peak at a longer wavelength.

The value a' is usually 0.00001 or more, preferably 0.001 or more, and more preferably 0.002 or more, and usually 0.15 or less, preferably 0.05 or less, and more preferably 0.01 or less.

The value b' is usually 0.1 or more, 0.4 or more, and more preferably 0.7 or more, and usually 0.99999 or less.

The value c' is usually 0 or more, and usually less than 1, preferably 0.5 or less, and more preferably 0.3 or less.

The value d' is usually 0 or more, and usually less than 1, preferably 0.5 or less, and more preferably 0.2 or less.

The relationship among a', b', c', and d' usually satisfies $$a'+b'+c'+d'=1.$$

The value e' is usually 0.5 or more, preferably 0.8 or more, and more preferably 0.9 or more, and usually 1.5 or less, preferably 1.2 or less, and more preferably 1.1 or less.

The value f' is usually 0.5 or more, preferably 0.8 or more, and more preferably 0.9 or more, and usually 1.5 or less, preferably 1.2 or less, and more preferably 1.1 or less.

The value g' is usually 0.8×(2/3+e'+4/3×f') or more, preferably 0.9×(2/3+e'+4/3×f') or more, more preferably 2.5 or more, and usually 1.2×(2/3+e'+4/3×f') or less, preferably 1.1×(2/3+e'+4/3×f') or less, and more preferably 3.5 or less.

Hereinafter, a phosphor in which the value b' in the general formula [2] is in the range of 0.4 to 0.99999 and the value d' is zero is referred to as a "phosphor having a high Sr content", in some cased.

Oxygen contained in the phosphor of the present invention probably results from oxygen contained as an impurity in raw material metals, the contamination in the production process including, for example, the milling step and the nitridation step, and the like.

The oxygen content is usually 5% by weight or less, preferably 2% by weight or less, and most preferably 1% by weight or less as long as decreases in light emission properties of the resulting phosphor are at acceptable levels.

Specific examples of the composition of the phosphor include (Sr,Ca,Mg)AlSiN$_3$:Eu, (Sr,Ca,Mg)AlSiN$_3$:Ce, (Sr,Ca,Ba)$_2$Si$_5$N$_8$:Eu, and (Sr,Ca,Ba)$_2$Si$_5$N$_8$:Ce

[Properties of Phosphor]

A phosphor produced in the present invention may have properties described below.

<Emission Color>

The phosphor of the present invention can emit light with an intended emission color, e.g., blue, blue green, green, yellow green, yellow, orange, or red, by adjusting, for example, the chemical composition.

Emission Spectrum

For example, in the case where the phosphor of the present invention is the phosphor having a high Sr content and containing Eu serving as the activating element $M^1$, when the emission spectrum of the phosphor is measured by exciting the phosphor by light having a peak wavelength of 465 nm in view of applications as orange to red phosphors, the phosphor preferably has characteristics described below.

The peak wavelength λp (nm) in the emission spectrum of the phosphor is usually more than 590 nm and preferably 600 nm or more, and usually 650 nm or less and preferably 640 nm or less. When the peak emission wavelength λp is excessively short, the light emitted from the phosphor tends to be yellowish. When the peak emission wavelength λp is excessively long, the light emitted from the phosphor tends to be dark reddish. Both cases are not preferred because the phosphor can emit light with reduced properties as orange to red light.

In the phosphor described above, the full width at half maximum (hereinafter, appropriately referred to as "FWHM") of the emission peak in the emission spectrum is usually more than 50 nm, preferably 70 nm or more, and more preferably 75 nm or more, and usually less than 120 nm, preferably 100 nm or less, and more preferably 90 nm or less. An excessively narrow FWHM may cause a reduction in light emission intensity. An excessively wide FWHM may cause a reduction in color purity.

To excite the phosphor described above by light having a peak wavelength of 465 nm, for example, a GaN-based light-emitting diode can be used. The emission spectrum of the phosphor of the present invention can be measured with, for example, a fluorescence spectrometer (manufactured by JASCO Corporation) including a 150-W xenon lamp as an excitation light source and a CCD multichannel detector C7041 (manufactured by Hamamatsu Photonics K.K.) as a spectrometer. The peak emission wavelength and the full width at half maximum of the emission peak can be calculated from the resulting emission spectrum.

Weight-Average Median Diameter $D_{50}$

The weight-average median diameter $D_{50}$ of the phosphor of the present invention is usually 3 μm or more and preferably 5 μm or more, and usually 30 μm or less and preferably 20 μm or less. An excessively small weight-average median diameter $D_{50}$ may cause a reduction in brightness and lead to aggregation of the phosphor particles. An excessively large weight-average median diameter $D_{50}$ is liable to cause an uneven coating and clogging of a dispenser or the like.

The weight-average median diameter $D_{50}$ in the present invention can be measured with, for example, a laser diffraction-scattering particle size distribution analyzer.

Temperature Characteristics

The phosphor of the present invention also has excellent temperature characteristics. Specifically, in the case where the phosphor is irradiated with light having an emission peak at a wavelength of 455 nm, the ratio of the peak emission intensity at 150° C. in the emission spectrum to the peak emission intensity at 25° C. in the emission spectrum is usually 55% or more, preferably 60% or more, and particularly preferably 70% or more.

The ratio is less likely to exceed 100% because the light emission intensity of a typical phosphor decreases with increasing temperature. The ratio may exceed 100% for any reason. However, a ratio exceeding 150% is liable to lead to a color shift due to a change in temperature.

The phosphor of the present invention has excellent temperature characteristics with regard to its brightness as well as its peak emission intensity described above. Specifically, in the case where the phosphor is irradiated with light having an emission peak at a wavelength of 455 nm, the ratio of the brightness at 150° C. to the brightness at 25° C. is usually 55% or more, preferably 60% or more, and particularly preferably 70% or more.

The temperature characteristics are measured as described below using, for example, an apparatus including a multichannel spectrophotometer MCPD7000 (manufactured by Otsuka Electronics Co., Ltd.) serving as an emission spectrometer, a luminance colorimeter BM5A serving as a brightness measuring apparatus, a 150-W xenon lamp serving as a light source, and a stage having a cooling mechanism with a Peltier element and a heating mechanism with a heater. A cell containing a phosphor sample is placed on the stage. The temperature is changed in the range of 20° C. to 150° C. The surface of the phosphor should be maintained at a constant measurement temperature. The phosphor was excited by light having a peak wavelength of 455 nm obtained by dispersing light from the light source with a diffraction grating, and an emission spectrum is measured. The emission peak intensity is determined from the measured emission spectrum. The measurements of the surface temperature of the phosphor are corrected using values of the temperature measured with a radiation thermometer and a thermocouple.

Other Properties

The phosphor of the present invention preferably has higher internal quantum efficiency. The internal quantum efficiency is usually 0.5 or more, preferably 0.6 or more, and more preferably 0.7 or more. Low internal quantum efficiency is liable to cause a reduction in luminous efficiency and thus is not preferred.

The phosphor of the present invention preferably has higher absorption efficiency. The absorption efficiency is usually 0.5 or more, preferably 0.6 or more, and more preferably 0.7 or more. Low absorption efficiency is liable to cause a reduction in luminous efficiency and thus is not preferred.

{Application of Phosphor}

The phosphor of the present invention has advantageous properties such as high brightness and high color rendering properties and therefore is suitable for various light-emitting devices ("light-emitting devices of the present invention" described below). In the case where the phosphor of the present invention is an orange or red phosphor, for example, a combination of the phosphor of the present invention, a green phosphor, and a blue phosphor results in a white-light-emitting device with high color rendering properties. Such a light-emitting device can be used as a lighting system or a light-emitting section (in particular, a backlight for liquid crystal devices) of a display. The phosphor of the present invention can be used alone. For example, a combination of a near-ultraviolet LED and the orange phosphor of the present invention results in an orange-light-emitting device.

{Phosphor-Containing Composition}

A mixture of the phosphor of the present invention and a liquid medium may also be used. In particular, in the case where the phosphor of the present invention is used for applications such as a light-emitting device, a dispersion of the phosphor dispersed in the liquid medium is preferably used. The dispersion of the phosphor of the present invention dispersed in the liquid medium is appropriately referred to as a "phosphor-containing composition of the present invention".

<Phosphor>

The type of phosphor of the present invention incorporated in the phosphor-containing composition of the present invention is not limited. Any phosphor described above may be selected. The phosphor-containing composition of the present invention may contain only one phosphor of the present invention. Alternatively, the phosphor-containing composition of the present invention may contain any two or more types of phosphors in any proportion. Furthermore, the phosphor-containing composition of the present invention may contain a phosphor different from the phosphor of the present invention, as needed.

<Liquid Medium>

The liquid medium used for the phosphor-containing composition of the present invention is not particularly limited as long as the desired performance of the phosphor is not impaired. For example, any inorganic material and/or organic material may be used as long as, for example, the liquid medium is liquid under intended conditions of use, suitably disperses the phosphor of the present invention, and does not produce an unfavorable reaction.

Examples of the inorganic material include solutions each prepared by hydrolytic polymerization of a metal alkoxide, a ceramic precursor polymer, or a solution containing a metal alkoxide by a sol-gel method; and inorganic materials each prepared by solidifying a combination of these materials (e.g., an inorganic material having a siloxane bond).

Examples of the organic material include thermoplastic resins, thermosetting resins, and photocurable resins. Specific examples thereof include methacrylic resins such as polymethyl methacrylate; styrene resins such as polystyrene and styrene-acrylonitrile copolymers; polycarbonate resins; polyester resins; phenoxy resins; butyral resins; polyvinyl alcohol; cellulose resins, such as ethyl cellulose, cellulose acetate, and cellulose acetate butyrate; epoxy resins; phenolic resins; and silicone resins.

Among these materials, when the phosphor is used in a high-power light-emitting device such as an illuminator, a silicon-containing compound may be preferably used from the viewpoint of achieving good heat resistance, light resistance, and the like.

The silicon-containing compound means a compound having a silicon atom in its molecule. Examples thereof include organic materials such as polyorganosiloxanes (silicone materials); inorganic materials, such as silicon oxide, silicon nitride, and silicon oxynitride; glass materials, such as borosilicates, phosphosilicates, and alkali silicates. Among these materials, a silicone material is preferred from the viewpoint of ease of handling and the like.

The silicone material usually indicates an organic polymer having a main chain composed of siloxane bonds. Examples thereof include compounds represented by the formula (i) and mixtures thereof.

[Chem. 1]

$$(R^1R^2R^3SiO_{1/2})_M(R^4R^5SiO_{2/2})_D(R^6SiO_{3/2})_T(SiO_{4/2})_Q \quad \text{formula (i)}$$

In the formula (i), $R^1$ to $R^6$ may be the same or different, and each are selected from the group consisting of organic functional groups, a hydroxy group, a hydrogen atom.

Furthermore, in the formula (i), M, D, T, and Q each represent a value of 0 or more and less than 1 and satisfy M+D+T+Q=1.

In the case where the silicone material is used to seal a semiconductor light-emitting element that can be used as a first illuminant described below, after sealing is performed with a liquid silicone material, the liquid silicone material can be cured by heat or light.

When silicone materials are categorized on the basis of curing mechanisms, typical examples thereof include addition polymerization curing-type, condensation polymerization curing-type, ultraviolet ray curing-type, and peroxide curing-type silicone materials. Among these materials, addition polymerization curing-type silicone materials (addition-type silicone resins), condensation curing-type silicone materials (condensation-type silicone resins), and ultraviolet ray curing-type silicone materials are preferred. Addition-type silicone materials and condensation silicone materials will be described below.

Addition-type silicone materials indicate silicone materials having polyorganosiloxane chains crosslinked by organic additional bonds. A typical example thereof is a compound having Si—C—C—Si bonds at crosslinking sites, the Si—C—C—Si bonds being obtained by reaction of vinylsilane with hydrosilane in the presence of an addition-type catalyst such as a Pt catalyst. These materials can be commercially available. Examples of specific trade names of addition polymerization-type silicone materials include LPS-1400, LPS-2410, and LPS-3400 manufactured by Shin-Etsu Chemical Co. Ltd.

Condensation-type silicone materials indicate, for example, compounds having Si—O—Si bonds at crosslinking sites, the Si—O—Si bonds being obtained by hydrolysis and polycondensation of alkylalkoxysilane.

Specific examples thereof include polycondensates obtained by hydrolysis and polycondensation of the compounds represented by the general formula (II) and/or (iii) and/or oligomers thereof.

$$M^{m+}X_nY^1_{m-n} \quad \text{(ii)}$$

In the formula (II), M represents at least one element selected from silicon, aluminum, zirconium, and titanium. X represents a hydrolyzable group. $Y^1$ represents a monovalent organic group. m represents the valence of M and an integer of 1 or more, and n represents the number of X groups and an integer of 1 or more, provided that m≥n.

$$M^{s+}X_tY^1_{s-t-1} \quad \text{(iii)}$$

In the formula (iii), M represents at least one element selected from silicon, aluminum, zirconium, and titanium. X represents a hydrolyzable group. $Y^1$ represents a monovalent organic group. $Y^2$ represents u-valent organic group. s represents the valence of M and an integer of 1 or more, t represents an integer of 1 to s–1, and u represents an integer of 2 or more.

The condensation-type silicone materials may contain curing catalysts. Preferred examples of curing catalysts that can be used include metal chelate compounds. Preferably, metal chelate compounds contain any one or more of Ti, Ta, and Zr. Particularly preferably, metal chelate compounds contain Zr. These curing catalysts may be used alone or in any combination of two or more in any proportion.

As the condensation-type silicone materials, members for semiconductor light-emitting devices described in Japanese Patent Application Nos. 2006-47274 to 47277 and Japanese Patent Application No. 2006-176468 are preferred.

Among the condensation-type silicone materials, particularly preferable materials will be described below. In general, silicone materials disadvantageously have low adhesion to semiconductor light-emitting elements substrates on which semiconductor light-emitting elements are mounted, and packages. With respect to silicone materials having high adhesion, in particular, condensation-type silicone materials each having one or more of features [1] to [3] described below are preferred.

[1] The silicon content is 20% by weight or more.

[2] In a solid-state Si nuclear magnetic resonance (NMR) spectrum measured by a method detailed below, at least one peak defined by items (a) and/or item (b) attributed to Si is present:

(a) a peak with a peak top that is located in the chemical shift range of –40 ppm to 0 ppm and with a full width at half maximum of 0.3 ppm to 3.0 ppm using tetramethoxysilane as a standard; and (b) a peak with a peak top that is located in the chemical shift range from –80 ppm to less than –40 ppm and with a full width at half maximum of 0.3 ppm to 5.0 ppm using tetramethoxysilane as a standard.

[3] The silanol content is 0.1% by weight to 10% by weight.

In the present invention, the silicone materials each having feature [1] among features [1] to [3] are preferred. The silicone materials each having features [1] and [2] are more preferred. The silicone materials each having all features [1] to [3] are particularly preferred.

Features [1] to [3] will be described below.

<Feature [1] (Silicon Content)>

The basic skeleton of a known silicone material is of carbon-carbon and carbon-oxygen bonds, and such a silicone material is an organic resin such as an epoxy resin. In contrast, the basic skeleton of the silicone material used in the present invention is of inorganic siloxane bonds and is the same as that of glass (silicate glass). As is clear from Table 1, which is a chemical-bond comparison table, the siloxane bond has excellent characteristics described below as a silicone material.

(I) The bond energy of the siloxane bond is large; hence, the siloxane bond is not easily decomposed by heat or light, leading to satisfactory light resistance.

(II) The siloxane bond is slightly electrically polarized.

(III) The chain structure having a high degree of freedom makes it possible to form a structure with good flexibility. The structure can freely rotate around the siloxane chain.

(IV) The siloxane bond has a high degree of oxidation and thus is not further oxidized.

(V) The siloxane bond has satisfactory electrical insulating properties.

TABLE 1

Chemical-bond comparison table

| Bond | Bond distance (Å) | Bond energy (kcal/mol) | Bond angle (°) |
|---|---|---|---|
| Si—C—Si | 1.64 | 108 | 130~160 |
| C—O—C | 1.43 | 86 | 110 |
| C—C—C | 1.54 | 85 | 109 |

It is understood from these characteristics that a silicone material composed of a silicone having a skeleton in which siloxane bonds are three-dimensionally formed with a high degree of crosslinking behaves like an inorganic material, such as glass or rock, and that a protective film composed of such a silicone material has satisfactory heat resistance and light resistance. In particular, a silicone material having a methyl group as a substituent does not have absorption in the ultraviolet region and thus does not easily decomposed by light. Thereby, such a silicone material has excellent light resistance.

The silicon content of the silicone material suitably used in the present invention is usually 20% by weight or more, preferably 25% by weight or more, and more preferably 30% by weight or more. The upper limit is usually 47% by weight or less because glass that consists of $SiO_2$ has a silicon content of 47% by weight.

The silicon content of the silicone material can be calculated on the basis of results obtained by inductively coupled plasma spectrometry (hereinafter, appropriately abbreviated as "ICP") using, for example, the following method.

[Measurement of Silicon Content]

A silicone material is baked at 450° C. for 1 hour, 750° C. for 1 hour, and 950° C. for 1.5 hours in a platinum crucible in air to remove carbon components. Then, sodium carbonate is added to a small portion of the resulting residue in an amount of 10 or more times the amount of the portion of the residue. The mixture is heated with a burner to melt the mixture and then cooled. Desalted water is added thereto. The resulting solution is diluted to a specific volume in such a manner that the concentration of silicon is about several ppm while the pH is adjusted to approximately neutral with hydrochloric acid. Then ICP analysis is performed.

<Feature [2] (Solid-State Si-NMR Spectrum)>

Measurement of the solid-state Si-NMR spectrum of the silicone material suitable for the present invention demonstrates that at least one peak and preferably a plurality of peaks are observed in the region defined by item (a) and/or item (b) attributed to silicon atoms directly bonded to carbon atoms of organic groups.

The full widths at half maximum are organized by chemical shifts as follows. In the silicone material suitable for the present invention, the full width at half maximum of the peak described in item (a) is generally smaller than that of the peak described in item (b) because of moderate restriction of molecular motion, and is usually 3.0 ppm or less and preferably 2.0 ppm or less, and usually 0.3 ppm or more.

Meanwhile, the full width at half maximum of the peak described in item (b) is usually 5.0 ppm or less and preferably 4.0 ppm or less, and usually 0.3 ppm or more and preferably 0.4 ppm or more.

An excessively large full width at half maximum of the peak observed in each of the chemical shift regions described above means an increase in strain due to severe restriction of molecular motion, thereby may cause easily forming cracks and possibly resulting in a member having poor heat resistance, weather resistance, and durability. Examples of the case where the range of the full width at half maximum is larger than the range described above are as follows: for example, the case in which a large amount of a tetrafunctional silane is used; and the case in which rapid drying in a drying step results in the accumulation of increased internal stress.

In the case where the full width at half maximum of the peak is excessively small, Si atoms present in such an environment do not participate in siloxane crosslinking. For example, the presence of a trifunctional silane remaining in an uncrosslinked state may result in a member having poor heat resistance, weather resistance, and durability compared with those of a material mainly having siloxane bonds.

However, even if a peak of a silicone material containing a small amount of a Si component in a large amount of an organic component has a full width at half maximum within the above range at −80 ppm or more, satisfactory heat resistance, light resistance, and application performance cannot be obtained, in some cases.

The value of the chemical shift of the silicone material suitable for the present invention can be calculated on the basis of results obtained by performing solid-state Si-NMR measurement according to the following method. Analysis of measurement data (analysis of the full width at half maximum and the amount of silanol) is performed by a method in which peaks are separated and extracted by waveform separation analysis using, for example, the Gaussian function and the Lorenz function.

[Solid-State Si-NMR Spectrum Measurement and Calculation of Silanol Content]

In the case where solid-state Si-NMR spectrum measurement of a silicone material is performed, solid-state Si-NMR spectrum measurement and waveform separation analysis are performed under conditions described below. The full width at half maximum of each of the peaks of the silicone material is determined on the basis of the resulting waveform data. The proportion M of silicon atoms of silanol to the total silicon atoms is determined on the basis of the ratio of a peak area resulting from silanol to the total peak area. In comparison to a silicon content separately analyzed, the silanol content is determined.

{System Conditions}

System: Infinity CMX-400 nuclear magnetic resonance spectrometer, manufactured by Chemagnetics Inc.

$^{29}$Si resonance frequency: 79.436 MHz
Probe: CP/MAS probe with a diameter of 7.5 mm
Temperature during measurement: Room temperature
Number of rotation of sample: 4 kHz
Method for measurement: Single-pulse method
$^1$H decoupling frequency: 50 kHz
$^{29}$Si flip angle: 90°
$^{29}$Si 90° pulse duration: 5.0 µs
Repetition time: 600 s
Number of accumulations: 128
Observation range: 30 kHz
Broadening factor: 20 Hz
Standard sample: Tetramethoxysilane For a silicone material, 512 points are recorded as measurement data and zero-filled to 8192 points prior to Fourier transformation.

[Waveform Separation Analysis]

For each of the peaks in the spectrum after Fourier transformation, a peak shape is formed using a Lorentz waveform, a Gaussian waveform, or a mixture of both. Optimization calculation is performed by a nonlinear least-squares method using the center position, height, and full width at half maximum of the peak shape as variable parameters.

The peaks are identified with reference to, for example, AIChE Journal, 44(5), p. 1141, 1998.

<Feature [3] (Silanol Content)>

The silicone material suitable for the present invention has a silanol content of usually 0.1% by weight or more and preferably 0.3% by weight or more, and usually 10% by weight or less, preferably 8% by weight or less, and more preferably 5% by weight or less. The silicone material has a low silanol content and thus excellent performance, i.e., only a small change with time, excellent long-term performance stability, low hygroscopicity, and low moisture permeability. However, a member that does not contain silanol at all has poor adhesion. Therefore, the above-described optimum range of the silanol content is set.

The silanol content of a silicone material can be determined as follows: Solid-state Si-NMR spectrum measurement is performed by the method described in "(Solid-State Si-NMR Spectrum Measurement and Calculation of Silanol content)" in "<Feature [2] (Solid-State Si-NMR Spectrum)". The proportion (%) of silicon atoms of silanol to the total silicon atoms is determined on the basis of the ratio of a peak area resulting from silanol to the total peak area. In comparison to a silicon content separately analyzed, the silanol content is calculated.

The silicone material suitable for the present invention contains an appropriate amount of silanol. Thus, silanol is usually hydrogen-bonded to a polar portion present on a surface of a device, resulting in adhesion. Examples of the polar portion include hydroxy groups and oxygen of metalloxane bonds.

Usually, the silicone material suitable for the present invention is heated in the presence of a proper catalyst to form covalent bonding to the hydroxy groups on a surface of a device by dehydration condensation, thereby resulting in stronger adhesion.

An excessively large amount of silanol may increase the viscosity of the system, which makes application more difficult. Furthermore, an excessively large amount of silanol may increase activity to cause the solidification by heat before low-boiling-point components volatilize, resulting in foaming and an increase in internal stress. This may induce cracking.

<Liquid Medium Content>

The liquid medium content of the phosphor-containing composition of the present invention is not limited unless the content significantly impairs the advantage of the present invention. The liquid medium content is usually 50% by weight or more and preferably 75% by weight or more, and usually 99% by weight or less and preferably 95% by weight or less with respect to the total amount of the phosphor-containing composition of the present invention. When a large amount of the liquid medium is used, there is no particular problem. To obtain a light-emitting device having target chromaticity coordinates, an intended color rendering index, desired luminous efficiency, and the like, usually, the liquid medium is preferably used in the mixing ratio described above. An excessively low liquid medium content may eliminate flowability, making the handling difficult.

The liquid medium serves mainly as a binder in the phosphor-containing composition of the present invention. The liquid medium may be used alone or in combination of two or more in any proportion. For example, in the case where a silicon-containing compound is used to achieve good heat resistance and light resistance, the liquid medium may contain an additional thermosetting resin such as an epoxy resin to the extent that the durability of the silicon-containing compound is not impaired. In this case, the additional thermosetting resin content is usually 25% by weight or less and preferably 10% by weight or less with respect to the total amount of the liquid medium serving as a binder.

<Additional Component>

The phosphor-containing composition of the present invention may further contain additional components in addition to the phosphor and the liquid medium unless they significantly impair the advantage of the present invention. The additional components may be used alone or in combination of two or more in any proportion.

<Advantage of Phosphor-Containing Composition>

According to the phosphor-containing composition of the present invention, the phosphor of the present invention can be easily fixed at an intended position. For example, in the case where the phosphor-containing composition of the present invention is used for producing a light-emitting device, the phosphor-containing composition of the present invention is shaped at an intended position. Curing the liquid medium seals the phosphor of the present invention with the liquid medium, thereby making it possible to easily fix the phosphor of the present invention at an intended position.

{Light-Emitting Device}

A light-emitting device of the present invention will be described below.

The light-emitting device of the present invention (hereinafter, appropriately referred to as a "light-emitting device") indicates a first illuminant (excitation light source) and a second illuminant that emits visible light by irradiation with light emitted from the first illuminant. The second illuminant contains one or two or more of the phosphors of the present invention as a first phosphor.

The composition and the emission color of the phosphor of the present invention used for the light-emitting device of the present invention are not particularly limited as long as the phosphor is the phosphor of the present invention. For example, in the case where the phosphor of the present invention is represented by the general formula [2] and contains Eu serving as the activating element $M^1$, the phosphor of the present invention is usually a phosphor that emits orange to red fluorescence (hereinafter, also referred to as an "orange to red phosphor of the present invention") under irradiation with light from an excitation source. Specifically, in the case where the phosphor of the present invention is an orange to red phosphor of the present invention, the phosphor preferably has an emission peak in the wavelength range of 590 nm to 640 nm. The phosphor of the present invention may be used alone. Alternatively, any two or more of the phosphors may be combined in any proportion.

The weight-average median diameter $D_{50}$ of the phosphor of the present invention used for the light-emitting device of the present invention is usually 10 μm or more and preferably 15 μm or more, and usually 30 μm or less and preferably 20 μm or less. An excessively small weight-average median diameter $D_{50}$ is liable to cause a reduction in brightness and lead to aggregation of the phosphor particles. An excessively large weight-average median diameter $D_{50}$ is liable to cause an uneven coating and clogging of a dispenser or the like.

Preferred examples of the phosphor of the present invention used for the light-emitting device of the present invention include the phosphors of the present invention described in "{Composition of Phosphor}" above; and phosphors used in examples described in "[EXAMPLES]" below.

The structure of the light-emitting device of the present invention is not limited as long as the light-emitting device has the first illuminant (excitation light source) and the phosphor of the present invention as the second illuminant. The light-emitting device of the present invention may have any known device structure. Specific examples of the device structure will be described below.

The emission peak observed in an orange to red region in an emission spectrum of the light-emitting device of the present invention is preferably present in the wavelength of 590 nm to 670 nm.

In particular, a white-light-emitting device, having a known device structure, according to the light-emitting device of the present invention includes an excitation light source described below serving as the first illuminant; and any combination of phosphors, for example, an orange to red phosphor as described above, a known phosphor that emits green fluorescence (hereinafter, appropriately referred to as a "green phosphor"), a known phosphor that emits blue fluorescence (hereinafter, appropriately referred to as a "blue phosphor"), a known phosphor that emits yellow fluorescence (hereinafter, appropriately referred to as a "yellow phosphor"), and the like, as described below.

The term "white" defined herein includes (yellowish) white, (greenish) white, (bluish) white, (purplish) white, and white specified by JIS Z8701 and preferably means white.

<Structure of Light-Emitting Device (Illuminant)>

[First Illuminant]

The first illuminant in the light-emitting device of the present invention emits light to excite the second illuminant described below.

The emission wavelengths of the first illuminant are not particularly limited as long as the emission wavelengths overlap the absorption wavelengths of the second illuminant described below. An illuminant having a wide emission wavelength range can be used. Usually, an illuminant having emission wavelengths from the ultraviolet region to the blue region is used. Particularly preferably, an illuminant having emission wavelengths from the near-ultraviolet region to the blue region is used.

With respect to the specific value of the peak emission wavelength of the first illuminant, the first illuminant preferably has a peak emission wavelength of 200 nm or more. In the case of using near-ultraviolet light serving as excitation light, it is preferable to use the illuminant having a peak emission wavelength of usually 300 nm or more, preferably 330 nm or more, and more preferably 360 nm or more, and usually 420 nm or less. In the case of using blue light serving as excitation light, it is preferable to use the illuminant having a peak emission wavelength of usually 420 nm or more, preferably 430 nm or more, and usually 500 nm or less and preferably 480 nm or less. The reason for these ranges is that good color purity of these light-emitting devices is achieved.

As the first illuminant, a semiconductor light-emitting element is generally used. Specifically, for example, light-emitting diodes and semiconductor laser diodes (hereinafter, appropriately referred to as "LDs") can be used. Other examples of the illuminant that can be used as the first illuminant include organic electroluminescent light-emitting elements and inorganic electroluminescent light-emitting elements. However, the illuminant that can be used as the first illuminant is not limited to illuminants exemplified in this specification.

Among these, as the first illuminant, GaN-based LEDs and LDs including GaN-based compound semiconductors are preferred. This is because GaN-based LEDs and LDs each have markedly large emission power and external quantum efficiency compared with those of SiC-based LEDs and the like emitting light in this region, and a combination of either GaN-based LED or LD and the phosphor of the present invention results in very bright emission at ultra-low power. For example, when a current load is 20 mA, usually, GaN-LEDs and LDs each have light emission intensity 100 or more times higher than SiC-based LEDs and the like. GaN-LEDs and LDs each including an $Al_XGa_YN$ emission layer, a GaN emission layer, or an $In_XGa_YN$ emission layer are preferred. In GaN-based LEDs, among these, GaN-based LEDs each including an $In_XGa_YN$ emission layer are particularly preferred because of very high light emission intensity. In GaN-based LEDs, GaN-based LEDs each having a multiple-quantum-well structure including an $In_XGa_YN$ layer and a GaN layer are particularly preferred because of very high light emission intensity.

The value of X+Y is usually in the range of 0.8 to 1.2. In GaN-based LEDs, a doped emission layer obtained by doping the emission layer with Zn or Si and an undoped emission layer are preferred to adjust emission properties.

GaN-based LEDs each includes the emission layer, a p layer, an n layer, electrodes, and a substrate, as fundamental constituents. GaN-based LEDs each having a heterostructure in which the emission layer is arranged between, for example, n- and p-type $Al_XGa_YN$ layers, GaN layers, or $In_XGa_YN$ layers are preferred because of high luminous efficiency. Furthermore, GaN-based LEDs each having a structure in which the heterostructure is a multiple-quantum-well structure are more preferred because of further high luminous efficiency. The first illuminant may be used alone. Alternatively, any two or more of the first illuminants may be combined in any proportion.

[Second Illuminant]

The second illuminant in the light-emitting device of the present invention is an illuminant that emits visible light by irradiation with light emitted from the first illuminant. The second illuminant contains the phosphor of the present invention (e.g., the orange to red phosphor) as the first phosphor and optionally contains a second phosphor (e.g., a green phosphor, a blue phosphor, or a yellow phosphor) described below according to an application and the like. For example, the second illuminant includes the first and second phosphors dispersed in a sealing material.

Compositions of the phosphors, used in the second illuminant, other than the phosphor of the present invention are not particularly limited. Examples of the phosphors include compounds having metal oxides, such as $Y_2O_3$, $YVO_4$, $Zn_2SiO_4$, $Y_3Al_5O_{12}$, and $Sr_2SiO_4$, metal nitrides such as $Sr_2Si_5N_8$, phosphates such as $Ca_5(PO_4)_3Cl$, sulfides, such as ZnS, SrS, CaS, and oxysulfides, such as $Y_2O_2S$, and $La_2O_2S$, which serve as crystalline matrices, in combination with ions of rare-earth metals, such as Ce, Pr, Nd, Pm, Sm, Eu, Tb, Dy, Ho, Er, Tm, and Yb and ions of metals, such as Ag, Cu, Au, Al, Mn, and Sb, which serve as activating element or co-activating elements.

Preferred examples of the crystalline matrices include sulfides, such as (Zn,Cd)S, $SrGa_2S_4$, SrS, and ZnS; oxysulfides such as $Y_2O_2S$; aluminates, such as $(Y,Gd)_3Al_5O_{12}$, $YAlO_3$, $BaMgAl_{10}O_{17}$, $(Ba,Sr)(Mg,Mn)Al_{10}O_{17}$, $(Ba,Sr,Ca)(Mg,Zn,Mn)\ Al_{10}O_{17}$, $BaAl_{12}O_{19}$, $CeMgAl_{11}O_{19}$, $(Ba,Sr,Mg)O.Al_2O_3$, $BaAl_2Si_2O_8$, $SrAl_2O_4$, $Sr_4Al_{14}O_{25}$, and $Y_3Al_5O_{12}$; silicates, such as $Y_2SiO_5$ and $Zn_2SiO_4$; oxides such as $SnO_2$ and $Y_2O_3$; borates, such as $GdMgB_5O_{10}$ and $(Y,Gd)BO_3$; halophosphates, such as $Ca_{10}(PO_4)_6(F,Cl)_2$ and $(Sr,Ca,Ba,Mg)_{10}(PO_4)_6Cl_2$; and phosphates, such as $Sr_2P_2O_7$ and $(La,Ce)PO_4$.

With respect to the crystalline matrices and the activation elements or the co-activating elements, elemental compositions are not particularly limited. The elements in the compositions may be partially replaced with an element in the same group. When the resulting phosphor absorbs light in the near-ultraviolet to visible regions to emit visible light, the phosphor may be used.

Specifically, the following phosphors may be used. These are only examples. Phosphors that can be used in the present invention are not limited thereto.

In the following examples, phosphors in which the difference between the phosphors is only part of their structures are described with appropriate omissions as described above.

[First Phosphor]

The second illuminant in the light-emitting device of the present invention contains at least the phosphor of the present invention described above as the first phosphor. The phosphors of the present invention may be used alone. Alternatively, any two or more of the phosphors of the present invention may be combined in any proportion. Furthermore, as the first phosphor, a phosphor that emits fluorescence of the same color as that of the phosphor of the present invention (same-color combination phosphor) may be used in addition to the phosphor of the present invention. For example, in the case where the phosphor of the present invention is represented by the general formula [2] and contains Eu serving as the activating element $M^1$, the phosphor of the present invention is usually an orange to red phosphor. Thus, an orange to red phosphor other than the phosphor of the present invention serving as the first phosphor can be combined with the phosphor of the present invention.

Any orange to red phosphor may be used unless the advantage of the present invention is significantly impaired.

The peak emission wavelength of the orange to red phosphor serving as the same-color combination phosphor is usually 570 nm or more, preferably 580 nm or more, and more preferably 585 nm or more, and usually 780 nm or less, preferably 700 nm or less, and more preferably 680 nm or less.

Examples of such a orange to red phosphor include europium-activated alkaline-earth silicon nitride phosphors constituted by fractured particles having red fracture surfaces, emitting light in the red region, and represented by $(Mg,Ca,Sr,Ba)_2Si_5N_8$:Eu; and europium-activated rare-earth oxychalcogenide phosphors constituted by grown particles each having a substantially spherical shape as a regular crystal growth shape, emitting light in the red region, and represented by $(Y,La,Gd,Lu)_2O_2S$:Eu.

Phosphors, described in Japanese Unexamined Patent Application Publication No. 2004-300247, each containing oxynitride and/or oxysulfide containing at least one element selected from the group consisting of Ti, Zr, Hf, Nb, Ta, W, and Mo, and each containing the oxynitride having an α-SiAlON structure in which the whole or part of Al element is replaced with Ga element, can also be used in the present invention. These are phosphors each containing oxynitride and/or oxysulfide.

Other examples of the red phosphor that can be used include Eu-activated oxysulfide phosphors such as $(La,Y)_2O_2S$:Eu; Eu-activated oxide phosphors such as $Y(V,P)O_4$:Eu and $Y_2O_3$:Eu; Eu, Mn-activated silicate phosphors, such as $(Ba,Mg)_2SiO_4$:Eu,Mn and $(Ba,Sr,Ca,Mg)_2SiO_4$:Eu,Mn; Eu-activated tungstate phosphors, such as $LiW_2O_8$:Eu, $LiW_2O_8$:Eu,Sm, $Eu_2W_2O_9$, $Eu_2W_2O_9$:Nb, and $Eu_2W_2O_9$:Sm; Eu-activated sulfide phosphors such as $(Ca,Sr)S$:Eu; Eu-activated aluminate phosphors such as $YAlO_3$:Eu; Eu-activated silicate phosphors, such as $Ca_2Y_8(SiO_4)_6O_2$:Eu, $LiY_9(SiO_4)_6O_2$:Eu, $(Sr,Ba,Ca)_3SiO_8$:Eu, and $Sr_2BaSiO_8$:Eu; Ce-activated aluminate phosphors, such as $(Y,Gd)_3Al_8O_{12}$:Ce and $(Tb,Gd)_3Al_5O_{12}$:Ce; Eu-activated oxide, nitride, or oxynitride phosphors such as $(Mg,Ca,Sr,Ba)_2Si_8(N,O)_8$:Eu, $(Mg,Ca,Sr,Ba)Si(N,O)_2$:Eu, and $(Mg,Ca,Sr,Ba)AlSi(N,O)_3$:Eu; Ce-activated oxide, nitride, or oxynitride phosphors such as $(Mg,Ca,Sr,Ba)AlSi(N,O)_3$:Ce; Eu,Mn-activated halophosphate phosphors such as $(Sr,Ca,Ba,Mg)_{10}(PO_4)_8Cl_2$:Eu,Mn; Eu,Mn-activated silicate phosphors such as $Ba_3MgSi_2O_8$:Eu,Mn and $(Ba,Sr,Ca,Mg)_3(Zn,Mg)Si_2O_8$:Eu,Mn; Mn-activated germanate phosphors such as $3.5MgO0.5MgF_2 \cdot GeO_2$:Mn; Eu-activated oxynitride phosphors such as Eu-activated α-SiAlON; Eu,Bi-activated oxide phosphors such as $(Gd,Y,Lu,La)_2O_3$:Eu,Bi; Eu,Bi-activated oxysulfide phosphors such as $(Gd,Y,Lu,La)_2O_2S$:Eu,Bi; Eu,Bi-activated vanadate phosphors such as $(Gd,Y,Lu,La)VO_4$:Eu,Bi; Eu,Ce-activated sulfide phosphors such as $SrY_2S_4$:Eu,Ce; Ce-activated sulfide phosphors such as $CaLa_2S_4$:Ce; Eu,Mn-activated phosphate phosphors such as $(Ba,Sr,Ca)MgP_2O_7$:Eu,Mn and $(Sr,Ca,Ba,Mg,Zn)_2P_2O_7$:Eu,Mn; Eu,Mo-activated tungstate phosphors such as $(Y,Lu)_2WO_6$:Eu,Mo; Eu,Ce-activated nitride phosphors such as $(Ba,Sr,Ca)_xSi_yN_z$:Eu,Ce (wherein x, y, and z each represent an integer of one or more); Eu,Mn-activated halophosphate phosphors such as $(Ca,Sr,Ba,Mg)_{10}(PO_4)_6(F,Cl,Br,OH)_2$:Eu,Mn; and Ce-activated silicate phosphors such as $((Y,Lu,Gd,Tb)_{1-z-y}Sc_xCe_y)_2(Ca,Mg)_{1-r}(Mg/Zn)_{2+r}Si_{z-q}Ge_qO_{12+\delta}$.

Examples of the red phosphor that can be used include red organic phosphors each composed of a rare-earth element ion complex having an anionic ligand, e.g., a β-diketonate, a β-diketone, an aromatic carboxylic acid, or a Broensted acid; perylene pigments (e.g., dibenzo{[f,f']-4,4',7,7'-tetraphenyl}diindeno[1,2,3-cd:1',2',3'-lm]perylene); anthraquinone pigments; lake pigments; azo pigments; quinacridone pigments; anthracene pigments; isoindoline pigments; isoindolinone pigments; phthalocyanine pigments; triphenylmethane basic dyes; indanthrone pigments; indophenol pigments; cyanin pigments; and dioxazine pigments.

Among these, the red phosphor preferably contains $(Ca,Sr,Ba)_2Si_5(N,O)_8$:Eu, $(Ca,Sr,Ba)Si(N,O)_2$:Eu, $(Ca,Sr,Ba)AlSi(N,O)_3$:Eu, $(Ca,Sr,Ba)AlSi(N,O)_3$:Ce, $(Sr,Ba)_3SiO_8$:Eu, $(Ca,Sr)S$:Eu, $(La,Y)_2O_2S$:Eu, or a Eu complex. More preferably, the red phosphor contains $(Ca,Sr,Ba)_2Si_5(N,O)_8$:Eu, $(Ca,Sr,Ba)Si(N,O)_2$Eu, $(Ca,Sr,Ba)AlSi(N,O)_3$:Eu, $(Ca,Sr,Ba)AlSi(N,O)_3$:Ce, $(Sr,Ba)_3SiO_5$:Eu, $(Ca,Sr)S$:Eu, or $(La,Y)_2O_2S$:Eu; a β-diketone-based Eu complex such as Eu(dibenzoylmethane)$_3 \cdot$1,10-phenanthroline complex; or a carboxylic acid-based Eu complex. Particularly preferably, the red phosphor contains $(Ca,Sr,Ba)_2Si_5(N,O)_8$:Eu, $(Sr,Ca)AlSiN_3$:Eu, or $(La,Y)_2O_2S$:Eu.

Among these examples, $(Sr,Ba)_3SiO_5$:Eu is preferably used as an orange phosphor.

These exemplified orange to red phosphors may be used alone or in combination of two or more in any proportion.

[Second Phosphor]

The second illuminant in the light-emitting device of the present invention may contain a phosphor (second phosphor) according to an application in addition to the first phosphor described above. The second phosphor is a phosphor that differs in peak emission wavelength from the first phosphor. Usually, the second phosphor is used to adjust the emission color of the second illuminant. Thus, a phosphor that emits fluorescence of color different from that of the first phosphor is often used as the second phosphor. In the case where the orange to red phosphor is used as the first phosphor as described above, a phosphor, e.g., a green phosphor, a blue phosphor, or a yellow phosphor, that emits light of color different from that of the first phosphor is used as the second phosphor.

The weight-average median diameter $D_{50}$ of the second phosphor is usually 10 μm or more and preferably 12 μm or more, and usually 30 μm or less and preferably 25 μm or less. An excessively small weight-average median diameter $D_{50}$ is liable to cause a reduction in brightness and lead to aggregation of the phosphor particles. An excessively large weight-average median diameter $D_{50}$ is liable to cause an uneven coating and clogging of a dispenser or the like.

<Blue Phosphor>

In the case where a blue phosphor is used as the second phosphor, any blue phosphor can be used unless the blue phosphor significantly impairs the advantage of the present invention. In this case, the peak emission wavelength of the blue phosphor is usually 420 nm or more, preferably 430 nm or more, and more preferably 440 nm or more, and usually 490 nm or less, preferably 480 nm or less, more preferably 470 nm or less, and still more preferably 460 nm or less.

Examples of the blue phosphor include europium-activated barium magnesium aluminate phosphors constituted by grown particles each having a substantially hexagonal shape as a regular crystal growth shape, emitting light in the blue region, and represented by $(Ba,Sr,Ca)MgAl_{10}O_{17}$:Eu; europium-activated calcium halophosphate phosphors constituted by grown particles each having a substantially spherical shape as a regular crystal growth shape, emitting light in the blue region, and represented by $(Mg,Ca,Sr,Ba)_5(PO_4)_3(Cl,F)$:Eu; europium-activated alkaline-earth chloroborate phosphors constituted by grown particles each having a substantially cubic shape as a regular crystal growth shape, emitting light in the blue region, and represented by $(Ca,Sr,Ba)_2B_5O_9Cl$:Eu; and europium-activated alkaline-earth aluminate phosphors constituted by fractured particles having fracture surfaces, emitting light in the blue-green region, and represented by $(Sr,Ca,Ba)Al_2O_4$:Eu or $(Sr,Ca,Ba)_4Al_{14}O_{25}$:Eu.

Other examples of the blue phosphor include Sn-activated phosphate phosphors such as $Sr_2P_2O_7$:Sn; Eu-activated aluminate phosphors such as $(Sr,Ca,Ba)Al_2O_4$:Eu, $(Sr,Ca,Ba)_4Al_{14}O_{25}$:Eu, $BaMgAl_{10}O_{17}$:Eu, $(Ba,Sr,Ca)MgAl_{10}O_{17}$:Eu, $BaMgAl_{10}O_{17}$:Eu,Tb,Sm, and $BaAl_8O_{13}$:Eu; Ce-activated thiogallate phosphors such as $SrGa_2S_4$:Ce and $CaGa_2S_4$:Ce; Eu,Mn-activated aluminate phosphors such as $(Ba,Sr,Ca)MgAl_{10}O_{17}$:Eu,Mn; Eu-activated halophosphate phosphors such as $(Sr,Ca,Ba,Mg)_{10}(PO_4)_6Cl_2$:Eu and $(Ba,Sr,Ca)_5(PO_4)_3(Cl,F,Br,OH)$:Eu,Mn,Sb; Eu-activated silicate phosphors such as $BaAl_2Si_2O_8$:Eu and $(Sr,Ba)_3MgSi_2O_8$:Eu; Eu-activated phosphate phosphors such as $Sr_2P_2O_7$:Eu; sulfide phosphors such as ZnS:Ag and ZnS:Ag,Al; Ce-activated silicate phosphors such as $Y_2SiO_5$:Ce; tungstate phosphors such as $CaWO_4$; Eu,Mn-activated borate phosphate phosphors, such as $(Ba,Sr,Ca)BPO_5$:Eu,Mn, $(Sr,Ca)_{10}(PO_4)_6 \cdot nB_2O_3$:Eu, and $2SrO \cdot 0.84P_2O_5 \cdot 0.16B_2O_3$:Eu; Eu-activated halosilicate phosphors such as $Sr_2Si_3O_8 \cdot 2SrCl_2$:Eu; Eu-activated oxynitride phosphors, such as $SrSi_9Al_{19}ON_{31}$:Eu and $EuSi_9Al_{19}ON_{31}$; and Ce-activated oxynitride phosphors, such as $La_{1-x}Ce_xAl(Si_{6-z}Al_z)(N_{10-z}O_z)$ (wherein x and y represent values satisfying $0 \leq x \leq 1$ and $0 \leq z \leq 6$, respectively) and $La_{1-x-y}Ce_xCa_yAl(Si_{6-z}Al_z)(N_{10-z}O_z)$ (wherein x, y, and z represent values satisfying $0 \leq x \leq 1$, $0 \leq y \leq 1$, and $0 \leq z \leq 6$, respectively).

Furthermore, examples of the blue phosphor that can be used include fluorescent dyes such as naphthalic imide, benzoxazole, styryl, coumarin, pyrazoline, and triazole compounds; and organic phosphors such as thulium complexes and the like.

Among these examples, the blue phosphor preferably contains $(Ca,Sr,Ba)MgAl_{10}O_{17}$:Eu, $(Sr,Ca,Ba,Mg)_{10}(PO_4)_6(Cl,F)_2$:Eu, or $(Ba,Ca,Mg,Sr)_2SiO_4$:Eu. More preferably, the blue phosphor contains $(Ca,Sr,Ba)MgAl_{10}O_{17}$:Eu, $(Sr,Ca,Ba,Mg)_{10}(PO_4)_6(Cl,F)_2$:Eu, or $(Ba,Ca,Sr)_3MgSi_2O_8$:Eu. Still more preferably, the blue phosphor contains $BaMgAl_{10}O_{17}$:Eu, $Sr_{10}(PO_4)_6(Cl,F)_2$:Eu, or $Ba_3MgSi_2O_8$:Eu. $(Sr,Ca,Ba,Mg)_{10}(PO_4)_6Cl_2$:Eu or $(Ca,Sr,Ba)MgAl_{10}O_{17}$:Eu is particularly preferred for illumination and display application.

These exemplified blue phosphors may be used alone or in combination of two or more in any proportion.

<Yellow Phosphor>

In the case where a yellow phosphor is used as the second phosphor, any yellow phosphor can be used unless the yellow phosphor significantly impairs the advantage of the present invention. In this case, the peak emission wavelength of the yellow phosphor is usually 530 nm or more, preferably 540 nm or more, and more preferably 550 nm or more, and usually 620 nm or less, preferably 600 nm or less, and more preferably 580 nm or less.

Examples of the yellow phosphor include phosphors of various oxides, nitrides, oxynitrides, sulfides, and oxysulfides.

Specific examples thereof include Ce-activated phosphors, for example, garnet phosphors having a garnet structure, such as $RE_3M_5O_{12}$:Ce (wherein RE represents at least one element selected from the group consisting of Y, Tb, Gd, Lu, and Sm; and M represents at least one element selected from the group consisting of Al, Ga, and Sc) and $M^a_3M^b_2M^c_3O_{12}$:Ce (wherein $M^a$ represents a divalent metal element; $M^b$ represents a trivalent metal element; and $M^c$ represents a tetravalent metal element), orthosilicate phosphors such as $AE_2M^dO_4$:Eu (wherein AE represents at least one element selected from the group consisting of Ba, Sr, Ca, Mg, and Zn; and $M^d$ represents Si and/or Ge), oxynitride phosphors in which oxygen as a constituent of these phosphors is partially replaced with nitrogen, and nitride phosphors having a $CaAlSiN_3$ structure, such as $AEAlSiN_3$:Ce (wherein AE represents at least one element selected from the group consisting of Ba, Sr, Ca, Mg, and Zn).

Other examples of the yellow phosphor that can be used include Eu-activated phosphors, such as sulfide phosphors, e.g., $CaGa_2S_4$:Eu, $(Ca,Sr)Ga_2S_4$:Eu, and $(Ca,Sr)(Ga,Al)_2S_4$:Eu, and oxynitride phosphors having a SiAlON structure, e.g., $Ca_x(Si,Al)_{12}(O,N)_{16}$:Eu; and Eu-activated or Eu,Mn-coactivated halogenated borate phosphors such as $(M_{1-A-A}Eu_AMn_A)_2(BO_3)_{1-P}(PO_4)_PX$ (wherein M represents at least one element selected from the group consisting of Ca, Sr, and Ba; X represents at least one element selected from the group consisting of F, Cl, and Br; A, B, and P represent values satisfying $0.001 \leq A \leq 0.3$, $0 \leq B \leq 0.3$, and $0 \leq P \leq 0.2$, respectively).

Other examples of the yellow phosphor that can be used include fluorescent dyes, such as brilliant sulfoflavine FF (colour index number 56205), basic yellow HG (colour index number 46040), eosine (colour index number 45380), and rhodamine 6G (colour index number 45160).

These exemplified yellow phosphors may be used alone or in combination of two or more in any proportion.

<Green Phosphor>

In the case where a green phosphor is used as the second phosphor, any green phosphor can be used unless the green phosphor significantly impairs the advantage of the present invention. In this case, the peak emission wavelength of the green phosphor is usually 500 nm or more, preferably 510 nm or more, and more preferably 515 nm or more, and usually 550 nm or less, preferably 542 nm or less, and more preferably 535 nm or less. An excessively short peak emission wavelength is liable to lead to bluish light. An excessively long peak emission wavelength is liable to lead to yellowish light. In both cases, the phosphor can emit light with reduced properties as green light.

Specific examples of the green phosphor include europium-activated alkaline-earth silicon oxynitride phosphors constituted by fractured particles having fracture surfaces, emitting light in the green region, and represented by $(Mg,Ca,Sr,Ba)Si_2O_2N_2$:Eu.

Other examples of the green phosphor that can be used include Eu-activated aluminate phosphors, such as $Sr_4Al_{14}O_{25}$:Eu and $(Ba,Sr,Ca)Al_2O_4$:Eu; Eu-activated silicate phosphors, such as $(Sr,Ba)Al_2Si_2O_8$:Eu, $(Ba,Mg)_2SiO_4$:Eu, $(Ba,Sr,Ca,Mg)_2SiO_4$:Eu, $(Ba,Sr,Ca)_2(Mg,Zn)Si_2O_7$:Eu, and $(Ba,Ca,Sr,Mg)_9(Sc,Y,Lu,Gd)_2(Si,Ge)_5O_{24}$:Eu; Ce,Tb-activated silicate phosphors such as $Y_2SiO_5$:Ce,Tb; Eu-activated borate phosphate phosphors such as $Sr_2P_2O_7$—$Sr_2B_2O_5$:Eu; Eu-activated halosilicate phosphors such as $Sr_2Si_3O_8$-$2SrCl_2$:Eu; Mn-activated silicate phosphors such as $Zn_2SiO_4$:Mn; Tb-activated aluminate phosphors such as $CeMgAl_{11}O_{19}$:Tb, $Y_3Al_5O_{12}$:Tb; Tb-activated silicate phosphors such as $Ca_2Y_8(SiO_4)_6O_2$:Tb and $La_3Ga_5SiO_{14}$:Tb; Eu,Tb,Sm-activated thiogallate phosphors such as $(Sr,Ba,Ca)Ga_2S_4$:Eu,Tb,Sm; Ce-activated aluminate phosphors such as $Y_3(Al,Ga)_5O_{12}$:Ce and $(Y,Ga,Tb,La,Sm,Pr,Lu)_3(Al,Ga)_5O_{12}$:Ce; Ce-activated silicate phosphors such as $Ca_3Sc_2Si_3O_{12}$:Ce and $Ca_3(Sc,Mg,Na,Li)_2Si_3O_{12}$:Ce; Ce-activated oxide phosphors such as $CaSc_2O_4$:Ce; Eu-activated oxynitride phosphors such as Eu-activated β-SiAlON; Eu,Mn-activated aluminate phosphors such as $BaMgAl_{10}O_{17}$:Eu,Mn; Eu-activated aluminate phosphors such as $SrAl_2O_4$:Eu; Tb-activated oxysulfide phosphors such as $(La,Gd,Y)_2O_2S$:Tb; Ce,Tb-activated phosphate phosphors such as $LaPO_4$:Ce,Tb; sulfide phosphors such as ZnS:Cu,Al and ZnS:Cu,Au,Al; Ce,Tb-activated borate phosphors such as $(Y,Ga,Lu,Sc,La)BO_3$:Ce,Tb, $Na_2Gd_2B_2O_7$:Ce,Tb, and $(Ba,Sr)_2(Ca,Mg,Zn)B_2O_6$:K,Ce,Tb; Eu,Mn-activated halosilicate phosphors such as $Ca_8Mg(SiO_4)_4Cl_2$:Eu,Mn; Eu-activated thioaluminate phosphors and thiogallte phosphors such as $(Sr,Ca,Ba)(Al,Ga,In)_2S_4$:Eu; Eu,Mn-activated halosilicate phosphors such as $(Ca,Sr)_8(Mg,Zn)(SiO_4)_4Cl_2$:Eu,Mn; and Eu-activated oxynitride phosphors, such as $M_3Si_6O_9N_4$:Eu and $M_3Si_6O_{12}N_2$:Eu (wherein M represents an alkaline-earth metal element).

Furthermore, examples of the green phosphor that can be used include fluorescent dyes such as pyridine-phthalimide condensed derivatives, benzoxazinone, quinazolinone, coumarin, quinophthalone, and naphthalic imide; and organic phosphors such as terbium complexes and the like.

These exemplified green phosphors may be used alone or in combination of two or more in any proportion.

<Selection of Second Phosphor>

The second phosphor may be used alone. Alternatively, any two or more of the second phosphors may be combined in any proportion. The ratio of the first phosphor to the second phosphor is not limited unless the advantage of the present invention is significantly impaired. Thus, for example, the amount of the second phosphor, a combination of the phosphors used as the second phosphor, and the ratio thereof may be appropriately determined according to the application and the like of the light-emitting device.

In the light-emitting device of the present invention, the type of second phosphor and whether or not the second phosphor (e.g., the yellow phosphor, the blue phosphor, or the green phosphor) is used may be appropriately determined according to the application of the light-emitting device. For example, in the case where the light-emitting device of the present invention is used as a light-emitting device that emits orange to red light, only the first phosphor (orange to red phosphor) may be used. In this case, usually, the second phosphor is not required.

In the case where the light-emitting device of the present invention is used as a white-light-emitting device, the first illuminant, the first phosphor (orange to red phosphor), and the second phosphor may be appropriately combined in such a manner that intended white light is obtained. Specifically, preferred examples of combination of the first illuminant, the first phosphor, and the second phosphor when the light-emitting device of the present invention is used as a white-light-emitting device include combinations (i) to (iii) described below.

(i) A blue illuminant (e.g., a blue LED) is used as the first illuminant, a red phosphor (e.g., the phosphor of the present invention) is used as the first phosphor, and a green phosphor is used as the second phosphor.

(ii) A near-ultraviolet illuminant (e.g., a near-ultraviolet LED) is used as the first illuminant, a red phosphor (e.g., the phosphor of the present invention) is used as the first phosphor, and a combination of a blue phosphor and a green phosphor is used as the second phosphor.

(iii) A blue illuminant (e.g., a blue LED) is used as the first illuminant, an orange phosphor (e.g., the phosphor of the present invention) is used as the first phosphor, and a green phosphor is used as the second phosphor.

Examples of the combinations of the phosphors described above will be further described in Tables a) to h).

$(Ca,Sr)AlSiNi_3$:Eu exemplified as a dark-red phosphor in Tables d), h), and 5) described below is a phosphor in which the amount of Ca is 40% by mole or more with respect to the total amount of Ca and Sr and which has a peak emission wavelength in the range of 630 nm to 700 nm. This phosphor may be the phosphor of the present invention.

TABLE 2 a) Orange to red light-emitting device including combination of blue LED and orange to red phosphor of the invention

| Semiconductor light-emitting element | Orange to red phosphor |
|---|---|
| Blue LED | Orange to red phosphor of the invention | b) White-light-emitting device including combination of blue LED, one or two or more phosphors selected from yellow phosphors shown in Table, and orange to red phosphor of the invention

| Semiconductor light-emitting element | Yellow phosphor | Orange to red phosphor |
|---|---|---|
| Blue LED | $(Y,Gd)_3(Al,Ga)_5O_{12}$:Ce<br>$(Tb,Gd)_3(Al,Ga)_5O_{12}$:Ce<br>$(Sr,Ba,Ca,Mg,Eu)_2SiO_4$<br>Eu-activated α-SiAlON<br>$(Ca,Sr,Ba)Si_2N_2O_2$:Eu<br>$Ca_2BO_3Cl$:Eu | Orange to red phosphor of the invention |

TABLE 2-continued c) White-light-emitting device including combination of blue LED, one or two or more phosphors selected from green phosphors shown in Table, and orange to red phosphor of the invention

| Semiconductor light-emitting element | Green phosphor | Orange to red phosphor |
|---|---|---|
| Blue LED | $Ca_3(Sc,Mg)_2Si_3O_{12}$:Ce<br>$(Ba,Sr)_2SiO_4$:Eu<br>$(Ca,Sr)Sc_2O_4$:Ce<br>$(Ca,Sr,Ba)Si_2N_2O_2$:Eu<br>$(Ba,Sr)_3Si_6O_{12}N_2$:Eu<br>$(Ba,Sr)_3Si_6O_9N_4$:Eu<br>$(Sr,Ba,Ca)Ga_2S_4$:Eu<br>Eu-activated β-SiAlON | Orange to red phosphor of the invention | d) White-light-emitting device including combination of blue LED, one or two or more phosphors selected from green phosphors shown in Table, orange to red phosphor of the invention, and dark-red phosphor shown in Table

| Semiconductor light-emitting element | Green phosphor | Orange to red phosphor | Dark-red phosphor |
|---|---|---|---|
| Blue LED | $Ca_3(Sc,Mg)_2Si_3O_{12}$:Ce<br>$(Ba,Sr)_2SiO_4$:Eu<br>$(Ca,Sr)Sc_2O_4$:Ce<br>$(Ca,Sr,Ba)Si_2N_2O_2$:Eu<br>$(Ba,Sr)_3Si_6O_{12}N_2$:Eu<br>$(Ba,Sr)_3Si_6O_9N_4$:Eu<br>$(Sr,Ba,Ca)Ga_2S_4$:Eu<br>Eu-activated β-SiAlON | Orange to red phosphor of the invention | $(Ca,Sr)AlSiN_3$:Eu<br>$(Ca,Mg)AlSiN_3$:Eu |

TABLE 3 e) Orange to red light-emitting device including combination of near-ultraviolet LED and orange to red phosphor of the invention

| Semiconductor light-emitting element | Orange to red phosphor |
|---|---|
| Near-ultraviolet LED | Orange to red phosphor of the invention | f) White-light-emitting device including combination of near-ultraviolet LED, one or two or more phosphors selected from blue-green phosphors shown in Table, and orange to red phosphor of the invention

| Semiconductor light-emitting element | Blue-green phosphor | Orange to red phosphor |
|---|---|---|
| Near-ultraviolet LED | $2SrO \cdot 0.84P_2O_5 \cdot 0.16B_2O_3$:Eu<br>$Sr_2Si_3O_8 \cdot 2SrCl_2$:Eu | Orange to red phosphor of the invention | g) White-light-emitting device including combination of near-ultraviolet LED, one or two or more phosphors selected from blue phosphors shown in Table, one or two or more phosphors selected from green phosphors shown in Table, and orange to red phosphor of the invention

| Semiconductor light-emitting element | Blue phosphor | Green phosphor | Orange to red phosphor |
|---|---|---|---|
| Near-ultraviolet LED | $BaMgAl_{10}O_{17}$:Eu<br>$Ba_3MgSi_2O_8$:Eu<br>$(Sr,Ca,Ba,Mg)_5(PO_4)_3Cl$:Eu<br>Ce-activated α-SiAlON<br>$2SrO \cdot 0.84P_2O_6 \cdot 0.16B_2O_3$:Eu<br>$Sr_2Si_3O_8 \cdot 2SrCl_2$:Eu<br>$La_{1-x-y}Ce_xCa_yAl(Si_{6-z}Al_z)(N_{10-z}O_z)$<br>wherein $0 \le x \le 1$, $0 \le y \le 1$,<br>$0 \le z \le 6$<br>$SrSi_9Al_{19}ON_{31}$:Eu<br>$EuSi_9Al_{19}ON_{31}$ | $Ca_3(Sc,Mg)_2Si_3O_{12}$:Ce<br>$(Ba,Sr)_2SiO_4$:Eu<br>$(Ca,Sr)Sc_2O_4$:Ce<br>$(Ca,Sr,Ba)Si_2N_2O_2$:Eu<br>$(Ba,Sr)_3Si_5O_{12}N_2$:Eu<br>$(Ba,Sr)_3Si_5O_9N_4$:Eu<br>$(Sr,Ba,Ca)Ga_2S_4$:Eu<br>Eu-activated β-SiAlON<br>$BaMgAl_{10}O_{17}$:Eu,Mn<br>$(Sr,Ca,Ba)Al_2O_4$:Eu<br>$(Sr,Ca,Ba)_4Al_{14}O_{25}$:Eu<br>ZnS:Cu,Al<br>ZnS:Au,Cu,Al<br>$2SrO \cdot 0.84P_2O_5 \cdot 0.16B_2O_3$:Eu<br>$Sr_2Si_3O_8 \cdot 2SrCl_2$:Eu | Orange to red phosphor of the invention |

TABLE 4 h) White-light-emitting device including combination of near-ultraviolet LED, one or two or more phosphors selected from blue phosphors shown in Table, one or two or more phosphors selected from green phosphors shown in Table, orange to red phosphor of the invention, and one or two or more phosphors selected from dark-red phosphors shown in Table

| Semiconductor light-emitting element | Blue phosphor | Green phosphor | Orange to red phosphor | Dark-red phosphor |
|---|---|---|---|---|
| Near-ultraviolet LED | $BaMgAl_{10}O_{17}$:Eu<br>$Ba_3MgSi_2O_8$:Eu<br>$(Sr,Ca,Ba,Mg)_5(PO_4)_3Cl$:Eu<br>$2SrO \cdot 0.84P_2O_5 \cdot 0.16B_2O_3$:Eu<br>$Sr_2Si_3O_8 \cdot 2SrCl_2$:Eu<br>Ce-activated α-SiAlON<br>$LaAl(Si_{6-z}Al_z)N_{10-z}O_z$:Ce<br>$La_{1-x-y}Ce_xCa_yAl(Si_{6-z}Al_z)(N_{10-z}O_z)$<br>wherein $0 \leq x \leq 1$, $0 \leq y \leq 1$,<br>$0 \leq z \leq 6$<br>$SrSi_9Al_{19}ON_{31}$:Eu<br>$EuSi_9Al_{19}ON_{31}$ | $Ca_3(Sc,Mg)_2Si_3O_{12}$:Ce<br>$(Ba,Sr)_2SiO_4$:Eu<br>$(Ca,Sr)Sc_2O_4$:Ce<br>$(Ca,Sr,Ba)Si_2N_2O_2$:Eu<br>$(Ba,Sr)Si_6O_{12}N_2$:Eu<br>$(Ba,Sr)_3Si_6O_9N_4$:Eu<br>$(Sr,Ba,Ca)Ga_2S_4$:Eu<br>Eu-activated β-SiAlON<br>$BaMgAl_{10}O_{17}$:Eu,Mn<br>$(Sr,Ca,Ba)Al_2O_4$:Eu<br>$(Sr,Ca,Ba)_4Al_{14}O_{25}$:Eu<br>ZnS:Cu,Al<br>ZnS:Au,Cu,Al<br>$2SrO \cdot 0.84P_2O_5 \cdot 0.16B_2O_3$:Eu<br>$Sr_2Si_3O_8 \cdot 2SrCl_2$:Eu | Orange to red phosphor of the invention | $3.5MgO \cdot 0.5MgF_2 \cdot GeO_2$:Mn<br>$La_2O_2S$:Eu<br>$(Ca,Sr)AlSiNi_3$:Eu |

Among these combinations, particularly preferably, the light-emitting devices include combinations of semiconductor light-emitting elements and phosphors described in Tables 1) to 7).

TABLE 5

| 1) | |
|---|---|
| Semiconductor light-emitting element | Orange phosphor |
| Blue LED | Orange phosphor of the invention |

| 2) | |
|---|---|
| Semiconductor light-emitting element | Red phosphor |
| Blue LED | Red phosphor of the invention |

| 3) | | |
|---|---|---|
| Semiconductor light-emitting element | Yellow phosphor | Orange to red phosphor |
| Blue LED | $(Y,Gd)_3(Al,Ga)_5O_{12}$:Ce | Orange to red phosphor of the invention |
| Blue LED | $(Tb,Gd)_3(Al,Ga)_5O_{12}$:Ce | Orange to red phosphor of the invention |
| Blue LED | $(Sr,Ba,Ca,Mg,Eu)_2SiO_4$ | Orange to red phosphor of the invention |
| Blue LED | $(Ca,Sr,Ba)Si_2N_2O_2$:Eu | Orange to red phosphor of the invention |

| 4) | | |
|---|---|---|
| Semiconductor light-emitting element | Green phosphor | Orange to red phosphor |
| Blue LED | $Ca_3(Sc,Mg)_2Si_3O_{12}$:Ce | Orange to red phosphor of the invention |
| Blue LED | $(Ba,Sr)_2SiO_4$:Eu | Orange to red phosphor of the invention |
| Blue LED | $(Ca,Sr)Sc_2O_4$:Ce | Orange to red phosphor of the invention |
| Blue LED | $(Ca,Sr,Ba)Si_2N_2O_2$:Eu | Orange to red phosphor of the invention |
| Blue LED | $(Sr,Ba,Ca)Ga_2S_4$:Eu | Orange to red phosphor of the invention |
| Blue LED | $(Ba,Sr)_3Si_6O_{12}N_2$:Eu | Orange to red phosphor of the invention |

TABLE 5-continued

5)

| Semiconductor light-emitting element | Blue phosphor | Orange to red phosphor | Dark-red phosphor |
|---|---|---|---|
| Blue LED | $Ca_3(Sc,Mg)_2Si_3O_{12}$:Ce | Orange to red phosphor of the invention | $(Ca,Sr)AlSiNi_3$:Eu |
| Blue LED | $(Ba,Sr)_2SiO_4$:Eu | Orange to red phosphor of the invention | $(Ca,Sr)AlSiNi_3$:Eu |
| Blue LED | $(Ca,Sr)Sc_2O_4$:Ce | Orange to red phosphor of the invention | $(Ca,Sr)AlSiNi_3$:Eu |
| Blue LED | $(Ca,Sr,Ba)Si_2N_2O_2$:Eu | Orange to red phosphor of the invention | $(Ca,Sr)AlSiNi_3$:Eu |
| Blue LED | $(Sr,Ba,Ca)Ga_2S_4$:Eu | Orange to red phosphor of the invention | $(Ca,Sr)AlSiNi_3$:Eu |
| Blue LED | $(Ba,Sr)_3Si_6O_{12}N_2$:Eu | Orange to red phosphor of the invention | $(Ca,Sr)AlSiNi_3$:Eu |

TABLE 6

6)

| Semiconductor light-emitting element | Blue phosphor | Green phosphor | Orange to red phosphor |
|---|---|---|---|
| Near-ultraviolet LED | $BaMgAl_{10}O_{17}$:Eu | $Ca_3(Sc,Mg)_2Si_3O_{12}$:Ce | Orange to red phosphor of the invention |
| Near-ultraviolet LED | $BaMgAl_{10}O_{17}$:Eu | $(Ca,Sr)Sc_2O_4$:Ce | Orange to red phosphor of the invention |
| Near-ultraviolet LED | $BaMgAl_{10}O_{17}$:Eu | $(Ba,Sr)_2SiO_4$:Eu | Orange to red phosphor of the invention |
| Near-ultraviolet LED | $BaMgAl_{10}O_{17}$:Eu | $(Ca,Sr,Ba)Si_2N_2O_2$:Eu | Orange to red phosphor of the invention |
| Near-ultraviolet LED | $BaMgAl_{10}O_{17}$:Eu | $2SrO\cdot 0.84P_2O_5\cdot 0.16B_2O_3$:Eu | Orange to red phosphor of the invention |
| Near-ultraviolet LED | $BaMgAl_{10}O_{17}$:Eu | $Sr_2Si_3O_8\cdot 2SrCl_2$:Eu | Orange to red phosphor of the invention |
| Near-ultraviolet LED | $(Sr,Ca,Ba,Mg)_5(PO_4)_3Cl$:Eu | $(Ba,Sr)_2SiO_4$:Eu | Orange to red phosphor of the invention |
| Near-ultraviolet LED | $BaMgAl_{10}O_{17}$:Eu | $(Ba,Sr)_3Si_6O_{12}N_2$:Eu | Orange to red phosphor of the invention |
| Near-ultraviolet LED | $(Sr,Ca,Ba,Mg)_5(PO_4)_3Cl$:Eu | $(Ba,Sr)_3Si_6O_{12}N_2$:Eu | Orange to red phosphor of the invention |

7)

| Semiconductor light-emitting element | Blue phosphor | Green phosphor | Orange to red phosphor | Dark-red phosphor |
|---|---|---|---|---|
| Near-ultraviolet LED | $BaMgAl_{10}O_{17}$:Eu | $Ca_3(Sc,Mg)_2Si_3O_{12}$:Ce | Orange to red phosphor of the invention | $3.5MgO\cdot 0.5MgF_2\cdot GeO_2$:Mn |
| Near-ultraviolet LED | $BaMgAl_{10}O_{17}$:Eu | $(Ba,Sr)_2SiO_4$:Eu | Orange to red phosphor of the invention | $3.5MgO\cdot 0.5MgF_2\cdot GeO_2$:Mn |
| Near-ultraviolet LED | $BaMgAl_{10}O_{17}$:Eu | $(Ca,Sr,Ba)Si_2N_2O_2$:Eu | Orange to red phosphor of the invention | $3.5MgO\cdot 0.5MgF_2\cdot GeO_2$:Mn |
| Near-ultraviolet LED | $BaMgAl_{10}O_{17}$:Eu | $2SrO\cdot 0.84P_2O_5\cdot 0.16B_2O_3$:Eu | Orange to red phosphor of the invention | $3.5MgO\cdot 0.5MgF_2\cdot GeO_2$:Mn |
| Near-ultraviolet LED | $BaMgAl_{10}O_{17}$:Eu | $Sr_2Si_3O_8\cdot 2SrCl_2$:Eu | Orange to red phosphor of the invention | $3.5MgO\cdot 0.5MgF_2\cdot GeO_2$:Mn |
| Near-ultraviolet LED | $(Sr,Ca,Ba,Mg)_5(PO_4)_3Cl$:Eu | $(Ba,Sr)_2SiO_4$:Eu | Orange to red phosphor of the invention | $3.5MgO\cdot 0.5MgF_2\cdot GeO_2$:Mn |
| Near-ultraviolet LED | $BaMgAl_{10}O_{17}$:Eu | $(Ba,Sr)_3Si_6O_{12}N_2$:Eu | Orange to red phosphor of the invention | $3.5MgO\cdot 0.5MgF_2\cdot GeO_2$:Mn |
| Near-ultraviolet LED | $(Sr,Ca,Ba,Mg)_5(PO_4)_3Cl$:Eu | $(Ba,Sr)_3Si_6O_{12}N_2$:Eu | Orange to red phosphor of the invention | $3.5MgO\cdot 0.5MgF_2\cdot GeO_2$:Mn |

The phosphor of the present invention may be used as a mixture of the phosphor of the present invention and another phosphor (wherein the term "mixture" indicates that the phosphors need not necessarily be mixed with each other but different phosphors are combined). In particular, the phosphors are mixed in the combinations described above to obtain preferred phosphor mixtures. The types and proportions of the phosphors mixed are not particularly limited.

<Sealing Material>

The light-emitting device of the present invention usually includes the first and/or second phosphor dispersed in a liquid medium serving as a sealing material. The same liquid media described in "{Phosphor-Containing Composition}" may be used.

To adjust the refractive index of a sealing member, the liquid medium may contain a metal element which can form a metal oxide with a high refractive index. Examples of the metal element which can form a metal oxide with a high refractive index include Si, Al, Zr, Ti, Y, Nb, and B. These metal elements may be used alone or in combination of two or more in any proportion.

The existence form of such a metal element is not particularly limited unless the transparency of the sealing member is reduced. For example, the metal element may form metalloxane bonds to form a uniform glass layer. Alternatively, the metal element in the form of particles may be present in the sealing member. In the case where the metal element is present in the form of particles, the internal structure of each particle may be amorphous or crystalline. To obtain a high refractive index, a crystal structure is preferred. The particle size is usually equal to or lower than the emission wavelength of a semiconductor light-emitting element, preferably 100 nm or less, more preferably 50 nm or less, and particularly preferably 30 nm or less, in order not to reduce the transparency of the sealing member. For example, the incorporation of particles of, for example, silicon oxide, aluminum oxide, zirconium oxide, titanium oxide, yttrium oxide, or niobium oxide into a silicone material allows the sealing member to contain the metal element being in the form of particles.

The liquid medium may further contain known additives such as a diffusing agent, a filler, a viscosity-adjusting agent, and an ultraviolet-ray absorber.

<Structure of Light-Emitting Device (Other)>

The structure of the light-emitting device of the present invention is not particularly limited as long as it includes the first illuminant and the second illuminant. Usually, the first illuminant and the second illuminant are arranged on an appropriate frame. In this case, the first illuminant and the second illuminant are arranged in such a manner that the second illuminant is excited by the emission of the first illuminant (i.e., the first and the second phosphors are excited) to emit light and that light emitted from the first illuminant and/or light emitted from the second illuminant is guided to the outside. In this case, the first phosphor and the second phosphor need not necessarily be incorporated in the same layer. Phosphors that emit light of different colors may be incorporated into different layers. For example, a layer containing the second phosphor may be stacked on a layer containing the first phosphor.

The light-emitting device of the present invention may further include a member other than the excitation light source (first illuminant), the phosphor (second illuminant), and the frame. An example thereof is the sealing material described above. The sealing material can be used to disperse the phosphor (second illuminant) in the light-emitting device. Furthermore, the sealing material can be used to bond the excitation light source (first illuminant), the phosphor (second illuminant), and the frame.

<Embodiment of Light-Emitting Device>

While the light-emitting device of the present invention will be described in further detail below by embodiments, the present invention is not limited to the embodiments described below. Various changes may be made without departing from the scope of the invention.

FIG. 1 is a schematic perspective view illustrating the positional relationship between a first illuminant serving as an excitation light source and a second illuminant being formed as a phosphor-containing portion containing the phosphor according to an embodiment of a light-emitting device of the present invention. In FIG. 1, reference numeral 1 denotes the phosphor-containing portion (second illuminant), reference numeral 2 denotes a surface-emitting GaN-based LD serving as the excitation light source (first illuminant), and reference numeral 3 denotes a substrate. To bring the components into contact with each other, the LD (2) and the phosphor-containing portion (second illuminant) (1) may be separately formed, and then their surfaces may be brought into contact with each other using an adhesive or another means. Alternatively, the phosphor-containing portion (second illuminant) may be deposited (formed) on the light-emitting face of the LD (2). Thereby, the contact between the LD (2) and the phosphor-containing portion (second illuminant) (1) can be established.

In the case of such a device structure, a light quantity loss in which light from the excitation light source (first illuminant) is reflected from the film surface of the phosphor-containing portion (second illuminant) to emerge to the outside can be inhibited, thereby increasing luminous efficiency of the entire device.

Figure 2A:
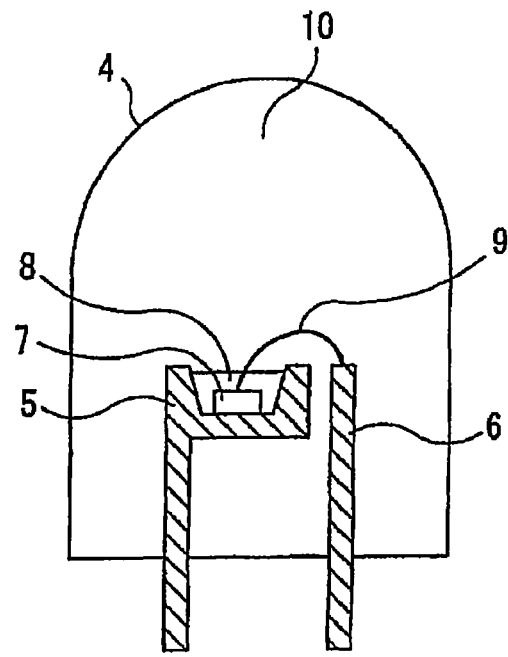
FIG. 2a is a schematic cross-sectional view of a shell-shaped light-emitting device according to an embodiment of the present invention.

FIG. 2(a) illustrates a typical shell-shaped light-emitting device and is a schematic cross-sectional view of the light-emitting device including an excitation light source (first illuminant) and a phosphor-containing portion (second illuminant) according to an embodiment. In the light-emitting device (4), reference numeral 5 denotes a mount lead, reference numeral 6 denotes an inner lead, reference numeral 7 denotes an excitation light source (first illuminant), reference numeral 8 denotes a phosphor-containing resin portion, reference numeral 9 denotes a conductive wire, and reference numeral 10 denotes a mold member.

Figure 2B:
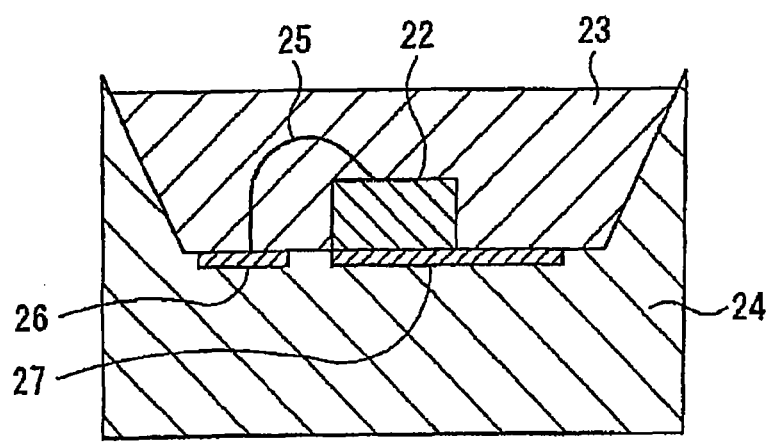
FIG. 2b is a schematic cross-sectional view of a surface-mount light-emitting device according to an embodiment of the present invention.

FIG. 2(b) illustrates a typical surface-mount light-emitting device and is a schematic cross-sectional view of the light-emitting device including an excitation light source (first illuminant) and a phosphor-containing portion (second illuminant) according to an embodiment. In the figure, reference numeral 22 denotes an excitation light source (first illuminant), reference numeral 23 denotes a phosphor-containing resin portion serving as a phosphor-containing portion (second illuminant), reference numeral 24 denotes a frame, reference numeral 25 denotes a conductive wire, reference numerals 26 and 27 denote electrodes.

<Application of Light-Emitting Device>

Applications of the light-emitting device of the present invention are not particularly limited. The light-emitting device can be used in various fields in which common light-emitting devices are used. In particular, the light-emitting device of the present invention is suitably used as a light source of a lighting system and an image display because of its wide color reproduction range and its high color rendering properties.

{Lighting System}

In the case where a light-emitting device of the present invention is applied to a lighting system, the light-emitting device as described above may be appropriately incorporated into the known lighting system. An example thereof is a surface-emitting lighting system (11) including the light-emitting device (4) shown in FIG. 3.

Figure 3:
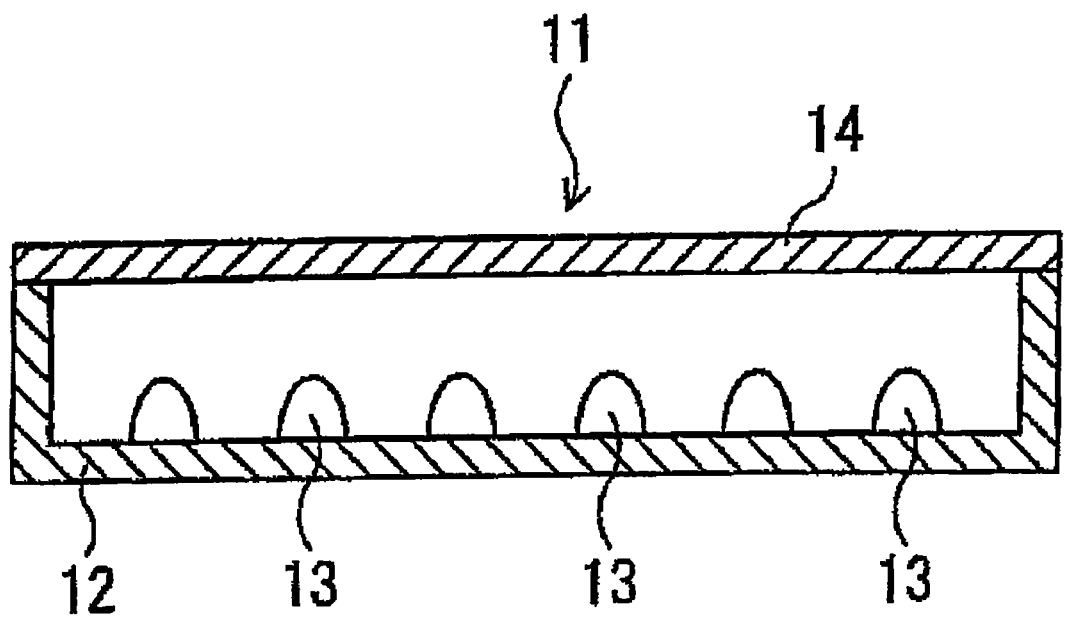
FIG. 3 is a schematic cross-sectional view of a lighting system according to an embodiment of the present invention.

FIG. 3 is a schematic cross-sectional view of a lighting system according to an embodiment of the present invention. As shown in FIG. 3, in the surface-emitting lighting system, many light-emitting devices (13) (corresponding to the light-emitting device (4) described above) are arranged on the bottom of an opaque square case (12) having a smooth white inner surface or the like, and a power supply, a circuit, and the like (not shown) for driving the light-emitting devices (13) are arranged outside the case. To uniformize emission, a diffuser (14) formed of, for example, a milky white acrylic board is fixed to a portion corresponding to a lid of the case (12).

In the case where the surface-emitting lighting system (11) is driven, a voltage is applied to the excitation light sources (first illuminants) of the light-emitting devices (13) to emit light. The phosphor in the phosphor-containing resin portions serving as the phosphor-containing portions (second illuminants) partially absorb the light and then emit visible light. The color mixture of the visible light and blue light not absorbed by the phosphor results in light with high color rendering properties. The light travels upward in the figure through the diffuser (14). Thereby, illuminating light having uniform brightness is obtained in the plane of the diffuser (14) of the case (12).

{Image Display}

In the case where a light-emitting device of the present invention is used as a light source of an image display, a specific structure of the image display is not limited. The light-emitting device is preferably used together with a color filter. For example, in the case where a color image display including a color liquid crystal display element is produced as the image display, a combination of the light-emitting device as a backlight, a liquid crystal light valve, and a color filter including red, green, and blue pixels produces an image display.

EXAMPLES

While the present invention will be described in further detail below by examples, the present invention is not limited to examples described below within a range in which the scope of the invention is not impaired.

In each of examples and comparative examples, various evaluations were made by the following methods.

Measurement of Change in Weight and Melting Point

A change in weight was measured by heating 10 mg of an alloy powder or a nitrogen-containing alloy in each of the examples and comparative examples from room temperature to 1,500° C. at a heating rate of 10° C./min under a stream of an atmospheric gas (nitrogen, argon, or a mixed gas of nitrogen and argon) at a flow rate of 100 mL/min with a thermogravimetry-differential thermal analyzer (TG-DTA) (TG-DTA2000, manufactured by Bruker AXS K.K.).

In graphs showing the measurement results (FIGS. 5 and 10), the left vertical axis indicates the sample temperature (° C.), and the right vertical axis indicates the rate of weight change (%/hr).

Furthermore, in the TG-DTA measurement in an argon flow, an endotherm due to melting was detected, the temperature at which an endothermic peak appeared was defined as the melting point. In the melting point measurement, temperature calibration was performed with Au (m.p. 1,063° C.) and Si (m.p. 1,410° C.)

Measurement of Rate of Weight Increase

The rate of weight increase was determined by measuring the weight of an alloy powder before the primary nitridation step and the weight of a nitrogen-containing alloy after the primary nitridation step and calculating the rate from the formula [4]:

(Weight of nitrogen-containing alloy after primary nitridation step−weight of alloy powder before primary nitridation step)/weight of alloy powder before primary nitridation step×100    [4].

Measurement of Total Content of Metal Elements

The total content of metal elements was determined by measuring the weight of an alloy powder before the primary nitridation step and the weight of a nitrogen-containing alloy after the primary nitridation step and calculating the total content from the formula [5]:

The total content of metal elements (wt %)=100−{(weight of nitrogen-containing alloy after primary nitridation step−weight of alloy before primary nitridation step)/weight of nitrogen-containing alloy after primary nitridation step}×100    [5].

Measurement of Nitrogen Content

The nitrogen content can be determined by measuring the nitrogen content of a nitrogen-containing alloy or a phosphor with an oxygen-nitrogen analyzer (manufactured by Leco Corporation) and calculating the nitrogen content of the nitrogen-containing alloy from the formula [6] or calculating the nitrogen content of the phosphor from the formula [6A]:

Nitrogen content of nitrogen-containing alloy (wt %)=(amount of nitrogen/weight of nitrogen-containing alloy)×100    [6]

Nitrogen content of phosphor (wt %)=(amount of nitrogen/weight of phosphor)×100    [6A]

Measurement of Oxygen Content

The oxygen content can be determined by measuring the oxygen content of a nitrogen-containing alloy or a phosphor with an oxygen-nitrogen analyzer (manufactured by Leco Corporation) and calculating the oxygen content of the nitrogen-containing alloy from the formula [8] or calculating the oxygen content of the phosphor from the formula [8A]:

Oxygen content of nitrogen-containing alloy (wt %)=(amount of oxygen/weight of nitrogen-containing alloy)×100    [8]

Oxygen content of phosphor (wt %)=(amount of oxygen/weight of phosphor)×100    [8A]

Calculation Method of $N_1/NP$ $N_1/NP$ was determined from the formula [7] using the measurements of the nitrogen content.

$$0.03 \leq N_1/NP \leq 0.9 \quad [7]$$

wherein in the formula [7], $N_1$ represents the nitrogen content (% by weight) of a nitrogen-containing alloy; and NP represents the nitrogen content (% by weight) of a phosphor produced.

Measurement of Weight-Average Median Diameter $D_{50}$ of Alloy Powder

An alloy powder sample was dispersed in ethylene glycol. The weight particle-size distribution curve of the sample was determined with a laser scattering particle size distribution analyzer (LA-300, manufactured by HORIBA, Ltd.) in the particle size range of 0.1 μm to 600 μm at an ambient temperature of 25° C. and a humidity of 70%. A particle size corresponding to an integrated value of 50% was defined as the weight-average median diameter $D_{50}$. Furthermore, QD was calculated from the expression: $QD=(D_{75}-D_{25})/(D_{75}+D_{25})$ where $D_{25}$ represents a particle size corresponding to an integrated value of 25%, and $D_{75}$ represents a particle size corresponding to an integrated value of 75%.

Measurement of Weight-Average Median Diameter $D_{50}$ of Phosphor

Prior to measurement, a sample was dispersed by ultrasound with an ultrasonic dispersion system (manufactured by Kaijo Corporation) at a frequency of 19 KHz and an ultrasound intensity of 5 W for 25 seconds. Water containing a minute amount of a surfactant to prevent reaggregation was used as a dispersing liquid.

The weight-average median diameter was measured with a laser diffraction/scattering particle size distribution analyzer (manufactured by HORIBA, Ltd).

[X-Ray Powder Diffraction Measurement]

X-ray powder diffraction was performed with a powder X-ray diffractometer XPert MPD (manufactured by Philips) in air. Measurement conditions are described below.

Scan step [° 2θ]: 0.0500
Start position [° 2θ]: 10.0350
Finish position [° 2θ]: 89.9350
Predetermined X-ray output: 45 kV, 40 mA
Divergence slit (DS) size [°]: 1.0000
Receiving slit (RS) size [mm]: 1.0000
Type of scanning: Continuous
Scan step time [s]: 33.0000
Temperature during measurement [° C.]: 0.00
Diameter of goniometer [mm]: 200.00
Focus-DS distance [mm]: 91.00
Irradiation width [mm]: 10.00
Sample width [mm]: 10.00
Scan axis: goniometer
Incident side monochromator: None
Target: Cu
CuKα (1.541 Å)

Analysis of Chemical Composition

The chemical composition was analyzed by inductively coupled plasma-atomic emission spectrometry (hereinafter, also referred to as an "ICP technique") with an ICP chemical analyzer "JY 38S" (manufactured by Jobin-Yvon).

Measurement of Electric Conductivity of Supernatant Liquid in Water-Dispersing Test Phosphor particles were classified by sieving so as to have a weight-average median diameter $D_{50}$ of 9 μm (however, if washed phosphor particles had a weight-average median diameter $D_{50}$ of 9 μm, this operation was not performed). The phosphor particles were placed in water weighing ten times as much as the phosphor and stirred with a stirrer for 10 minutes so as to be dispersed. The dispersion was allowed to stand for 1 hour, leading to spontaneous sedimentation of the phosphor. The electric conductivity of the supernatant liquid was measured.

The electric conductivity was measured with a conductivity meter "EC METER CM-30G", manufactured by DKK-TOA Corporation. Washing and measurement were performed at room temperature.

The water used in the water-dispersing test for phosphors or used to wash the phosphors in examples and comparative examples had an electric conductivity of 0.03 mS/m.

Emission Spectrum

The emission spectrum of a phosphor was measured with a fluorescence spectrometer (manufactured by JASCO Corporation) including a 150-W xenon lamp as an excitation light source and a CCD multichannel detector C7041 (manufactured by Hamamatsu Photonics K.K.) as a spectrometer. Light from an excitation light source was passed through a grating spectrometer with a focal length of 10 cm. The phosphor was irradiated with only excitation light having a wavelength of 465 nm through an optical fiber. Light emitted from the phosphor by irradiation with the excitation light was dispersed into a spectrum with a grating spectrometer having a focal length of 25 cm. Light emission intensities at wavelengths in the range of 300 nm to 800 nm were measured with a spectrometer. Signal processing such as sensitivity correction with a personal computer was performed to obtain an emission spectrum.

Measurement of Peak Emission Wavelength, Relative Peak Emission Intensity, and Relative Brightness The peak emission wavelength was read from the resulting emission spectrum.

The relative peak emission intensity (hereinafter, also referred to as "peak emission intensity") was expressed as a relative value with reference to the peak intensity of a phosphor in Reference Example 1.

The relative brightness with respect to 100% of the stimulus value Y of the phosphor in Reference Example 1 (hereinafter, also referred to simply as "brightness") was calculated from a stimulus value Y in the XYZ colorimetric system calculated in accordance with JIS Z8724. The brightness was measured while excitation blue light was being blocked.

Reference Example 1

$Ca_3N_2$ (manufactured by CERAC Inc., 200-mesh passed), AlN (F grade, manufactured by Tokuyama Corp.), $Si_3N_4$ (SN-E10, manufactured by Ube Industries, Ltd.), and $Eu_2O_3$ (manufactured by Shin-Etsu Chemical Co. Ltd.) were weighed in an argon atmosphere in such a manner that the ratio of Eu to Ca to Al to Si=0.008:0.992:1:1 (molar ratio). These materials were mixed using an alumina mortar. The resulting raw material mixture was placed in a boron nitride crucible. The Crucible was placed in an atmosphere furnace. After the furnace was evacuated to $1 \times 10^{-2}$ Pa, the evacuation was stopped. Nitrogen was charged into the furnace in such a manner that the pressure in the furnace was increased to 0.1 MPa. The mixture was heated to 1,600° C. and maintained at 1,600° C. for 5 hours. The resulting fired product was milled with an alumina mortar. The resulting particles each having a size of 100 μm or less were collected to prepare a phosphor. The phosphor had a peak emission wavelength of 648 nm at an excitation wavelength of 465 nm.

Measurement of Chromaticity Coordinates

Chromaticity coordinates x and y in the XYZ colorimetric system defined by JIS Z8701 were calculated from the data in the wavelength range of 480 nm to 800 nm of an emission spectrum.

Calculation of Value of Formula [A]

The mass (g) of a firing vessel and the mass (g) of a raw material for a phosphor were measured. The resulting measurements were substituted for the formula [A] to yield the value of the formula [A]:

$$\text{(Mass of raw material for phosphor)}/\{\text{(mass of firing vessel)}+\text{(mass of raw material for phosphor)}\} \quad [A].$$

Measurement of Temperature Change Per Minute in Heating Step

The temperature of the external wall of a firing vessel was measured at intervals of 10 seconds with a tungsten-rhenium alloy thermocouple. A thermometer was arranged on the external wall of the firing vessel at a height position approximately equal to half the height of a raw material for a phosphor placed therein. The temperature change per minute was determined from the formula [B] using the measurements:

Temperature change (° C./min)=temperature at time $T$ min−temperature at time ($T$−1) min        [B].

Example 1

Production of Alloy

Raw material metals were weighed in such a manner that the composition ratio of metal elements, i.e., the ratio (molar ratio) of Al to Si, was 1:1. The raw material metals were charged into a graphite crucible and melted in an argon atmosphere with a high-frequency induction melting furnace. The molten metal mixture was poured from the crucible into a mold and then solidified, whereby an alloy (a mother alloy) in which the composition ratio of the metal elements, i.e., the ratio of Al to Si, was 1:1, was obtained.

The mother alloy and other raw material metals were weighed in such a manner that the ratio of Eu to Sr to Ca to Al to Si was 0.008:0.792:0.2:1:1 (molar ratio). After the furnace was evacuated, the evacuation of the furnace was stopped and argon was then introduced into the furnace until the pressure in the furnace reached a predetermined value. The mother alloy was melted in a calcia crucible. Sr, Eu, and Ca, which are the raw material metals, were added thereto. After all these components were melted into a mixture and the molten mixture was observed to have been agitated by an induction current, the molten mixture was poured from the crucible into a water-cooled copper mold (having a plate shape with a thickness of 40 mm) and then solidified.

A 40-mm-thick plate of the resulting alloy was analyzed with regard to its composition by an ICP technique. About 10 g of a sample was taken from a portion close to the center of gravity of the plate and a 10 g of a sample was taken from an end portion of the plate. The elemental analysis of the samples using the ICP technique determined that the ratio of Eu to Sr to Ca to Al to Si in the sample taken from the plate center portion was 0.009:0.782:0.212:1:0.986; and the ratio of Eu to Sr to Ca to Al to Si in the sample taken from the plate end portion was 0.009:0.756:0.210:1:0.962.

The samples had substantially the same composition within the scope of analytical precision. Therefore, Eu and the other elements seemed to be uniformly distributed.

The resulting alloy had an X-ray powder diffraction pattern similar to that of $Sr(Si_{0.5}Al_{0.5})_2$ and therefore was determined to be an $AlB_2$-type intermetallic compound referred to as an alkaline-earth silicide.

Milling Step

The resulting alloy was milled with an alumina mortar in a nitrogen atmosphere in such a manner that the formed particles had a diameter of about 1 mm or less. The resulting alloy powder was milled in a nitrogen atmosphere (having an oxygen content of 2% by volume) with a supersonic jet mill (PJM-80SP, manufactured by Nippon Pneumatic manufacturing Co., Ltd.) under the following conditions: a milling pressure of 0.15 MPa and a feed rate of 0.8 kg/hr.

The weight-average median diameter $D_{50}$, QD, and the particle size distribution of the resulting alloy powder were measured. The weight-average median diameter $D_{50}$ was 14.2 µm. The QD was 0.38. The percentage of alloy particles having a size of 10 µm or less in the alloy powder was 28.6% of the total. The percentage of alloy particles having a size of 45 µm or more was 2.90. The alloy powder had an oxygen content of 0.3% by weight and a nitrogen content of 0.3% by weight or less (limit of detection).

The melting point of the resulting alloy powder was measured under argon flow. The melting initiation temperature was about 1,078° C., and the melting point was 1,121° C.

Primary Nitridation Step

Into a boron nitride crucible with an inner diameter of 54 mm, 40 g of the resulting alloy powder was placed. The alloy powder was heated from room temperature to 950° C. at a heating rate of 4° C./min, heated from 950° C. to 1,100° C. at a heating rate of 2° C./min, and maintained at the maximum temperature (1,100° C.) for 5 hours in a tubular electric furnace under a stream of a nitrogen-containing argon gas (nitrogen:argon=2:98 (volume ratio)) at a flow rate of 2 L/min under ambient pressure. Then the alloy powder was cooled to 950° C. at a cooling rate of 5° C./min and left to cool to room temperature at a cooling rate of about 10° C./min under a stream of a nitrogen-containing argon gas (nitrogen:argon=2:98 (volume ratio)) at a flow rate of 2 L/min, thereby producing a nitrogen-containing alloy.

The resulting nitrogen-containing alloy was taken out and weighed. The rate of weight increase was 4.5% by weight. The total metal element content was 95.7% by weight. Furthermore, the nitrogen content and the oxygen content of the resulting nitrogen-containing alloy were determined by the foregoing method. Table 7 shows the results.

The temperature in the primary nitridation step of the present invention indicates the temperature in the furnace, i.e., a preset temperature of a firing apparatus. The same is true in examples and comparative examples described below.

Secondary Nitridation Step

The nitrogen-containing alloy prepared in the primary nitridation step was milled with an alumina mortar under a stream of nitrogen so as to be given a particle size of 53 µm or less. Undersize particles of the alloy that passed through a sieve with 53-µm openings were collected. The alloy powder was placed into a boron nitride crucible with an inner diameter of 54 mm. The boron nitride crucible was set in a hot isostatic press (HIP). The press was evacuated to $5\times10^{-1}$ Pa. The alloy powder was heated to 300° C. The evacuation was continued for one hour at 300° C. Nitrogen was charged into the press in such a manner that the pressure in the press was increased to 1 MPa. The alloy powder was cooled to about room temperature. The pressure in the press was reduced to 0.1 MPa. Nitrogen was introduced into the press again in such a manner that the pressure in the press was increased to 1 MPa. This procedure was repeated twice. The pressure in the press was adjusted to about 0.1 MPa before initiation of heating. The alloy powder was heated until the temperature in the furnace reached 950° C. at a heating rate of 600° C./hr. At this point, the internal pressure was increased to about 0.5 MPa. The temperature in the furnace was increased from 950° C. to 1,100° C. at a heating rate of 66.7° C./hr. Then the temperature was maintained at 1,100° C. for 30 minutes. The nitrogen pressure was increased to 140 MPa over a period of about three hours while the temperature was maintained at 1,100° C. Heating and pressurization were performed over a period of about one hour in such a manner that the temperature in the furnace was increased to 1,900° C. and the pressure in the furnace was increased to 190 MPa. This state was maintained for two hours. The alloy powder was cooled to 400° C. or lower over a period of three hours and then left to cool. Twelve hours later, a phosphor having a temperature of about room temperature was obtained. The temperatures described above indicate the temperatures in the furnace, in other words, the temperatures described above indicate preset temperatures of the firing apparatus (HIP in this example) (the same is true in the following examples unless otherwise specified).

The resulting phosphor was milled with an alumina mortar. The light emission properties (peak emission wavelength, relative peak emission intensity, relative brightness, and chromaticity coordinates) were measured. Table 9 shows the results.

In this example, the value of the foregoing formula [A] was 0.50 (vessel mass: 40 g, raw material mass: 40 g), and the temperature change per minute in the heating step was 2° C./min or less.

Example 2

Post-Treatment Step

The phosphor prepared in Example 1 was placed in water weighing ten times as much as the phosphor at room temperature. The mixture was stirred for 10 minutes with a stirrer so as to be dispersed. After the dispersion had been allowed to stand for one hour, the precipitation of the phosphor was observed. The phosphor was separated by filtration. This procedure was repeated 15 times. The phosphor was dehydrated by suction filtration. The phosphor was placed in 0.5 N hydrochloric acid weighing ten times as much as the phosphor. The mixture was stirred for 10 minutes with the stirrer so as to be dispersed. After the dispersion had been allowed to stand for one hour, the phosphor was separated by filtration. The phosphor was dispersed in water weighing ten times as much as the phosphor and then filtrated. This procedure was repeated three times. The electrical conductivity of a supernatant liquid was measured as described above and determined to be 1.90 mS/m. After dehydration, drying was performed at 120° C. for 12 hours to obtain a phosphor.

The weight-average median diameter $D_{50}$ of the resulting phosphor was measured and determined to be 12.7 μm. The light emission properties of the resulting phosphor were measured. Table 9 shows the results. The results demonstrate that washing treatment of the phosphor prepared in Example 1 improves the relative emission peak intensity and the relative brightness. Table 8 shows the value of the formula [A] and the temperature change per minute in the heating step.

Example 3

The primary nitridation step was performed as in Example 1, except that the heating conditions were as follows: the maximum temperature was 1,050° C., and the holding time at the maximum temperature was 10 hours. The rate of weight increase and the total metal element content of the resulting nitrogen-containing alloy were calculated. Table 7 shows the results.

Subsequently, the secondary nitridation step was performed as in Example 1 to prepare a phosphor. The light emission properties of the resulting phosphor were measured. Table 9 shows the results. Table 8 shows the value of the formula [A] and the temperature change per minute in the heating step.

Example 4

The phosphor prepared in Example 3 was washed with water 15 times and then with 0.5 N hydrochloric acid once in the same way as in Example 2. Subsequently, the phosphor was washed with water five times in such a manner that the electrical conductivity of a supernatant liquid was 1.52 mS/m.

The phosphor was subjected to classification to prepare a phosphor having a particle diameter in the range of 3 μm to 30 μm.

The weight-average median diameter $D_{50}$ of the resulting phosphor was measured and determined to be 7.7 μm. The light emission properties of the resulting phosphor were measured. Table 9 shows the results. The results demonstrate that the resulting phosphor has a relative emission peak intensity and a relative brightness higher than those of the phosphor prepared in Example 3. Table 8 shows the value of the formula [A] and the temperature change per minute in the heating step.

Example 5

A nitrogen-containing alloy was prepared as in Example 3, except that in the primary nitridation step, the heating atmosphere was a nitrogen-containing argon gas (nitrogen:argon=7:93 (volume ratio)) flowing at a flow rate of 2 L/min. The rate of weight increase and the total metal element content of the resulting nitrogen-containing alloy were determined. Table 7 shows the results. The results demonstrate that in comparison with Example 3, an increase in nitrogen concentration in the furnace results in an increase in the rate of weight increase and a decrease in the total metal element content.

Subsequently, the secondary nitridation step was performed as in Example 1 to prepare a phosphor. The light emission properties of the resulting phosphor were measured. Table 9 shows the results. The results demonstrate that the resulting phosphor has improved light emission properties compared with the phosphor prepared in Example 3. Table 8 shows the value of the formula [A] and the temperature change per minute in the heating step.

Example 6

A nitrogen-containing alloy was prepared as in Example 3, except that in the primary nitridation step, the heating atmosphere was a nitrogen-containing argon gas (nitrogen:argon=4:96 (volume ratio)) flowing at a flow rate of 2 L/min. The rate of weight increase and the total metal element content of the resulting nitrogen-containing alloy were determined. Table 7 shows the results.

Subsequently, the secondary nitridation step was performed as in Example 1 to prepare a phosphor. The light emission properties of the resulting phosphor were measured. Table 9 shows the results. Table 8 shows the value of the formula [A] and the temperature change per minute in the heating step.

Example 7

A nitrogen-containing alloy was prepared as in Example 3, except that in the primary nitridation step, the heating atmosphere was a nitrogen-containing argon gas (nitrogen:argon=5:95 (volume ratio)) flowing at a flow rate of 2 L/min, and the holding time at the maximum temperature (1,050° C.) was five hours. The rate of weight increase and the total metal element content of the resulting nitrogen-containing alloy were determined. Table 7 shows the results. Subsequently, the secondary nitridation step was performed as in Example 1 to prepare a phosphor. The light emission properties of the resulting phosphor were measured. Table 9 shows the results. Table 8 shows the value of the formula [A] and the temperature change per minute in the heating step.

Example 8

A phosphor was prepared as in Example 3, except that in the primary nitridation step, the heating atmosphere was a nitrogen-containing argon gas (nitrogen:argon=5:95 (volume ratio)) flowing at a flow rate of 2 L/min. The rate of weight increase and the total metal element content of the resulting nitrogen-containing alloy were determined. Table 7 shows the results.

Subsequently, the secondary nitridation step was performed as in Example 1 to prepare a phosphor. The light emission properties of the resulting phosphor were measured. Table 9 shows the results. Table 8 shows the value of the formula [A] and the temperature change per minute in the heating step.

Example 9

An alloy powder prepared as in Example 1 was subjected to the primary nitridation step under the following conditions: 40 g of the alloy powder was placed into a boron nitride crucible with an inner diameter of 54 mm and heated in an atmosphere furnace. The alloy powder was heated from room temperature to 900° C. at a heating rate of 20° C./min in vacuum. A nitrogen-containing argon gas (nitrogen:argon=5:95 (volume ratio)) was charged thereinto at 900° C. in such a manner that the gauge pressure of the gas was 0.01 MPa. The alloy powder was heated from 900° C. to 1,050° C. at a heating rate of 2° C./min under a stream of a nitrogen-containing argon gas (nitrogen:argon=5:95 (volume ratio)) at a flow rate of 1 L/min while this pressure was maintained. The alloy powder was maintained at the maximum temperature of 1,050° C. for four hours. Then the alloy powder was cooled to 200° C. or lower over a period of about two hours and left to cool to room temperature, thereby preparing a nitrogen-containing alloy. The rate of weight increase and the total metal element content of the resulting nitrogen-containing alloy were calculated. Table 7 shows the results.

Subsequently, the secondary nitridation step was performed as in Example 1 to prepare a phosphor. The light emission properties of the resulting phosphor were measured. Table 9 shows the results. Table 8 shows the value of the formula [A] and the temperature change per minute in the heating step.

Example 10

A nitrogen-containing alloy was prepared as in Example 1, except that in the primary nitridation step, heating was performed in a stream of nitrogen, the maximum temperature was 1,030° C., and the holding time at the maximum temperature was eight hours.

Analysis of the resulting nitrogen-containing alloy with regard to its nitrogen content and its oxygen content demonstrated that the nitrogen content was 1.10% by weight and the oxygen content was 1.66% by weight. The rate of weight increase was about 3% by weight. The total metal element content was 97% by weight.

The results of analysis of the nitrogen content and the oxygen content and analysis by the ICP technique demonstrated that the composition ratio of the elements, i.e., the ratio of Al to Si to Ca to Sr to Eu to N to O, constituting the resulting nitrogen-containing alloy was 1:0.922:0.214:0.734:0.008:0.11:0.14.

The resulting nitrogen-containing alloy was subjected to the secondary nitridation step as in Example 1 to prepare a phosphor.

The light emission properties of the resulting phosphor were measured. Table 9 shows the results.

Subsequently, the resulting phosphor was subjected to washing treatment as in Example 4. The oxygen content, the nitrogen content, and the NI/NP were determined. Table 9 shows the results. Table 8 shows the value of the formula [A] and the temperature change per minute in the heating step.

Example 11

A phosphor was prepared as in Example 1, except that the alloy powder prepared in Example 1 was subjected to the primary nitridation step under the following conditions and that after the completion of the primary nitridation step, the milling treatment was not performed.

The atmosphere in a rotary kiln was entirely replaced with argon. An alumina furnace tube having a diameter of 90 mm and a length of 1,500 mm was set so as to have an angle of inclination of 1.9°. An alloy powder was continuously fed at a feed rate of 400 g/hr using a screw feeder under a stream of a mixed gas containing nitrogen (0.7 L/min), hydrogen (0.2 L/min), and argon (5 L/min) in the countercurrent direction of the furnace tube while the furnace tube was rotating at 5 rpm. The temperature of a heater was set at 1,100° C. In this case, the residence time of the alloy powder in a soaking area (here, a middle portion with a length of about 150 mm of the furnace tube) was three minutes. A nitrogen-containing alloy prepared by the primary nitridation step was ejected from the furnace tube, collected in a vessel filled with argon, and rapidly cooled. The resulting nitrogen-containing alloy was in the form of a powder.

Analysis of the resulting nitrogen-containing alloy with regard to its nitrogen content and its oxygen content demonstrated that the nitrogen content was 3.7% by weight and the oxygen content was 1.2% by weight.

Figure 6:
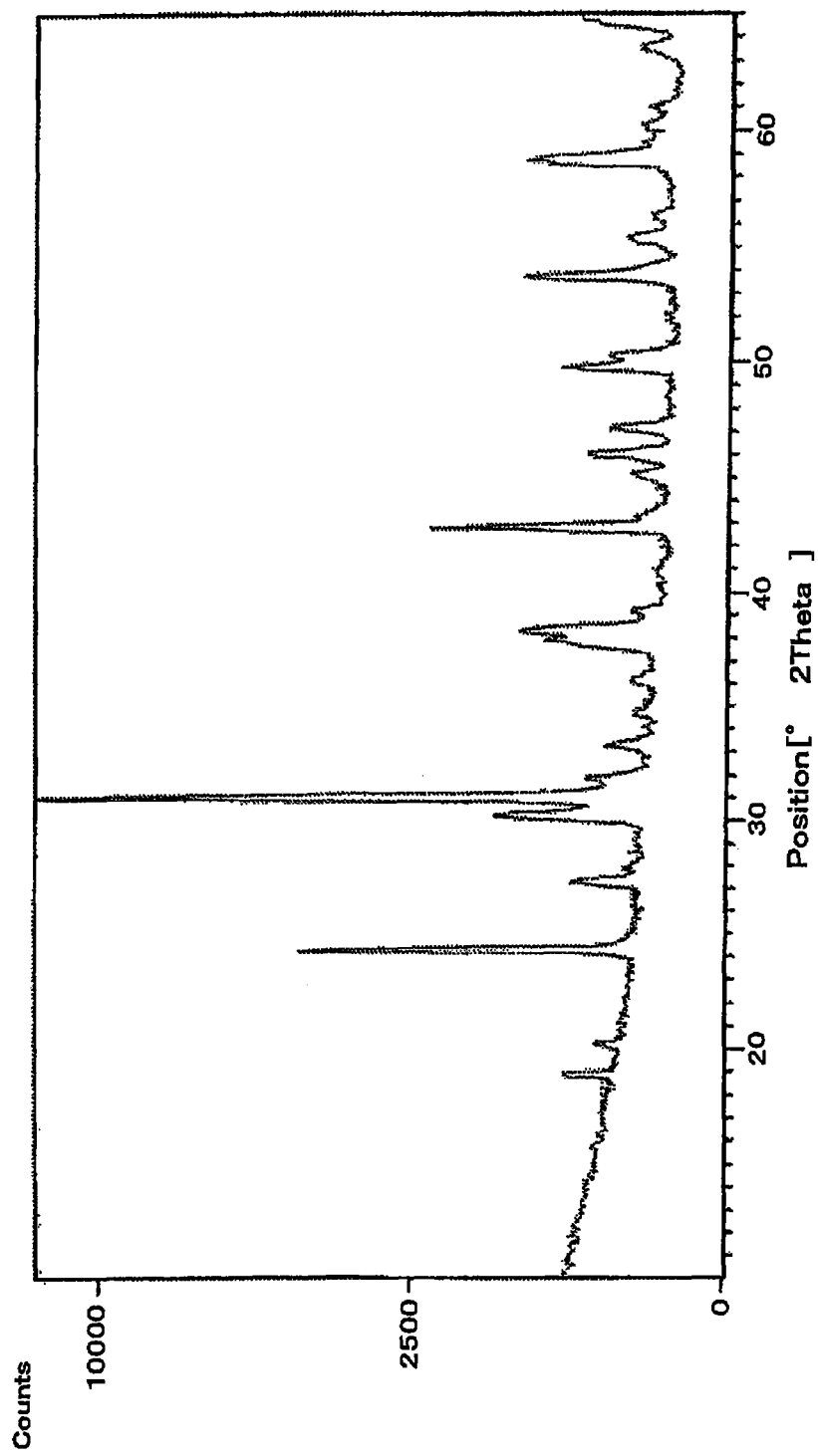
FIG. 6 is a powder x-ray diffraction pattern of a nitrogen-containing alloy prepared in Example 11.

FIG. 6 shows an X-ray powder diffraction pattern of the resulting nitrogen-containing alloy. The main phase had an X-ray powder diffraction pattern similar to that of $Sr(Si_{0.5}Al_{0.5})_2$, which is one of $AlB_2$-type intermetallic compounds referred to as alkaline-earth silicides. Other intermetallic compounds such as SrSi (PDF No. 16-0008) and $SrSi_2$ (PDF No. 19-1285) were also detected.

Subsequently, the resulting nitrogen-containing alloy was subjected to the secondary nitridation step as in Example 1 to prepare a phosphor. The light emission properties of the resulting phosphor were measured. Table 9 shows the results.

After the resulting phosphor was subjected to washing treatment as in Example 2, the oxygen content and the nitrogen content were determined. Table 9 shows the results. Table 8 shows the value of the formula [A] and the temperature change per minute in the heating step.

Example 12

Into a boron nitride crucible with an inner diameter of 54 mm, 40 g of the alloy powder prepared in Example 1. The alloy powder was subjected to the primary nitridation step in an atmosphere furnace. The alloy powder was heated from room temperature to 900° C. at a heating rate of 20° C./min in vacuum. A nitrogen-containing argon gas (nitrogen:argon=5:95 (volume ratio)) was charged thereinto in such a manner that the gauge pressure of the gas was 0.01 MPa. The alloy powder was heated from 900° C. to 1,050° C. at a heating rate of 2° C./min under a stream of a nitrogen-containing argon gas (nitrogen:argon=5:95 (volume ratio)) at a flow rate of 1 L/min while this pressure was maintained. The alloy powder was maintained at the maximum temperature of 1,050° C. for four hours. After the alloy powder was cooled to 900° C., the atmospheric gas was replaced with nitrogen. The alloy powder was heated from 900° C. to 1,050° C. at a heating rate of 2° C./min and then maintained at 1,050° C. for four hours. The sample was cooled to 200° C. over a period of about two hours and left to cool to about room temperature.

The oxygen content and the nitrogen content of the resulting nitrogen-containing alloy were calculated. Table 7 shows the results.

Figure 7:
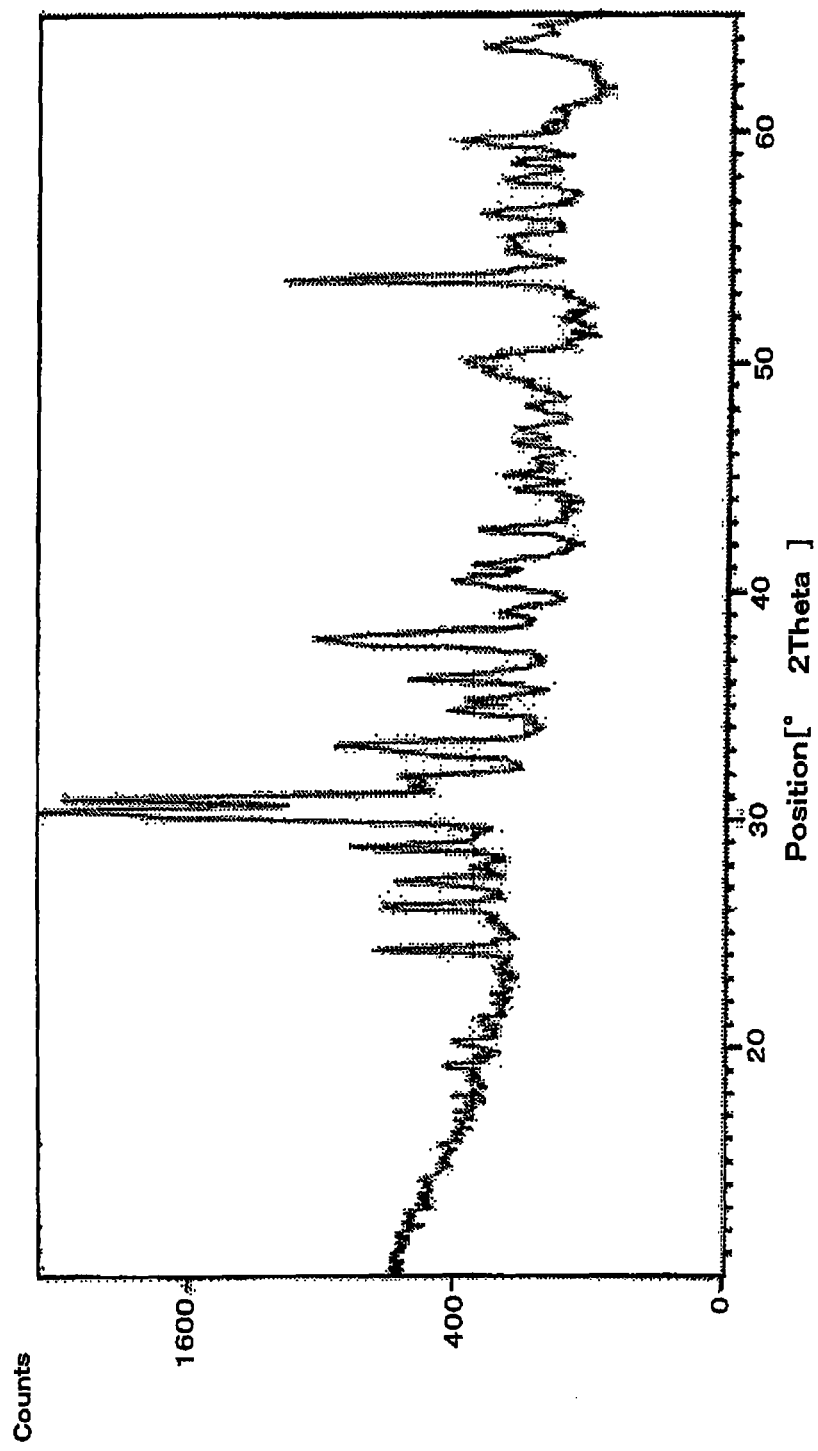
FIG. 7 is a powder x-ray diffraction pattern of a nitrogen-containing alloy prepared in Example 12.

FIG. 7 shows an X-ray powder diffraction pattern of the resulting nitrogen-containing alloy. From the X-ray powder diffraction pattern, a phase similar to $Sr(Si_{0.5}Al_{0.5})_2$ was detected as well as intermetallic compounds such as SrSi (PDF No. 16-0008) and $SrSi_2$ (No. 19-1285).

Figure 11:
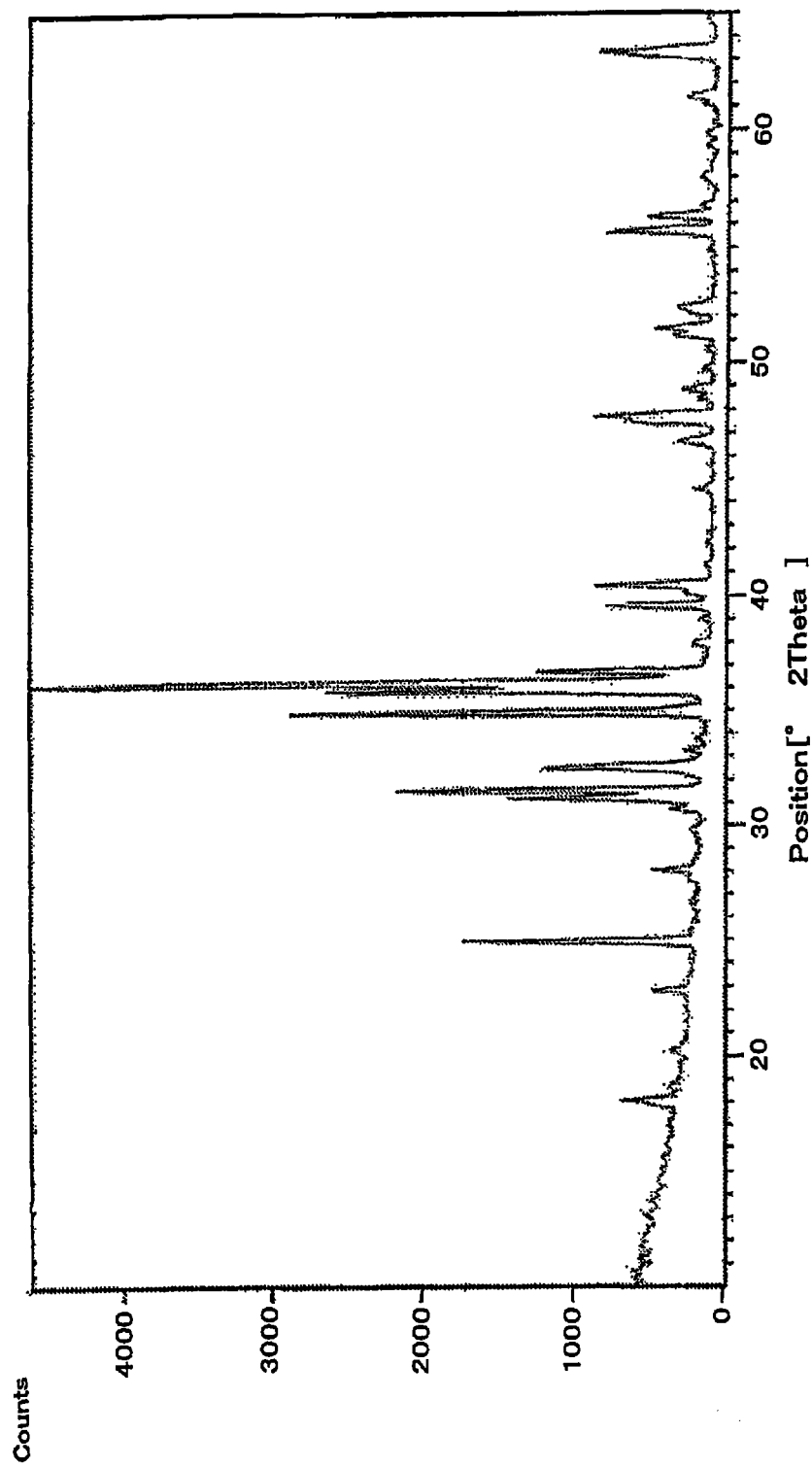
FIG. 11 is a powder x-ray diffraction pattern of a phosphor prepared in Example 12.

Subsequently, the resulting nitrogen-containing alloy was subjected to the secondary nitridation step as in Example 1, except that the nitrogen-containing alloy was heated from room temperature to 1,900° C. at a heating rate of 600° C./hr. Then the resulting phosphor was subjected to washing treatment and classifying treatment as in Example 4. The light emission properties of the resulting phosphor were measured. Table 9 shows the results. The oxygen content, the nitrogen content, and NI/NP were determined. Table 9 also shows the results. Table 8 shows the value of the formula [A] and the temperature change per minute in the heating step. FIG. 11 shows an X-ray powder diffraction pattern of the resulting phosphor.

Example 13

Into a boron nitride crucible with an inner diameter of 54 mm, 40 g of the alloy powder prepared in Example 1. The alloy powder was subjected to the primary nitridation step in an atmosphere furnace. The alloy powder was heated from room temperature to 900° C. at a heating rate of 20° C./min in vacuum. A nitrogen-containing argon gas (nitrogen:argon=5:95 (volume ratio)) was charged thereinto in such a manner that the gauge pressure of the gas was 0.01 MPa. The alloy powder was heated from 900° C. to 1,050° C. at a heating rate of 2° C./min under a stream of a nitrogen-containing argon gas (nitrogen:argon=5:95 (volume ratio)) at a flow rate of 1 L/min while this pressure was maintained. The alloy powder was maintained at the maximum temperature of 1,050° C. for three hours. The alloy powder was left to cool to room temperature. The alloy powder was heated again from 900° C. to 1,050° C. at a heating rate of 2° C./min under a stream of a nitrogen-containing argon gas (nitrogen:argon=5:95 (volume ratio)) at a flow rate of 1 L/min. The alloy powder was maintained at 1,050° C. for three hours. The alloy powder was cooled to room temperature. The atmosphere was replaced with nitrogen. The alloy powder was heated again from 900° C. to 1,050° C. at a heating rate of 2° C./min and maintained at 1,050° C. for three hours. The alloy powder was cooled to 200° C. over a period of about two hours and then left to cool to about room temperature.

The oxygen content and the nitrogen content of the resulting nitrogen-containing alloy were calculated. Table 7 shows the results.

Figure 8:
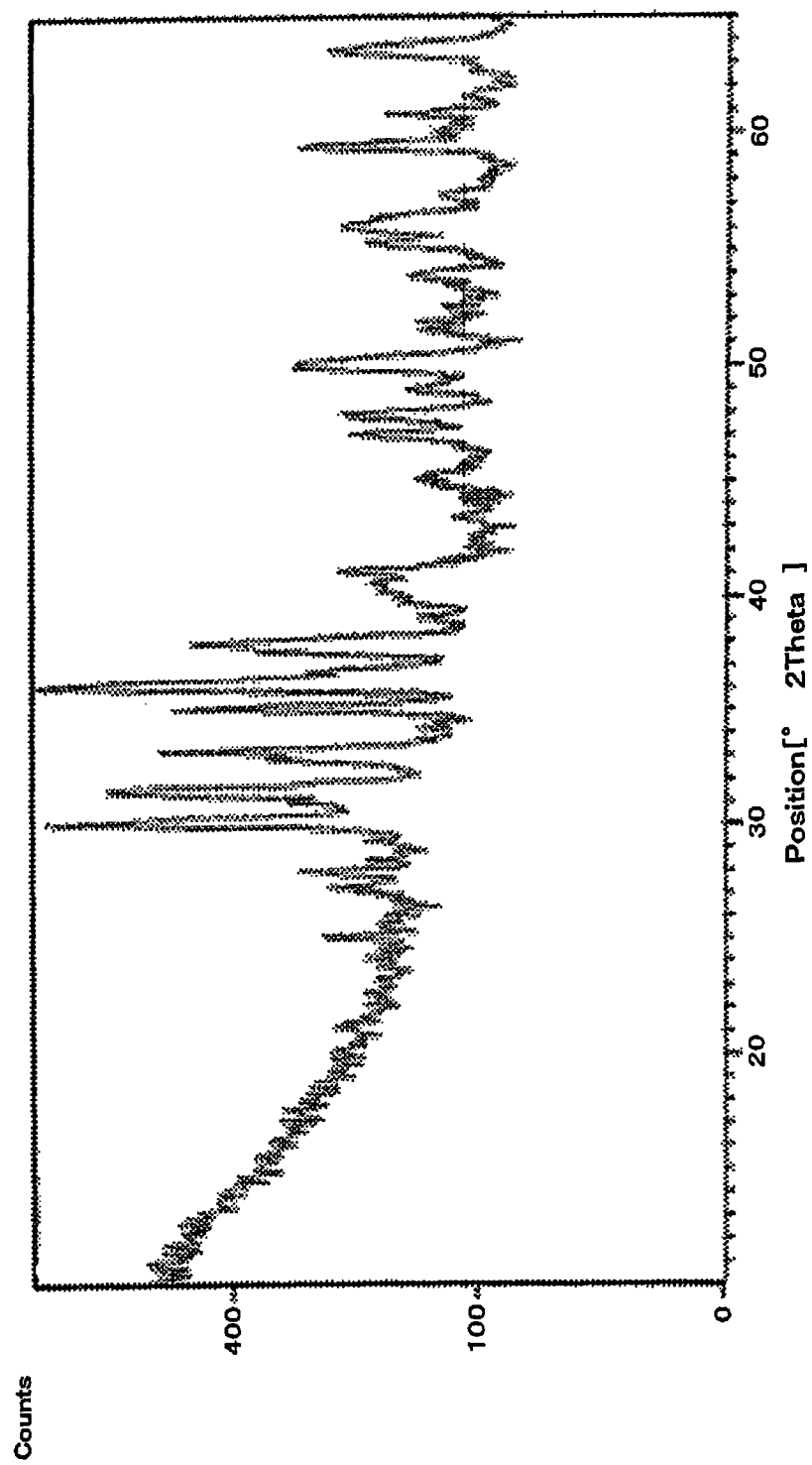
FIG. 8 is a powder x-ray diffraction pattern of a nitrogen-containing alloy prepared in Example 13.

FIG. 8 shows an X-ray powder diffraction pattern of the resulting nitrogen-containing alloy. From the X-ray powder diffraction pattern, intermetallic compounds such as SrSi (PDF No. 16-0008) and $SrSi_2$ (No. 19-1285) were detected.

Figure 12:
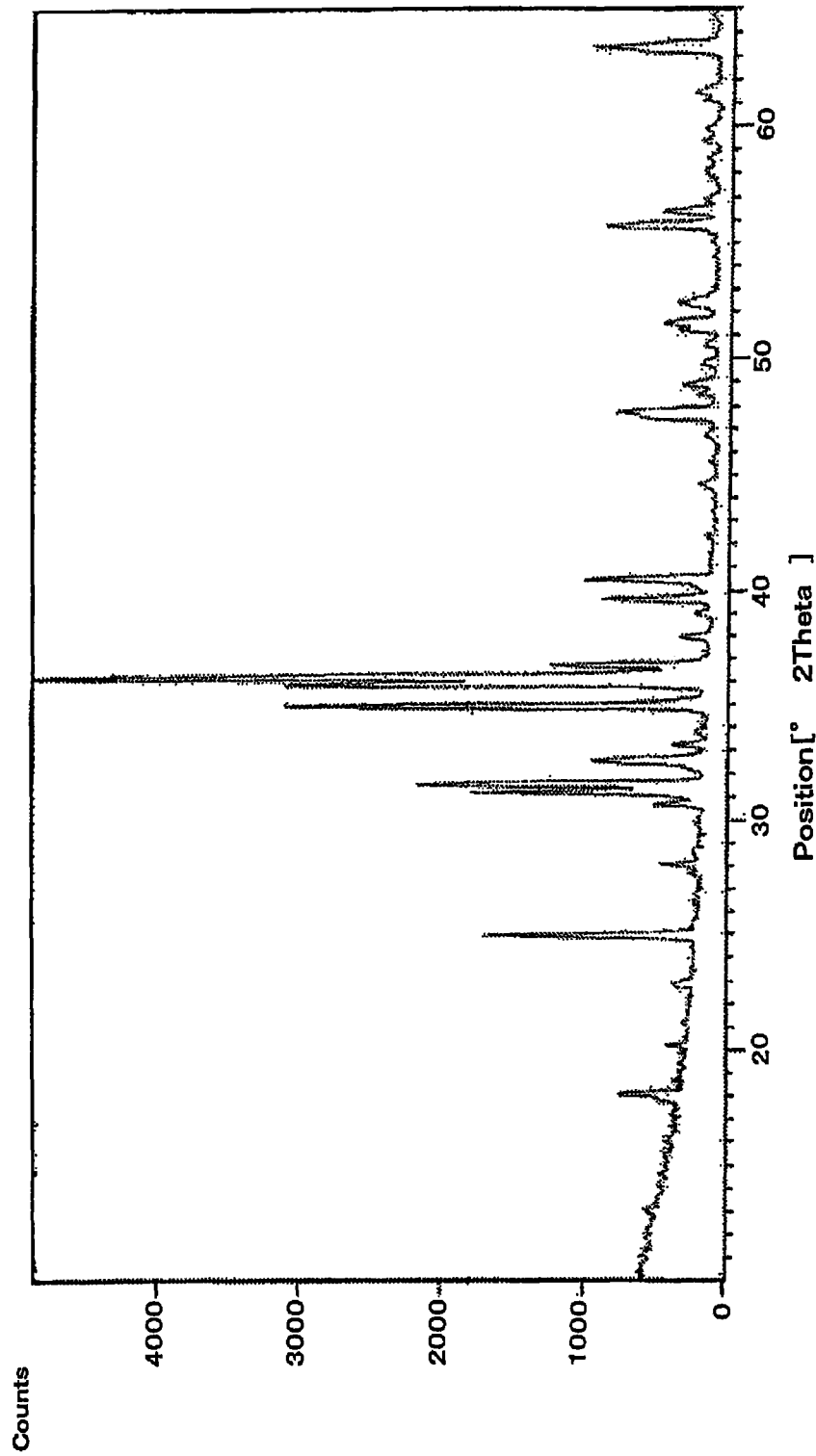
FIG. 12 is a powder x-ray diffraction pattern of a phosphor prepared in Example 13.

The resulting nitrogen-containing alloy was subjected to the secondary nitridation step as in Example 1, except that 142 g of the nitrogen-containing alloy was placed in a boron nitride crucible with a diameter of 85 mm and heated from room temperature to 1,900° C. at a heating rate of 600° C./hr. Then the resulting phosphor was subjected to washing treatment and classifying treatment as in Example 4. The light emission properties of the resulting phosphor were measured. Table 9 shows the results. The oxygen content, the nitrogen content, and NI/NP were determined. Table 9 also shows the results. Table 8 shows the value of the formula [A] and the temperature change per minute in the heating step. FIG. 12 shows an X-ray powder diffraction pattern of the resulting phosphor.

Example 14

A phosphor was prepared as in Example 1, except that the alloy powder prepared in Example 1 was subjected to the primary nitridation step under the following conditions and that after the completion of the primary nitridation step, the milling treatment was not performed.

After an atmosphere rotary kiln was entirely evacuated, gas replacement was performed by introducing a mixed gas of nitrogen (2.5 L/min) and argon (2.5 L/min). An alumina furnace tube having a diameter of 90 mm and a length of 1,500 mm was set so as to have an angle of inclination of 1.9°. The temperature of a heater was set at 1,100° C. An alloy powder was continuously fed at a feed rate of 220 g/hr using a screw feeder under a stream of a mixed gas containing nitrogen (0.7 L/min), hydrogen (0.2 L/min), and argon (5 L/min) in the countercurrent direction of the furnace tube while the furnace tube was rotating at 5 rpm. In this case, the residence time of the alloy powder in a soaking area (time from feed initiation to discharge initiation×soaking area length/furnace tube length) was about three minutes. A nitrogen-containing alloy prepared by the primary nitridation step was ejected from the furnace tube, collected in a vessel filled with argon, and rapidly cooled.

Analysis of the nitrogen-containing alloy prepared by the primary nitridation step demonstrated that the nitrogen content was 8.9% by weight and the oxygen content was 2.9% by weight.

Figure 9:
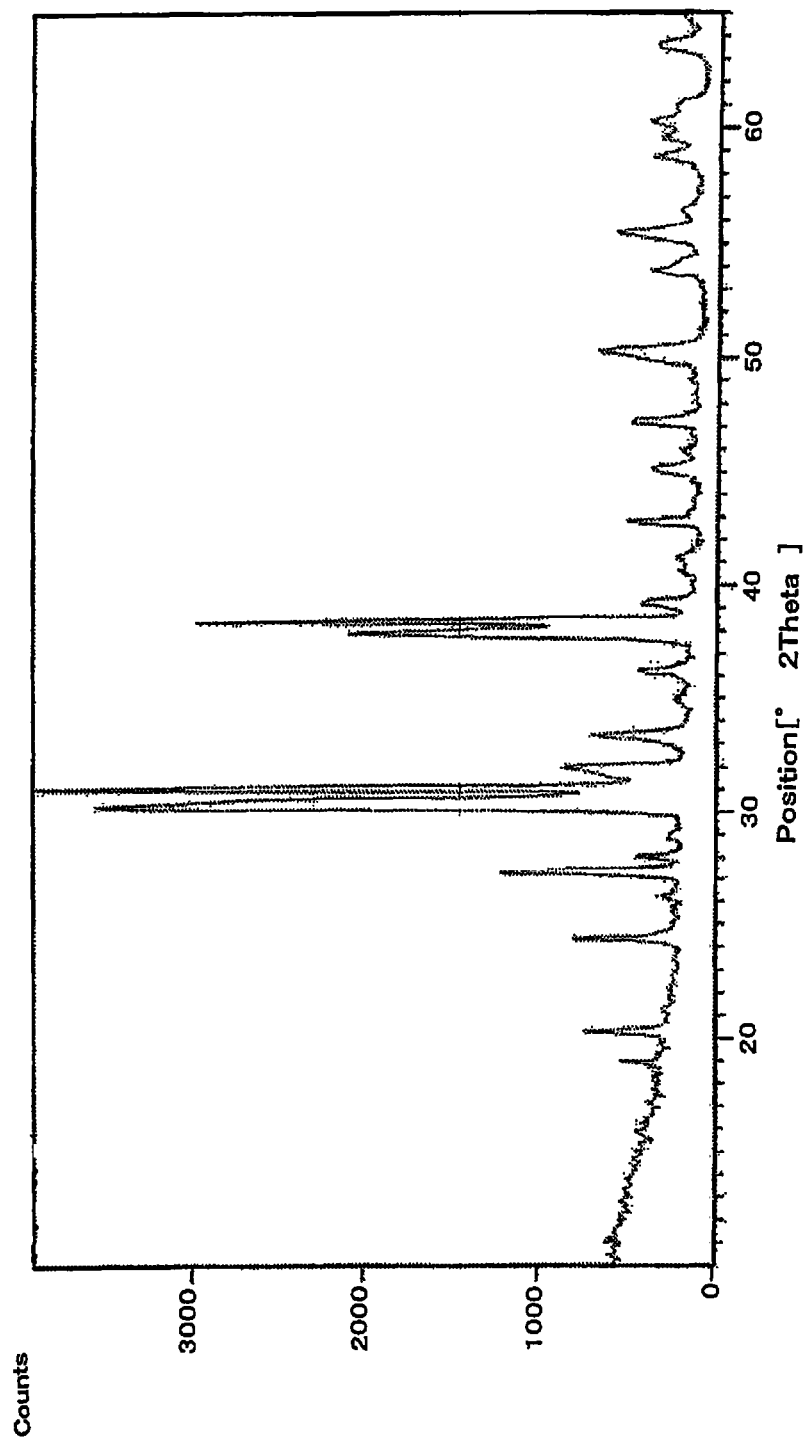
FIG. 9 is a powder x-ray diffraction pattern of a nitrogen-containing alloy prepared in Example 14.

FIG. 9 shows an X-ray powder diffraction pattern of the resulting nitrogen-containing alloy. FIG. 9 demonstrates that intermetallic compounds such as SrSi (PDF No. 16-0008) and $SrSi_2$ (PDF No. 19-1285) were detected.

Subsequently, the resulting nitrogen-containing alloy was subjected to the secondary nitridation step under the conditions described below. The above-described HIP was evacuated to $5\times10^{-1}$ Pa. The alloy powder was heated to 300° C. Evacuation was continued for one hour at 300° C. The pressure of the nitrogen atmosphere was increased to about 49 MPa at room temperature. The nitrogen-containing alloy powder was heated until the temperature reached 900° C. at a heating rate of 600° C./hr. The nitrogen-containing alloy powder was then heated until the temperature reached 1,100° C. at a heating rate of 66.7° C./hr. At this point, the pressure was about 140 MPa. Heating and pressurization were performed over a period of about 1.5 hours in such a manner that the temperature in the furnace was increased to 1,900° C. and the internal pressure was increased to 190 MPa. This state was maintained for one hour. The nitrogen-containing alloy powder was left to cool to room temperature, thereby providing a phosphor. The resulting phosphor was disintegrated with an alumina mortar so as to have a particle diameter of 50 μm or less. The light emission properties were measured. Table 9 shows the results. Table 8 shows the value of the formula [A] and the temperature change per minute in the heating step. After the phosphor was subjected to washing treatment as in Example 2, analysis of the phosphor with regard to its oxygen content, its nitrogen content, and its NI/NP was performed. Table 9 also shows the results.

Example 15

The secondary nitridation step was performed to prepare a phosphor as in Example 14, except that after the primary nitridation step, the resulting nitrogen-containing alloy was milled with an alumina mortar in a nitrogen atmosphere and then screened with a sieve having 53-μm openings in a nitrogen atmosphere.

The light emission properties of the resulting phosphor were measured as in Example 14. Table 9 shows the results. After the phosphor was subjected to washing treatment as in Example 2, analysis of the phosphor with regard to its oxygen content, its nitrogen content, and its NI/NP was performed. Table 9 also shows the results. Table 8 shows the value of the formula [A] and the temperature change per minute in the heating step.

Example 16

The primary nitridation step was performed as in Example 14, except that the feed rate of the alloy powder was set at 71 g/hr, a mixed gas containing nitrogen (0.25 L/min) and argon (5 L/min) was flowed, and the heat treatment was performed at a heater temperature of 1,080° C. In this case, the residence time of the alloy powder in a soaking area (time from feed initiation to discharge initiation×soaking area length/furnace tube length) was about three minutes. A nitrogen-containing alloy prepared by the primary nitridation step was ejected from the furnace tube, collected in a vessel filled with argon, and rapidly cooled.

Analysis of the nitrogen-containing alloy prepared by the primary nitridation step demonstrated that the nitrogen content was 5.5% by weight and the oxygen content was 2.8% by weight.

The nitrogen-containing alloy was subjected to the secondary nitridation step as in Example 14 to produce a phosphor. The light emission properties of the phosphor were measured as in Example 14. Table 9 shows the results. After the phosphor was subjected to washing treatment as in Example 2, analysis of the phosphor with regard to its oxygen content, its nitrogen content, and its NI/NP was performed. Table 9 also shows the results. Table 8 shows the value of the formula [A] and the temperature change per minute in the heating step.

Example 17

The primary nitridation step was performed as in Example 14, except that a mixed gas of nitrogen (2.5 L/min), argon (2.5 L/min), and hydrogen (0.2 L/min) was fed into the furnace tube from the lower side of the inclined furnace tube while a mixed gas of nitrogen (2.5 L/min) and argon (2.5 L/min) was made to flow in the entire atmosphere rotary kiln, and the feed rate of the alloy powder was set at 0.3 kg/hr.

Analysis of the nitrogen-containing alloy prepared by the primary nitridation step demonstrated that the nitrogen content was 14.4% by weight and the oxygen content was 2.2% by weight.

Subsequently, the resulting nitrogen-containing alloy was milled as in Example 1. The weight-average median diameter $D_{50}$ of the resulting alloy powder was 11.4 μm. The proportion of alloy particles having a diameter of 45 μm or more was 1% or less. The proportion of alloy particles having a diameter of 100 μm or more is less than 0.1%. The proportion of alloy particles having a diameter of 5 μm or less was 12%. The QD was 0.36.

The resulting nitrogen-containing alloy was subjected to nitridation under the same conditions as described in Example 14. The light emission properties were measured as in Example 14. Table 9 shows the results. Table 8 shows the value of the formula [A] and the temperature change per minute in the heating step.

Example 18

A phosphor was produced under the same conditions as described in Example 17, except that the value of the formula [A] was 0.50 (the filling rate of the raw material for the phosphor in the firing vessel was 35% by volume). The light emission properties of the resulting phosphor were measured as in Example 17. Table 9 shows the results.

Example 19

The nitrogen-containing alloy prepared by the primary nitridation step in Example 17 was disintegrated with an alumina mortar so as to have a particle diameter of 500 μm or less. The nitrogen-containing alloy was milled with a jet mill having a grinding chamber lined with zirconia (Nano Grinding Mill NJ-50, manufactured by Sunrex Kogyo Co., Ltd.) in a nitrogen atmosphere (containing 1% by volume or less oxygen) at a milling pressure of 0.3 MPa and a raw material feed rate of 0.3 kg/hr. The resulting alloy powder was screened with a sieve with 53-μm openings to collect an alloy powder having a weight-average median diameter $D_{50}$ of 12.8 μm and having a peak of particle-size distribution of about 20 μm. The proportion of alloy particles having a diameter of 45 μm or more in the resulting alloy powder was 6%. The proportion of alloy particles having a diameter of 5 μm or less was 18%. The QD was 0.60.

The resulting nitrogen-containing alloy was subjected to nitridation under the same conditions as described in Example 14 to prepare a phosphor (except that the filling rate of the raw material for the phosphor in the firing vessel was set at 26% by volume). The light emission properties of the resulting phosphor were measured as in Example 14. Table 9 shows the results. Table 8 shows the value of the formula [A] and the temperature change per minute in the heating step.

Figure 5:
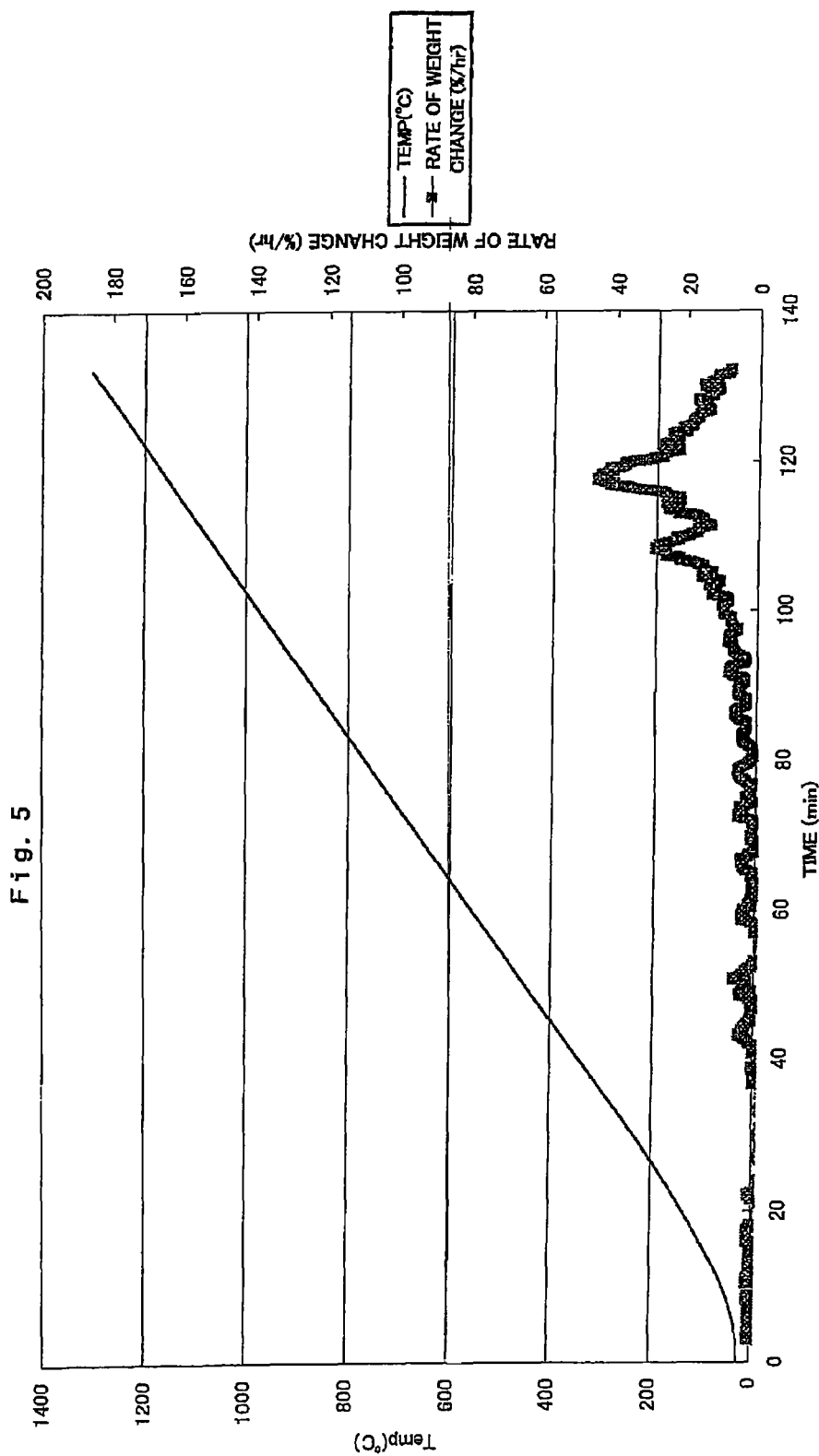
FIG. 5 is a chart showing the results of TG-DTA analysis of a nitrogen-containing alloy prepared in Example 19.

In addition, 10.16 mg of the resulting nitrogen-containing alloy was placed into a boron nitride vessel and heated from room temperature to 1,300° C. at a heating rate of 10° C./min under a stream of nitrogen gas at a flow rate of 100 mL/min. A change in weight during heating was studied by TG-DTA measurement. FIG. 5 shows the results.

TABLE 7

| | Conditions for primary nitridation step | | | Analytical result of nitrogen-containing alloy | | | |
|---|---|---|---|---|---|---|---|
| | Atmosphere (type of apparatus) | Temperature (° C.) | Time (hr) | Rate of weight increase (wt %) | Metal element content (wt %) | Nitrogen content (wt %) | Oxygen content (wt %) |
| Example 1 | Argon containing 2% nitrogen (tubular furnace) | 1100 | 5 | 4.5 | 95.7 | 2.54 | 2.25 |
| Example 2 | Argon containing 2% nitrogen (tubular furnace) | 1100 | 5 | 4.5 | 95.7 | — | — |
| Example 3 | Argon containing 2% nitrogen (tubular furnace) | 1050 | 10 | 6.2 | 94.2 | — | — |
| Example 4 | Argon containing 2% nitrogen (tubular furnace) | 1050 | 10 | 6.2 | 94.2 | — | — |
| Example 5 | Argon containing 7% nitrogen (tubular furnace) | 1050 | 10 | 12.5 | 88.9 | — | — |
| Example 6 | Argon containing 4% nitrogen (tubular furnace) | 1050 | 10 | 8.6 | 92.1 | — | — |
| Example 7 | Argon containing 5% nitrogen (tubular furnace) | 1050 | 5 | 6.8 | 93.6 | — | — |
| Example 8 | Argon containing 5% nitrogen (tubular furnace) | 1050 | 10 | 8.9 | 91.8 | — | — |
| Example 9 | Argon containing 5% nitrogen (atmosphere furnace) | 1050 | 4 | 5.0 | 95.2 | — | — |
| Example 10 | Nitrogen (tubular furnace) | 1030 | 8 | 3.0 | 97.0 | 1.1 | 1.7 |
| Example 11 | Mixed gas of nitrogen, argon, and hydrogen (rotary kiln) | 1100 | 0.05 | — | — | 3.7 | 1.2 |
| Example 12 | Argon containing 5% nitrogen (first time) → nitrogen (second time) (atmosphere furnace) | 1050 | Heating for 4 hours twice | — | — | 10.8 | 6.5 |
| Example 13 | Argon containing 5% nitrogen (first time) → nitrogen (second time) (atmosphere furnace) | 1050 | Heating for 3 hours three times | — | — | 15.7 | 7.4 |
| Example 14 | Mixed gas of nitrogen, argon and hydrogen (rotary kiln) | 1100 | 0.05 | — | — | 8.9 | 2.9 |
| Example 15 | Mixed gas of nitrogen, argon and hydrogen (rotary kiln) | 1100 | 0.05 | — | — | 8.9 | 2.9 |
| Example 16 | Mixed gas of nitrogen and argon (rotary kiln) | 1080 | 0.05 | — | — | 5.5 | 2.8 |
| Example 17 | Mixed gas of nitrogen and argon (rotary kiln) | 1100 | 0.05 | — | — | 14.4 | 2.2 |
| Example 18 | Mixed gas of nitrogen and argon (rotary kiln) | 1100 | 0.05 | — | — | 14.4 | 2.2 |
| Example 19 | Mixed gas of nitrogen and argon (rotary kiln) | 1100 | 0.05 | — | — | 14.4 | 2.2 |
| Comparative Example 1 | — | — | — | — | 99.7 | ≤0.01 | 0.3 |
| Comparative Example 2 | $N_2$ | 1030 | 2 | 2 | 98.0 | 0.6 | 1.4 |

TABLE 8

| | Conditions for secondary nitridation step Value of formula [A] | Change in temperature per minute (° C./min) |
|---|---|---|
| Example 1 | 0.50 | ≤2 |
| Example 2 | 0.50 | ≤2 |
| Example 3 | 0.50 | ≤2 |
| Example 4 | 0.50 | ≤2 |
| Example 5 | 0.50 | ≤2 |
| Example 6 | 0.50 | ≤2 |
| Example 7 | 0.50 | ≤2 |
| Example 8 | 0.50 | ≤2 |
| Example 9 | 0.50 | ≤2 |
| Example 10 | 0.50 | ≤2 |
| Example 11 | 0.50 | ≤2 |
| Example 12 | 0.50 | ≤2 |
| Example 13 | 0.50 | ≤2 |
| Example 14 | 0.50 | ≤2 |
| Example 15 | 0.50 | ≤2 |
| Example 16 | 0.50 | ≤2 |
| Example 17 | 0.38 | ≤2 |
| Example 18 | 0.50 | ≤2 |
| Example 19 | 0.38 | ≤2 |
| Comparative Example 1 | 0.50 | ≥100 |
| Comparative Example 2 | 0.50 | ≈80 |

TABLE 9

| | Post-treatment | Peak emission wavelength (nm) | Relative peak emission intensity (%) | Relative brightness (%) | Chromaticity coordinates x | Chromaticity coordinates y | Nitrogen content (wt %) | NI/NP | Oxygen content (wt %) |
|---|---|---|---|---|---|---|---|---|---|
| Example 1 | None | 630 | 92 | 171 | 0.635 | 0.361 | — | — | — |
| Example 2 | Washing | 634 | 110 | 198 | 0.638 | 0.359 | — | — | — |
| Example 3 | None | 628 | 86 | 161 | — | — | — | — | — |
| Example 4 | Washing and classification | 629 | 97 | 189 | — | — | — | — | — |
| Example 5 | None | 630 | 87 | 169 | — | — | — | — | — |
| Example 6 | None | 628 | 88 | 174 | — | — | — | — | — |
| Example 7 | None | 628 | 90 | 176 | — | — | — | — | — |
| Example 8 | None | 628 | 86 | 169 | — | — | — | — | — |
| Example 9 | None | 630 | 92 | 175 | — | — | — | — | — |

TABLE 9-continued

| | Post-treatment | Peak emission wavelength (nm) | Relative peak emission intensity (%) | Relative brightness (%) | Chromaticity coordinates x | Chromaticity coordinates y | Nitrogen content (wt %) | NI/NP | Oxygen content (wt %) |
|---|---|---|---|---|---|---|---|---|---|
| Example 10 | None | 628 | 84 | 166 | — | — | — | — | — |
| | Washing | — | — | — | — | — | 25.0 | 0.06 | 1.0 |
| Example 11 | None | 630 | 94 | 182 | — | — | — | — | — |
| | Washing | — | — | — | — | — | 24.0 | 0.15 | 1.6 |
| Example 12 | Washing and classification | 628 | 98 | 193 | 0.630 | 0.366 | 23.8 | 0.45 | 2.0 |
| Example 13 | Washing and classification | 631 | 100 | 189 | 0.634 | 0.362 | 24.0 | 0.65 | 1.9 |
| Example 14 | None | 628 | 93 | 185 | 0.630 | 0.367 | — | — | — |
| | Washing | — | — | — | — | — | 23.7 | 0.38 | 1.8 |
| Example 15 | None | 627 | 98 | 193 | 0.630 | 0.366 | — | — | — |
| | Washing | — | — | — | — | — | 24.0 | 0.37 | 1.5 |
| Example 16 | None | 625 | 73 | 152 | 0.624 | 0.370 | — | — | — |
| | Washing | — | — | — | — | — | 22.9 | 0.24 | 4.1 |
| Example 17 | None | 625 | 107 | 204 | 0.630 | 0.367 | — | — | — |
| Example 18 | Washing and classification | 624 | 103 | 197 | 0.629 | 0.368 | — | — | — |
| Example 19 | Washing and classification | 627 | 96 | 180 | 0.630 | 0.366 | — | — | — |
| Comparative Example 1 | None | | Not emitted | | | | — | — | — |
| Comparative Example 2 | None | | Not emitted | | | | 22.0 | 0.03 | — |

Comparison of Examples 17 and 19 shows that a smaller QD is obtained in Example 17 and that a higher peak emission intensity of the resulting phosphor is observed in Example 17. Hence, a narrow distribution of the alloy powder before the secondary nitridation step tends to lead to improvement in light emission properties and is thus preferred.

Comparative Example 1

An attempt was made to prepare a phosphor as in Example 1, except that the primary nitridation step was not performed, thereby forming a black block. Although an attempt was made to measure the light emission properties of the resulting alloy block in the same way as in Example 1, light emission was not observed. The nitrogen content, the oxygen content, the total content of metal elements, and the like of the resulting molten alloy were measured. Tables 7 and 9 show the results.

Figure 10:
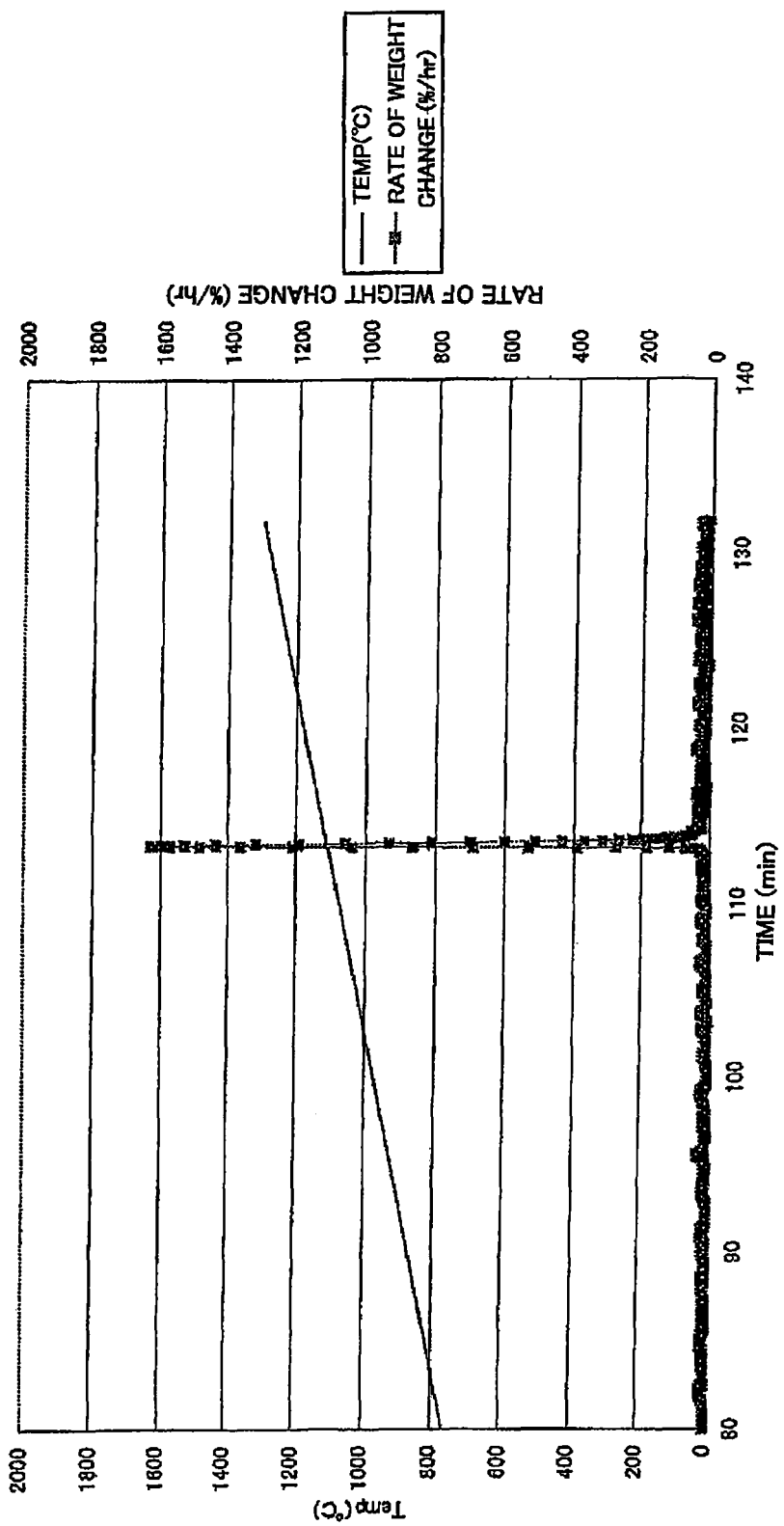
FIG. 10 is a chart showing the results of TG-DTA analysis of an alloy powder before primary nitridation according to Comparative Example 1.

Furthermore, 13 mg of the alloy powder prepared in the milling step before the primary nitridation step in Example 1 was placed into a boron nitride crucible. TG-DTA measurement of the alloy powder was performed under the conditions in which heating was performed from room temperature to 1,300° C. at a heating rate of 10° C./min under a flow of nitrogen gas at a flow rate of 100 mL/min. The results demonstrated that an exotherm and an increase in weight were observed at 1,090° C. to 1,100° C. FIG. 10 shows the rate of weight change during the TG-DTA measurement. FIG. 10 shows that after the initiation of heating, the weight is instantaneously increased at about 113 minutes (about 1,100° C.). The rate of weight increase at the peak (about 1,100° C.) was 1,628%/hour.

Table 8 shows the value of the formula [A] and the temperature change per minute in the heating step. The temperature change per minute in this comparative example is significantly larger than those in examples. It is speculated that a rapid exothermic reaction occurs in the furnace.

In Comparative Example 1, the rapid exotherm may cause instantaneous melting of the alloy powder to reduce the specific surface area, so that nitridation did not proceed.

Comparative Example 2

A nitrogen-containing alloy was prepared as in Example 1, except that the primary nitridation step was performed at 1,030° C. for two hours in a nitrogen flow. Analysis of the resulting nitrogen-containing alloy with regard to its nitrogen content and its oxygen content demonstrated that the nitrogen content was 0.64% by weight and the oxygen content was 1.39% by weight. Furthermore, the rate of weight increase and the total content of metal elements were calculated. Table 7 shows the results.

An attempt was made to prepare a phosphor by subjecting the resulting nitrogen-containing alloy to the secondary nitridation step as in Example 1. Although an attempt was made to evaluate the light emission properties as in Example 1, light emission was not observed. Table 9 shows the results. The nitrogen content of the resulting phosphor was 22% by weight. Table 8 shows the value of the formula [A] and the temperature change per minute in the heating step. The temperature change per minute in this comparative example is significantly larger than those in examples. It is speculated that a rapid exothermic reaction occurs in the furnace.

In Comparative Example 2, a deterioration in light emission properties may be because a nitridation reaction did not adequately proceed in the primary nitridation step due to a low temperature and a short period of time of the primary nitridation step, so that the rate of a nitridation reaction in the secondary nitridation step was not properly controlled. To prepare a high-performance phosphor, therefore, the primary nitridation step should be performed under appropriate conditions.

Example 20

A white light-emitting device shown in FIG. 2(b) was produced with the phosphor $(Sr_{0.792}Ca_{0.2}AlSiN_3:Eu_{0.008}$, serving as a red phosphor, prepared in Example 1 and $CaSc_2O_4:Ce_{0.01}$ (hereinafter, also referred to as "phosphor (A)") serving as a green phosphor according to a procedure described below.

A blue LED [22] (C460-EZ, manufactured by Cree Incorporation) emitting light with a wavelength of 455 nm to 460 nm was used as a first illuminant. The blue LED [22] was bonded to an electrode [27] arranged at the bottom of a depression of a frame [24] with a silver paste serving as an adhesive by die bonding. The blue LED [22] was connected to an electrode [26] of the frame [24] with a gold wire, serving as a wire [25], having a diameter of 25 μm.

A phosphor mixture of the two phosphors (the red phosphor and the green phosphor) was well mixed with a silicone resin (JCR6101UP, manufactured by Dow Corning Toray Co., Ltd.) in such a manner that the resulting phosphor-silicone resin mixture had a red phosphor content of 0.8% by weight and a green phosphor content of 6.2% by weight. The resulting phosphor-silicone resin mixture (phosphor-containing composition) was placed into the depression of the frame [24].

This was maintained at 150° C. for two hours to cure the silicone resin, thus forming a phosphor-containing section [23]. Thereby, a surface-mount white-light-emitting device was produced. In the description of this example, reference numerals of components shown in FIG. 2($b$) were bracketed.

The resulting surface-mount white-light-emitting device was operated by passing a current of 20 mA through the blue LED [22] to emit light. All light-emitting devices in all examples emitted white light.

Figure 13:
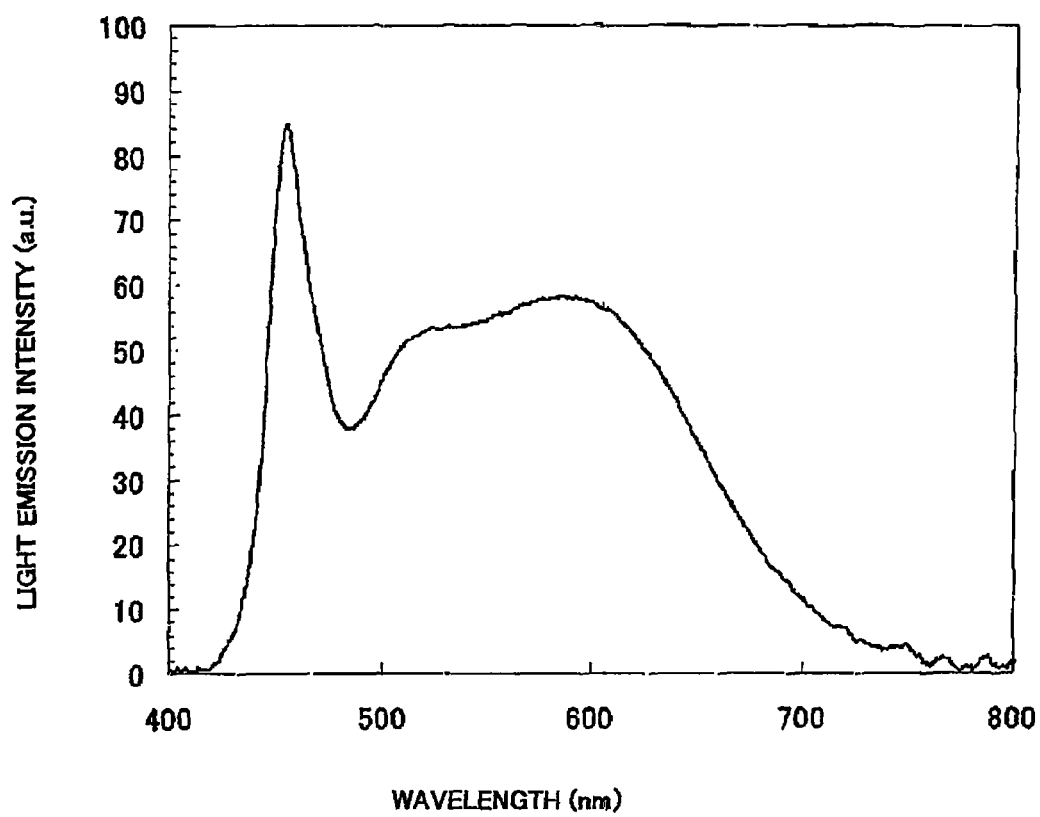
FIG. 13 is a chart showing the emission spectrum of a surface-mount light-emitting device prepared in Example 20.

The emission spectrum of the resulting surface-mount white-light-emitting device was measured. FIG. 13 shows the results. Table 10 shows values of various light emission properties (total luminous flux, optical output, chromaticity coordinates, color temperature, color deviation, color rendering index) calculated from the resulting emission spectrum. In Table 10, Tcp represents a correlated color temperature (unit: K), and Duv represents color deviation.

The combination of the phosphor of the present invention and any green phosphor results in a light-emitting device having high color rendering properties.

TABLE 10

| Total luminous flux (lm) | | 3.9 |
|---|---|---|
| Optical output (mW) | | 12.9 |
| Chromaticity coordinates | x | 0.346 |
| | y | 0.364 |
| Tcp | | 5000 |
| Duv | | 5.8 |
| Ra | | 89 |
| R01 | | 89 |
| R02 | | 96 |
| R03 | | 96 |
| R04 | | 84 |
| R05 | | 88 |
| R06 | | 94 |
| R07 | | 88 |
| R08 | | 77 |
| R09 | | 43 |
| R10 | | 91 |
| R11 | | 86 |
| R12 | | 63 |
| R13 | | 92 |
| R14 | | 98 |
| R15 | | 83 |

Reference Example 2

Production of Alloy

Raw material metals were weighed in such a manner that the composition ratio of metal elements, i.e., the ratio (molar ratio) of Al to Si, was 1:1. The raw material metals were charged into a graphite crucible and melted in an argon atmosphere with a high-frequency induction melting furnace. The molten metal mixture was poured from the crucible into a mold and then solidified, whereby an alloy (a mother alloy) in which the composition ratio of the metal elements, i.e., the ratio of Al to Si, was 1:1, was obtained.

The mother alloy and other raw material metals were weighed in such a manner that the ratio of Eu to Sr to Ca to Al to Si was 0.008:0.792:0.2:1:1 (molar ratio). After a furnace was evacuated to $5 \times 10^{-2}$ Pa, the evacuation of the furnace was stopped, and argon was then introduced into the furnace until the pressure in the furnace reached a predetermined value. The mother alloy was melted in a calcia crucible placed in the furnace. Sr, Eu, and Ca, which are the raw material metals, were added thereto. After all these components were melted into a mixture and the molten mixture was observed to have been agitated by an induction current, the molten mixture was poured from the crucible into a water-cooled copper mold (a plate shape with a thickness of 40 mm) and then solidified.

A 40-mm-thick plate of the resulting alloy was analyzed with regard to its composition by an ICP technique. About 10 g of a sample was taken from a portion close to the center of gravity of the plate and about 10 g of a sample was taken from an end portion of the plate. The elemental analysis of the samples using the ICP technique determined that the samples had substantially the same composition as the alloy plate prepared in Example 1 within the scope of analytical precision. Therefore, Eu and the other elements seemed to be uniformly distributed.

The resulting alloy had an X-ray powder diffraction pattern similar to that of $Sr(Si_{0.5}Al_{0.5})_2$ and therefore was determined to be an $AlB_2$-type intermetallic compound referred to as an alkaline-earth silicide.

The resulting alloy was milled with an alumina mortar in a nitrogen atmosphere (containing 4%, oxygen) for 60 minutes. Undersize particles of the alloy that passed through a sieve with 53-μm openings were collected to obtain an alloy powder. Hereinafter, this alloy powder is referred to as an "alloy powder prepared in Reference Example 2".

Nitridation Treatment

Into a boron nitride crucible (having an inner diameter of 54 mm), 10 g of the alloy powder prepared as above was placed. The boron nitride crucible was set in a hot isostatic press (HIP). The press was evacuated to $5 \times 10^{-1}$ Pa. The alloy powder was heated to 300° C. The evacuation was continued for one hour at 300° C. Nitrogen was charged into the press in such a manner that the pressure in the press was increased to 1 MPa. The alloy powder was cooled. The pressure in the press was reduced to 0.1 MPa. Nitrogen was introduced into the press again in such a manner that the pressure in the press was increased to 1 MPa. This procedure was repeated twice. Nitrogen was introduced into the press in such a manner that the pressure in the press was increased to 50 MPa before initiation of heating. The alloy powder was heated until the temperature in the furnace reached 950° C. at a heating rate of 600° C./hr while the internal pressure was increased to about 135 MPa at a pressurization rate of about 50 MPa/hr. The temperature in the furnace is increased from 950° C. to 1,100° C. at a heating rate of 66.7° C./hr (about 1.11° C./min) while the internal pressure was increased from 135 MPa to 160 MPa. Heating and pressurization were performed in such a manner that the temperature in the furnace was increased to 1,850° C. at a heating rate of about 600° C./hr and the internal pressure was increased to 180 MPa. This temperature and this pressure were maintained for one hour. The resulting fired product was milled, washed, classified to prepare a phosphor having a weight-average median diameter $D_{50}$ of 8 μm.

The characterization of the phosphor by X-ray powder diffraction showed the presence of an orthorhombic crystal isomorphic to $CaAlSiN_3$. The target composition of the phosphor was $Eu_{0.008}Sr_{0.792}Ca_{0.2}AlSiN_3$. Hereinafter, this phosphor is referred to as a "phosphor in Reference Example 2".

Example 21

Nitridation treatment was performed under the same conditions as described in Reference Example 2, except that a mixture of 18.6 g of the alloy powder prepared in Reference Example 2 and 10 g of the phosphor in Reference Example 2 was placed into a boron nitride crucible, thereby preparing a phosphor having the same structure as the phosphor in Reference Example 2. The emission spectrum of this phosphor was measured by the foregoing method with an excitation wavelength of 465 nm. The peak emission intensity and the brightness were determined from the resulting emission spectrum with respect to 100% of the phosphor prepared in Reference Example 1. Table 11 shows the results. Table 11 also shows the value of the formula [A] and the temperature change per minute in the heating step.

Example 22

Nitridation treatment was performed under the same conditions as described in Reference Example 2, except that a mixture of 22.9 g of the alloy powder prepared in Reference Example 2 and 5.7 g of the phosphor in Reference Example 2 was placed into a boron nitride crucible, thereby preparing a phosphor having the same structure as the phosphor in Reference Example 2. The emission spectrum of this phosphor was measured by the foregoing method with an excitation wavelength of 465 nm. The peak emission intensity and the brightness were determined from the resulting emission spectrum with respect to 100% of the phosphor prepared in Reference Example 1. Table 11 shows the results. Table 11 also shows the value of the formula [A] and the temperature change per minute in the heating step.

Example 23

Nitridation treatment was performed under the same conditions as described in Reference Example 2, except that a mixture of 28.5 g of the alloy powder prepared in Reference Example 2 and 15.3 g of the phosphor in Reference Example 2 was placed into a boron nitride crucible, thereby preparing a phosphor having the same structure as the phosphor in Reference Example 2. The emission spectrum of this phosphor was measured by the foregoing method with an excitation wavelength of 465 nm. The peak emission intensity and the brightness were determined from the resulting emission spectrum with respect to 100% of the phosphor prepared in Reference Example 1. Table 11 shows the results. Table 11 also shows the value of the formula [A] and the temperature change per minute in the heating step.

Example 24

Nitridation treatment was performed under the same conditions as described in Reference Example 2, except that a mixture of 25.7 g of the alloy powder prepared in Reference Example 2 and 2.9 g of the phosphor in Reference Example 2 was placed into a boron nitride crucible, thereby preparing a phosphor having the same structure as the phosphor in Reference Example 2. The emission spectrum of this phosphor was measured by the foregoing method with an excitation wavelength of 465 nm. The peak emission intensity and the brightness were determined from the resulting emission spectrum with respect to 100% of the phosphor prepared in Reference Example 1. Table 11 shows the results. Table 11 also shows the value of the formula [A] and the temperature change per minute in the heating step.

Example 25

Nitridation treatment was performed under the same conditions as described in Reference Example 2, except that a mixture of 27.2 g of the alloy powder prepared in Reference Example 2 and 1.4 g of the phosphor in Reference Example 2 was placed into a boron nitride crucible, thereby preparing a phosphor having the same structure as the phosphor in Reference Example 2. The emission spectrum of this phosphor was measured by the foregoing method with an excitation wavelength of 465 nm. The peak emission intensity and the brightness were determined from the resulting emission spectrum with respect to 100% of the phosphor prepared in Reference Example 1. Table 11 shows the results. Table 11 also shows the value of the formula [A] and the temperature change per minute in the heating step.

Example 30

Nitridation treatment was performed under the same conditions as described in Reference Example 2, except that 18.6 g of the alloy powder prepared in Reference Example 2 was placed into a boron nitride crucible. The emission spectrum of the resulting phosphor was measured by the foregoing method with an excitation wavelength of 465 nm. The peak emission intensity and the brightness were determined from the resulting emission spectrum with respect to 100% of the phosphor prepared in Reference Example 1. Table 11 shows the results. Table 11 also shows the value of the formula [A] and the temperature change per minute in the heating step.

Comparative Example 4

Nitridation treatment was performed under the same conditions as described in Reference Example 2, except that 28.5 g of the alloy powder prepared in Reference Example 2 was placed into a boron nitride crucible, thereby preparing a black block with a slightly reddish surface, which did not emit light. Table 11 also shows the value of the formula [A] and the temperature change per minute in the heating step.

TABLE 11

| | Mixing ratio of material (wt %) | | Mixing ratio of material (g) | | Light emission properties of phosphor | | | | |
|---|---|---|---|---|---|---|---|---|---|
| | Alloy powder prepared in Reference Example 1 | Phosphor in Reference Example 1 | Alloy powder prepared in Reference Example 1 | Phosphor in Reference Example 1 | Peak emission wavelength (nm) | Peak emission intensity (%) | Brightness (%) | Value of formula [A] | Temperature change per minute (° C./min) |
| Example 21 | 65 | 35 | 18.6 | 10 | 627 | 99 | 187 | 0.42 | ≤10 |
| Example 22 | 80 | 20 | 22.9 | 5.7 | 627 | 97 | 186 | 0.42 | ≤10 |
| Example 23 | 65 | 35 | 28.5 | 15.3 | 626 | 100 | 188 | 0.52 | ≤10 |
| Example 24 | 90 | 10 | 25.7 | 2.9 | 626 | 91 | 177 | 0.42 | ≤10 |
| Example 25 | 95 | 5 | 27.2 | 1.4 | 626 | 88 | 172 | 0.42 | ≤10 |
| Example 30 | 100 | 0 | 18.6 | 0 | 627 | 86 | 165 | 0.32 | ≤10 |
| Comparative Example 4 | 100 | 0 | 28.5 | 0 | — | Not emitted | Not emitted | 0.42 | +100 |

The results described above demonstrate as follows.

In the case of the production of the phosphor from the alloy, in some cases, the phosphor is not prepared when a large amount of the alloy is placed into the reaction vessel (Comparative Example 4). Furthermore, in the case where the phosphor is not mixed, the light emission properties of the phosphor tend to be reduced compared with those of the case where the phosphor is mixed (Example 30).

In contrast, in the case where nitridation treatment is performed in the presence of the nitride material, the phosphor having excellent light emission properties is obtained even when a large amount of the alloy is placed into the reaction vessel (Examples 21 to 25).

Example 26

An alloy for a phosphor precursor was prepared under the same conditions as described in Example 1. The resulting plate-shaped alloy for a phosphor precursor had substantially the same composition as the alloy in Example 1 within the scope of analytical precision.

The plate-shaped alloy was milled with an alumina mortar in a nitrogen flow to form an alloy powder with a weight-average median diameter $D_{50}$ of 20.0 μm.

The melting point of the alloy powder was measured by the method described above under argon flow. The melting initiation temperature was about 1,078° C., and the melting point was 1,121° C.

Into a boron nitride crucible (having an inner diameter of 54 mm), 10 g of the resulting alloy powder was placed. The boron nitride crucible was set in a hot isostatic press (HIP). The press was evacuated to $5 \times 10^{-1}$ Pa. The alloy powder was heated to 300° C. The evacuation was continued for one hour at 300° C. Nitrogen was charged into the press in such a manner that the pressure in the press was increased to 1 MPa. The alloy powder was cooled. The pressure in the press was reduced to 0.1 MPa. Nitrogen was introduced into the press again in such a manner that the pressure in the press was increased to 1 MPa. This procedure was repeated twice. Nitrogen was introduced into the press in such a manner that the pressure in the press was increased to 50 MPa before initiation of heating. The alloy powder was heated until the temperature in the furnace reached 1,000° C. at a heating rate of 600° C./hr while the internal pressure was increased to about 135 MPa at a pressurization rate of about 50 MPa/hr. The temperature in the furnace is increased from 1,000° C. to 1,200° C. at a heating rate of 66.7° C./hr while the internal pressure was increased from 135 MPa to 160 MPa. Heating and pressurization were performed in such a manner that the temperature in the furnace was increased to 1,850° C. at a heating rate of 600° C./hr and the internal pressure was increased to 190 MPa. This temperature and this pressure were maintained for one hour to prepare a phosphor.

The characterization of the phosphor by X-ray powder diffraction showed the presence of an orthorhombic crystal isomorphic to $CaAlSiN_3$.

In Example 26, the heating rate was 1.11° C./min in the temperature range from the temperature (1,021° C.) 100° C. lower than the melting point (1,121° C.) of the alloy to the temperature (1,091° C.) 30° C. lower than the melting point of the alloy.

The emission spectrum of the resulting phosphor was measured by the foregoing method with an excitation wavelength of 465 nm. Table 12 shows the results. Table 12 also shows the value of the formula [A] and the temperature change per minute in the heating step.

Example 31

Nitridation treatment was performed as in Example 26, except that in the nitridation treatment in the HIP, the temperature in the furnace was increased to 950° C. (internal pressure: 130 MPa) at a heating rate of 600° C./hr, maintained at 950° C. for 2.5 hours, and then increased to 1,850° C. (internal pressure: 190 MPa) at a heating rate of 600° C./hr, thereby preparing a phosphor.

In Comparative Example 5, the heating rate was 10° C./min in the temperature range from the temperature (1,021° C.) 100° C. lower than the melting point (1,121° C.) of the alloy to the temperature (1,091° C.) 30° C. lower than the melting point of the alloy.

The light emission properties of the resulting phosphor were measured as in Example 1. Table 12 shows the results. Table 12 also shows the value of the formula [A] and the temperature change per minute in the heating step.

Example 32

Nitridation treatment was performed as in Example 26, except that in the nitridation treatment in the HIP, the temperature in the furnace was increased to 1,850° C. (internal pressure: 190 MPa) at a heating rate of 570° C./hr, thereby preparing a phosphor.

In Comparative Example 6, the heating rate was 9.5° C./min in the temperature range from the temperature (1,021° C.) 100° C. lower than the melting point (1,121° C.) of the alloy to the temperature (1,091° C.) 30° C. lower than the melting point of the alloy.

The light emission properties of the resulting phosphor were measured as in Example 26. Table 12 shows the results.

Table 12 also shows the value of the formula [A] and the temperature change per minute in the heating step.

TABLE 12

| | Heating rate* (° C./min) | Peak emission wavelength (nm) | Brightness (%) | Value of formula [A] | Temperature change per minute (° C./min) |
|---|---|---|---|---|---|
| Example 26 | 1.11 | 627 | 194 | 0.20 | ≤3 |
| Example 31 | 10 | 626 | 172 | 0.20 | ≤20 |
| Example 32 | 9.5 | 624 | 131 | 0.20 | ≤20 |

*The heating rate indicates a heating rate in the temperature range from the temperature (1,021° C.) 100° C. lower than the melting point (1,121° C.) of the alloy to the temperature (1,091° C.) 30° C. lower than the melting point of the alloy.

Table 12 shows that a low heating rate in the temperature range from the temperature (1,021° C.) 100° C. lower than the melting point (1,121° C.) of the alloy to the temperature (1,091° C.) 30° C. lower than the melting point of the alloy results in improvement in the brightness of the resulting phosphor (Example 26).

It is speculated that the reason for this is that in Example 26, in which the heating rate was low in the specific temperature range, the accumulation of the heat of reaction due to nitridation was reduced compared with Examples 31 and 32, in which the heating rates were high.

Furthermore, the results of Examples 31 and 32 demonstrate that in the case of a low value of the formula [A], the phosphors were produced even if the requirements 1) to 4) described above were not satisfied.

Example 27

Production of Alloy

An alloy for a phosphor precursor was prepared under the same conditions as described in Example 1. The resulting plate-shaped alloy for a phosphor precursor had substantially the same composition as the alloy in Example 1 within the scope of analytical precision.

Atomization of Alloy

The resulting plate-shaped alloy was atomized with an ultrasmall gas atomizer having a structure shown in FIG. 4.

Specifically, the plate-shaped alloy was placed into an aluminum oxide crucible. The plate-shaped alloy was heated to 1,000° C. in a melting chamber in vacuum and then melted at about 1,530° C. in an argon atmosphere. The melting chamber 101 was pressurized to a gauge pressure of about 0.05 MPa. The molten alloy was poured from the aluminum oxide injection nozzles 104 with an internal diameter of 2 mm into the injection chamber 105 (atmospheric pressure) filled with nitrogen. Simultaneously, jet blasts of an atomization gas (nitrogen) were delivered to the molten alloy at a blast pressure of 50 kgf/cm$^2$ (4.9 MPa), thereby atomizing droplets. The resulting powder collected in the collection chamber 106 (atmospheric pressure) filled with nitrogen was screened with a sieve with 53-μm openings, thereby obtaining an alloy powder.

Table 13 shows the angle of repose, the collapse angle, the difference angle, the tap density, the weight-average median diameter $D_{50}$, the oxygen content, and the carbon content of the resulting alloy powder.

Figure 14:
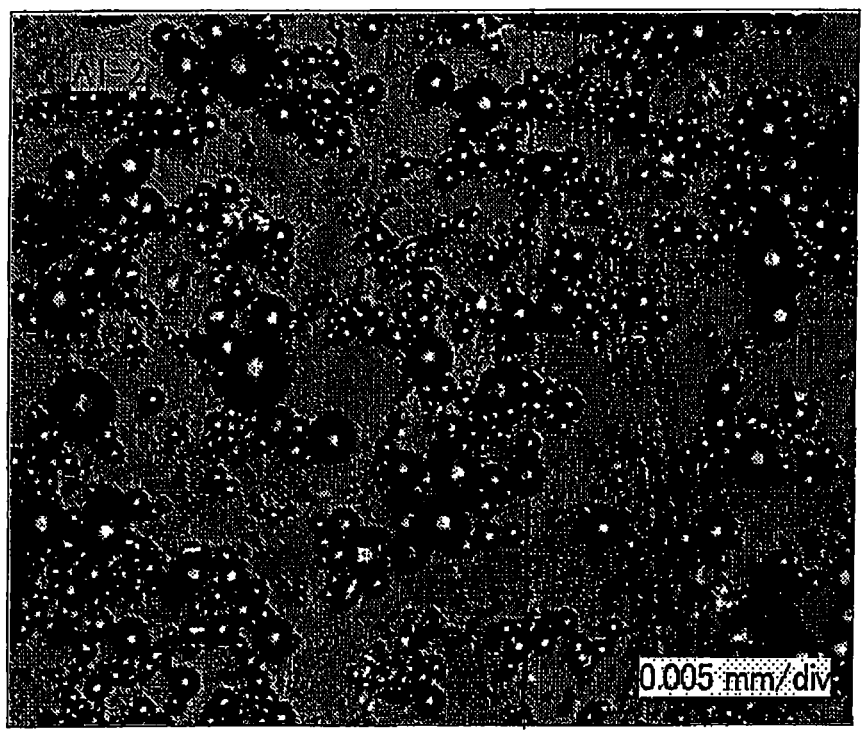
FIG. 14 is an optical photomicrograph of an alloy powder produced in Example 27.

Furthermore, the optical micrograph (FIG. 14) of the alloy powder showed that most of the resulting alloy particles were spherical.

Production of Phosphor

Into a boron nitride crucible, 32 g of the alloy powder was placed. The boron nitride crucible was set in a hot isostatic press (HIP). The press was evacuated to 5×10$^{-1}$ Pa. The alloy powder was heated to 300° C. The evacuation was continued for one hour at 300° C. Nitrogen was charged into the press in such a manner that the pressure in the press was increased to 1 MPa. The alloy powder was cooled. The pressure in the press was reduced to 0.1 MPa. Nitrogen was introduced into the press again in such a manner that the pressure in the press was increased to 1 MPa. This procedure was repeated twice. Nitrogen was introduced into the press in such a manner that the pressure in the press was increased to 50 MPa before initiation of heating. Heating and pressurization were performed in such a manner that the temperature in the furnace was increased to 1,800° C. and the internal pressure was increased to 180 MPa over a period of three hours. This state was maintained for one hour to prepare a phosphor.

The characterization of the phosphor by X-ray powder diffraction showed the presence of an orthorhombic crystal isomorphic to $CaAlSiN_3$.

The emission spectrum of the resulting phosphor was measured by the foregoing method with an excitation wavelength of 465 nm. The relative brightness and peak emission wavelength were determined. Table 13 shows the results. Table 13 also shows the value of the formula [A] and the temperature change per minute in the heating step.

Example 28

A phosphor was prepared as in Example 27, except that an alloy powder collected with the cyclone 107 was screened with a sieve having 53-1 μm openings to obtain an alloy powder.

Table 13 shows the measurement results of powder characteristics and the like of the alloy powder and the relative brightness and the peak emission wavelength of the phosphor. Table 13 also shows the value of the formula [A] and the temperature change per minute in the heating step.

Example 29

A phosphor was prepared as in Example 28, except that the alloy powder was prepared with the gas atomizer having the crucible 103 and the injection nozzles 104 composed of graphite.

Table 13 shows the measurement results of powder characteristics and the like of the alloy powder and the relative brightness and the peak emission wavelength of the phosphor. Table 13 also shows the value of the formula [A] and the temperature change per minute in the heating step.

Comparative Example 7

An alloy cast by the same method as in Example 27 was not atomized with the gas atomizer but milled with an alumina mortar in a nitrogen atmosphere (containing 4% or less oxygen) for three hours. Undersize particles of the alloy that passed through a sieve with 53-μm openings were collected.

Figure 15:
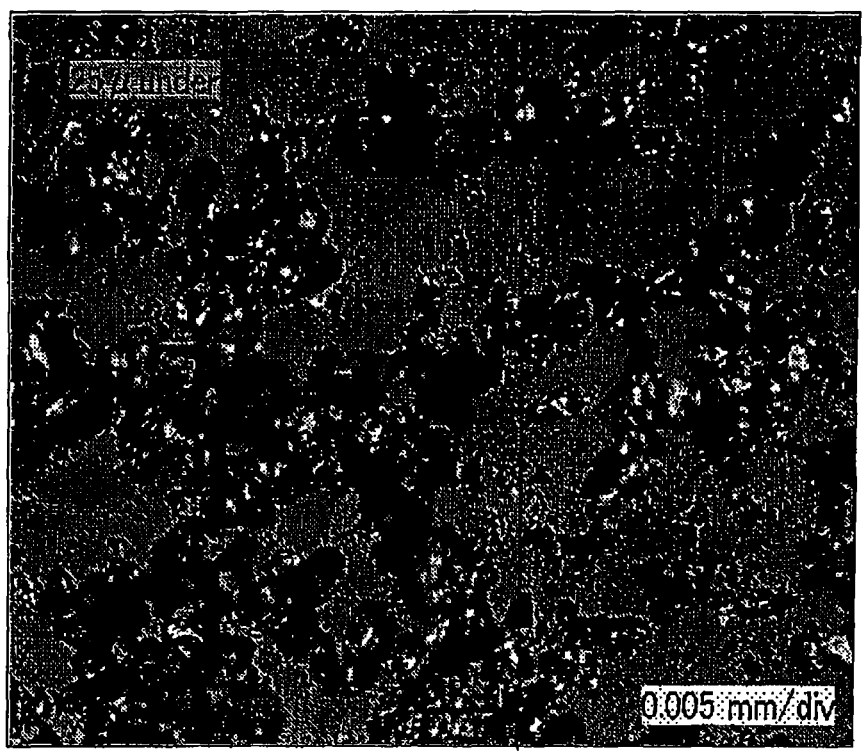
FIG. 15 is an optical photomicrograph of an alloy powder produced in Comparative Example 7.

The optical micrograph (FIG. 15) of the resulting alloy powder showed that the alloy particles were not spherical but irregular.

Table 13 shows the measurement results of powder characteristics and the like of the alloy powder. Table 13 also shows the value of the formula [A] and the temperature change per minute in the heating step.

Although an attempt was made to prepare a phosphor by treating the resulting alloy powder in a hot isostatic press (HIP) as in Example 27, a black block was obtained. The black block did not emit light at 465-nm excitation.

TABLE 13

| | Alloy powder for phosphor precursor | | | | | | | Phosphor | | Value | Temperature |
|---|---|---|---|---|---|---|---|---|---|---|---|
| | Angle of repose (°) | Collapse angle (°) | Difference angle (°) | Tap density (g/mL) | Weight-average median diameter D50 (mm) | Oxygen content (wt %) | Carbon content (wt %) | Brightness | Peak emission wavelength | of formula [A] | change per minute (° C./min) |
| Example 27 | 32.1 | 14.3 | 17.8 | 2.13 | 38.0 | 0.86 | 0.05 | 169 | 626 | 0.44 | ≤20 |
| Example 28 | 32 | 14.2 | 17.8 | 2.07 | 22.8 | 0.86 | 0.05 | 174 | 625 | 0.44 | ≤20 |
| Example 29 | 32.2 | 14.5 | 17.7 | 2.10 | 19.5 | 0.30 | 0.12 | 122 | 623 | 0.44 | ≤20 |
| Comparative Example 7 | 51.3 | 29.9 | 21.4 | 1.86 | 15.6 | 0.20 | ≤0.03 | — | — | 0.44 | ≥80 |

As is clear from the above results, the present invention provides a phosphor with high brightness is produced using an alloy powder for phosphor precursor with low impurities and high flowability.

It is speculated that in Example 29, the phosphor had a brightness lower than those in Examples 27 and 28 because of contamination with carbon from the graphite crucible and nozzles.

The present application is based on a Japanese patent application (Japanese Patent Application No. 2006-140557) filed on May 19, 2006; a Japanese patent application (Japanese Patent Application No. 2006-153632) filed on Jun. 1, 2006; a Japanese patent application (Japanese Patent Application No. 2006-184667) filed on Jul. 4, 2006; and a Japanese patent application (Japanese Patent Application No. 2006-267714) filed on Sep. 29, 2006. These applications are fully incorporated herein by reference.

The invention claimed is:

1. A method for producing a nitride or oxynitride phosphor, comprising a step of heating a raw material for the phosphor under a nitrogen-containing atmosphere,
wherein an alloy for a phosphor precursor is used as the whole or part of the raw material for the phosphor,
wherein in the step of heating the raw material for the phosphor, the whole or part of a raw material consists of a nitrogen-containing alloy, is performed under the nitrogen-containing atmosphere at a temperature equal to or higher than a temperature 300° C. higher than the melting point of the nitrogen-containing alloy, and
wherein the method satisfies at least one of requirements 1) to 4):
1) the whole or part of the alloy for a phosphor precursor is a nitrogen-containing alloy having a total content of metal elements of 97% by weight or less;
2) the heating rate is set at 9° C./min or less in the temperature range from a temperature 100° C. lower than the melting point of the alloy for a phosphor precursor to a temperature 30° C. lower than the melting point of the alloy for a phosphor precursor;
3) a nitride or an oxynitride containing one or two or more metal elements constituting the phosphor is used as the raw material for the phosphor together with the alloy for a phosphor precursor; and
4) a powder of the alloy for a phosphor precursor is used as the alloy for a phosphor precursor, the powder having an angle of repose of 45° or less.

2. The method for producing a phosphor according to claim 1, wherein the nitrogen-containing alloy has a nitrogen content of 0.8% by weight to 27% by weight.

3. The method for producing a phosphor according to claim 1 or 2, further comprising a preliminary step of heating the alloy for a phosphor precursor under a nitrogen-containing atmosphere to prepare the nitrogen-containing alloy.

4. The method for producing a phosphor according to claim 1, wherein the nitrogen-containing alloy satisfies the formula [7]:

$$0.03 \leq NI/NP \leq 0.9 \qquad [7]$$

wherein in the formula [7],
NI represents the nitrogen content (% by weight) of the nitrogen-containing alloy; and
NP represents the nitrogen content (% by weight) of the phosphor produced.

5. The method for producing a phosphor according to claim 1, further comprising a step of cooling the nitrogen-containing alloy to a temperature equal to or lower than a temperature 100° C. lower than the melting point of the nitrogen-containing alloy before heating the raw material for the phosphor, the whole or part of a raw material consisting of the nitrogen-containing alloy, under a nitrogen-containing atmosphere at a temperature equal to or higher than a temperature 300° C. higher than the melting point of the nitrogen-containing alloy.

6. The method for producing a phosphor according to claim 1, further comprising a step of milling the nitrogen-containing alloy before heating the raw material for the phosphor, the whole or part of a raw material consisting of the nitrogen-containing alloy, under a nitrogen-containing atmosphere at a temperature equal to or higher than a temperature 300° C. higher than the melting point of the nitrogen-containing alloy.

7. The method for producing a phosphor according to claim 1, wherein the alloy for a phosphor precursor has a weight-average median diameter $D_{50}$ of 100 μm or less.

8. The method for producing a phosphor according to claim 1, wherein the raw material for the phosphor contains 1% by weight or more of a nitride or an oxynitride containing one or two or more metal elements constituting the phosphor together with the alloy for a phosphor precursor.

9. The method for producing a phosphor according to claim 1, wherein the alloy for a phosphor precursor has a tap density of 1.9 g/mL or more.

10. The method for producing a phosphor according to claim 1, wherein the phosphor contains a tetravalent metal element $M^4$ containing at least Si and contains one or more metal elements other than Si.

11. The method for producing a phosphor according to claim 10, wherein the phosphor contains an activating element $M^1$, a divalent metal element $M^2$, and the tetravalent metal element $M^4$ containing at least Si.

12. The method for producing a phosphor according to claim 11, wherein the phosphor contains an alkaline-earth metal element serving as the divalent metal element $M^2$.

13. A method for producing a phosphor according to claim 1, wherein the whole or part of the alloy for a phosphor precursor is a nitrogen-containing alloy having a nitrogen content of 10% by weight or more.

* * * * *